United States Patent
Eguchi et al.

(10) Patent No.: US 7,022,238 B2
(45) Date of Patent: Apr. 4, 2006

(54) IMMERSION TYPE MEMBRANE FILTER

(75) Inventors: Tamiyuki Eguchi, Kobe (JP); Shiro Tanso, Takatsuki (JP); Naoki Murakami, Takatsuki (JP); Nobuo Hayashi, Takatsuki (JP); Seiji Okuda, Takatsuki (JP)

(73) Assignee: Yuasa Corporation, Osaka (JP)

( * ) Notice: Subject to any disclaimer, the term of this patent is extended or adjusted under 35 U.S.C. 154(b) by 224 days.

(21) Appl. No.: 10/343,989

(22) PCT Filed: Aug. 9, 2001

(86) PCT No.: PCT/JP01/06882

§ 371 (c)(1),
(2), (4) Date: Feb. 6, 2003

(87) PCT Pub. No.: WO02/13954

PCT Pub. Date: Feb. 21, 2002

(65) Prior Publication Data

US 2003/0178369 A1 Sep. 25, 2003

(30) Foreign Application Priority Data

| Aug. 10, 2000 | (JP) | 2000-243469 |
| Aug. 10, 2000 | (JP) | 2000-243470 |
| Aug. 10, 2000 | (JP) | 2000-243471 |
| Aug. 10, 2000 | (JP) | 2000-243472 |
| Aug. 25, 2000 | (JP) | 2000-255788 |
| Aug. 25, 2000 | (JP) | 2000-255789 |
| Nov. 29, 2000 | (JP) | 2000-363354 |
| Nov. 29, 2000 | (JP) | 2000-363389 |
| Nov. 29, 2000 | (JP) | 2000-363461 |
| Dec. 13, 2000 | (JP) | 2000-378415 |
| Mar. 15, 2001 | (JP) | 2001-073929 |
| Mar. 29, 2001 | (JP) | 2001-097485 |
| Mar. 29, 2001 | (JP) | 2001-097516 |
| May 18, 2001 | (JP) | 2001-150209 |

(51) Int. Cl.
B01D 61/00 (2006.01)

(52) U.S. Cl. ............... 210/650; 210/321.78; 210/321.8; 210/321.87; 210/321.88; 210/321.89; 210/500.23; 210/257.2; 210/636

(58) Field of Classification Search .................. 210/650, 210/321.78, 321.8, 321.87, 321.88, 321.89, 210/500.23, 257.2, 636
See application file for complete search history.

(56) References Cited

U.S. PATENT DOCUMENTS 4,140,637 A * 2/1979 Walter ................... 210/321.79

(Continued)

FOREIGN PATENT DOCUMENTS

JP 56-35483 8/1981

(Continued)

OTHER PUBLICATIONS

"Report on Commercialization of Small—Size Domestic Wastewater Processing Apparatus that Introduces a Membrane Processing Method, 1992 to 1995 Edition", Japan Education Center of Environmental Sanitation.

(Continued)

*Primary Examiner*—Ana Fortuna
(74) *Attorney, Agent, or Firm*—Birch, Stewart, Kolasch & Birch, LLP

(57) ABSTRACT

An immersion type membrane filter apparatus 200 is intended for obtaining filtrate by filtrating a fluid to be processed stored within a storage bath 150 and primarily includes a filtration membrane module 300 and an air bubbles supply device 500 disposed therebelow. The filtration membrane module 300 has numerous tubular membranes 310 having on the inner surfaces thereof the function of filtrating a fluid to be processed packed within a cylindrical housing vessel 301 having a discharge port 303 for filtrate. The tubular membranes 310 are held in an opened state at both the ends of the housing vessel 301. The filtration membrane module 300 is soaked in a fluid to be processed in such a way that the tubular membranes 310 are opened in the vertical direction. When air bubbles are supplied to the filtration membrane module 300 from an air bubbles supply device 500, the fluid to be processed flows through the tubular membranes 310 from the down side upwards to naturally circulate within the storage bath 150. Part of the fluid to be processed is filtrated by passing through the tubular membranes 310 from the inside to the outside. As a result, the filtrate thus obtained flows out via the discharge port 303 to a filtrate discharge pathway 600.

65 Claims, 33 Drawing Sheets

U.S. PATENT DOCUMENTS

| | | | | |
|---|---|---|---|---|
| 4,240,919 | A | * 12/1980 | Chapman | 510/369 |
| 4,293,418 | A | * 10/1981 | Fujii et al. | 210/321.81 |
| 4,610,789 | A | * 9/1986 | Barch | 210/321.87 |
| 4,876,006 | A | * 10/1989 | Ohkubo et al. | 210/321.69 |
| 5,198,110 | A | * 3/1993 | Hanai et al. | 210/321.79 |
| 5,209,852 | A | * 5/1993 | Sunaoka et al. | 210/636 |
| 5,472,601 | A | * 12/1995 | Eguchi | 210/321.8 |
| 5,494,577 | A | 2/1996 | Rekers | |
| 6,146,535 | A | * 11/2000 | Sutherland | 210/637 |
| 6,402,955 | B1 | * 6/2002 | Ookata | 210/636 |
| 6,767,455 | B1 | * 7/2004 | Goldsmith | 210/151 |

FOREIGN PATENT DOCUMENTS

| | | |
|---|---|---|
| JP | 61-129094 | 6/1986 |
| JP | 61-129094 A | 8/1986 |
| JP | 62-181772 A | 8/1987 |
| JP | 62-181772 | 8/1987 |
| JP | 11-267474 A | 5/1999 |
| JP | 11-267474 | 10/1999 |

OTHER PUBLICATIONS

"Outline on Membrane Processing Technologies" by Nakagaki and Shimizu, First volume, Chapter 3, Fuji Technosystem Co., Ltd. (1991).

Shin–ichiro Hamatani et al., the Lecture Collection for the Presentation on Sewage Water Studies, $37^{th}$, 7–90, 2000.

"Handbook for Charts of Machinery Design" written by Fujio Oguri, 9–2, Kyoritsu Shuppen Co., Ltd. (1978).

* cited by examiner $y = 55.992x^{-0.8328}$
$R^2 = 0.9992$ $y = 8.6203x^{0.3333}$
$R^2 = 1$ F I G. 44
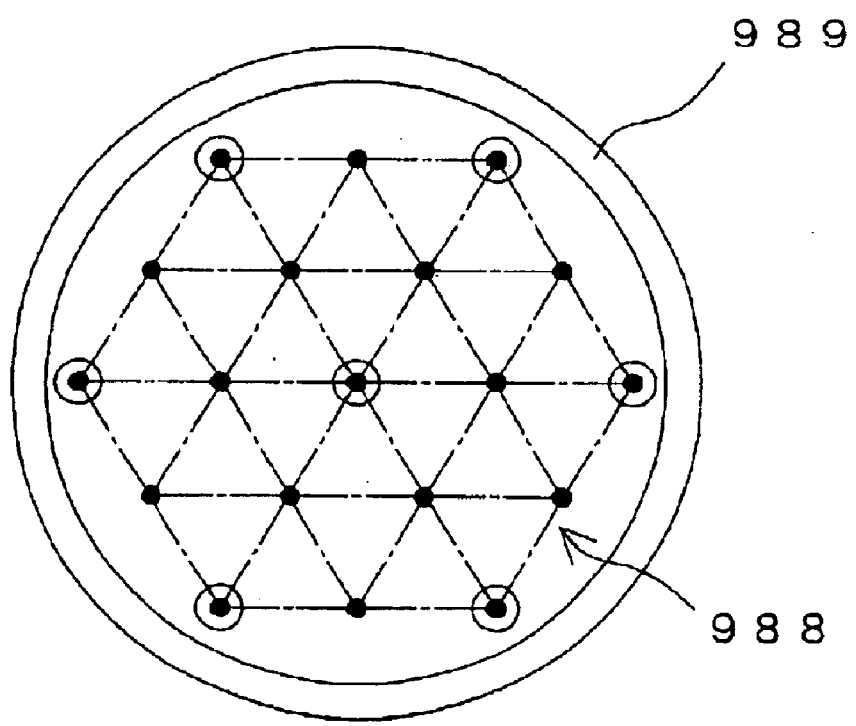

IMMERSION TYPE MEMBRANE FILTER

This application is the national phase under 35 U.S.C. § 371 of PCT International Application No. PCT/JP01/06882 which has an International filing date of Aug. 9, 2001, which designated the United States of America.

TECHNICAL FIELD

The present invention relates to a filter apparatus and particularly to an immersion type membrane filter apparatus, which is kept immersed in a fluid to be processed, for obtaining filtrate by filtrating the fluid to be processed.

BACKGROUND ART

Recently, immersion type membrane filtration methods have been utilized in a variety of fields, the methods involving immersing a membrane module in a fluid to be processed and filtrating the fluid to be processed that is caused to be naturally circulating by taking advantage of the buoyancy of air bubbles (for example, refer to Japanese Patent Laid-Open No. 61-129094). The method is an energy conservation precision process for filtrating highly contaminated liquids such as an activated sludge processed fluid in place of an ultrafiltration method that involves forcibly supplying a fluid to be processed to a membrane module by mechanical circulating means such as a pump and circulating.

Membrane modules for use in such immersion type membrane filtration methods are generally called immersion type filtration membrane modules and are exclusively a hollow fiber module and a flat sheet module (for example, see "Report on Commercialization of Small-Size Domestic Wastewater Processing Apparatus that Introduces a Membrane Processing Method, 1992 to 1995 Edition," Japan Education Center of Environmental Sanitation). Here, a hollow fiber module is fabricated by collecting numerous hollow fiber membranes with both outside and inside diameters of a few millimeters and fixing both ends. The module can filtrate a fluid to be processed by reducing the inside pressure of the hollow fiber membrane and passing the fluid to be processed from the outside into the inside thereof. On the other hand, a flat sheet module comprises a plurality of flat sheet membranes set like a bag. It can filtrate a fluid to be processed by reducing the inside pressure of the flat sheet membrane and passing the fluid to be processed from the outside into the inside thereof. Incidentally, in a hollow fiber module, why a fluid to be processed is rendered to pass from the outside to the inside of the hollow fiber membrane is that, because of the inside diameter of the hollow fiber membrane being almost the same as the size of materials to be filtrated and activated sludge, contained in a fluid to be processed, passage of the fluid to be processed from the inside to the outside of the hollow fiber membrane raises the possibility of the hollow fiber membrane being clogged and closed, and that air bubbles hardly pass through the inside of the hollow fiber membrane leading to the difficulty of natural circulation of the fluid to be processed. On the other hand, in a flat sheet module, passage of a fluid to be processed from the outside to the inside of the flat sheet membrane is likely to form, due to air bubbles, an upward-moving stream of the fluid to be processed required for rendering the fluid to be processed to naturally circulate.

When comparing the hollow fiber membrane with the flat sheet module, the hollow fiber module has a larger membrane area per volume than the flat sheet module, and thus can enhance the volume efficiency. In other words, for a hollow fiber module and a flat sheet module with the same membrane area, the hollow fiber module can be made more compactly. In contrast, a flat sheet module is large in flux (filtration flow rate per unit area of membrane) as compared with a hollow fiber module, and therefore it can perform immersion type membrane filtration more efficiently than the hollow fiber module. Therefore, an immersion type membrane filter apparatus utilizing these immersion type filtration membrane modules is substantially difficult to conduct miniaturization as well as enhancing the filtration efficiency at the same time.

In addition, in these immersion type filtration membrane modules, the flux is increased with increasing air bubble amount to be supplied, and so the energy cost for supplying air bubbles is increased in order to enhance the filtration efficiency by attaining a specified amount of flux. Also, in the immersion type membrane filter apparatus using a hollow fiber module, the increase of the volume of air bubbles to be supplied requires ease of the air bubbles being passed by setting large the clearance between hollow fiber membranes, and thus it becomes difficult to enhance the volume efficiency of the hollow fiber module.

The object of the present invention is to realize an immersion type membrane filter apparatus being a small size as well as being capable of economically enhancing the filtration efficiency.

DISCLOSURE OF THE INVENTION

An immersion type membrane filter apparatus of the present invention is an apparatus for obtaining filtrate by filtrating a fluid to be processed stored in a storage bath. The apparatus comprises a filtration module and an air bubbles supply device for supplying air bubbles to the filtration membrane module. The filtration membrane module includes a group of tubular membranes containing a plurality of tubular membranes having on the inner surfaces thereof the function of filtrating the fluid to be processed and having a protrusion partially formed on the outer periphery thereof. The group of tubular membranes is disposed within a columnar housing vessel having a discharge port for the filtrate and is supported by both the ends of the housing vessel. The filtration membrane module is capable of being immersed in the fluid to be processed in the storage bath in such a way that the tubular membranes are opened in the vertical direction. The air bubbles supply device is disposed beneath the filtration membrane module within the storage bath.

Here, the discharge port of the housing vessel is placed, for example, in such a way that the water head pressure of a fluid to be processed stored in the storage bath is capable of discharging the filtrate. Alternatively, this immersion type membrane filter apparatus is, for example, further equipped with means for setting the pressure of the discharge port at a negative pressure.

The tubular membrane for use in the aforementioned immersion type membrane filter apparatus is, for example, provided with a filtration membrane layer formed like a cylinder and a support membrane layer having liquid permeability for imparting shape keeping property to the filtration membrane layer, with the crushing pressure being set at least at 20 kPa. Here, the filtration membrane layer is, for example, composed of a microfiltration membrane. This tubular membrane may further be provided with a reinforcing layer having liquid permeability disposed on the outer periphery of the support membrane layer. In this case, the support membrane layer and the reinforcing layer are preferably formed by using a polyester resin-based unwoven cloth. The inside diameter of the tubular membrane is preferably set at from 3 to 15 mm. In addition, the ratio (A/B) of the wall thickness A to the outside diameter B of the tubular membrane is preferably set at from 0.025 to 0.1.

In addition, the protrusion partially formed on the outer periphery of the tubular membrane normally has a height of 0.02 to 0.2 mm. Furthermore, the protrusion is preferably spirally formed, with the axis of the filtration membrane layer being the center thereof.

Furthermore, the plurality of the tubular membranes may, for example, form the group of tubular membranes integrally knitted using a connecting thread in a plane and parallel configuration.

The group of filtration membranes housed in the housing vessel is normally maintained at both ends of the housing vessel by means of a resin. In this case, the housing vessel preferably possesses at least one of a convex portion and a concave portion on the inner periphery of the both ends.

A filtration membrane module for use in an immersion type membrane filter apparatus of the present invention normally has spacers for creating clearances between the discharge port and the group of tubular membranes in the housing vessel. Preferably, this filtration membrane module normally uses a tubular membrane having an inside diameter of 3 to 15 mm, and is set such that the packing rate of tubular membranes expressed by Equation (I) below is at least 0.7:

$$\text{Packing rate} = \frac{N\pi d_o^2}{4S} \quad (I)$$

wherein N is the number of tubular membranes contained in the group of tubular membranes, $d_0$ is the outside diameter of the tubular membrane, and S is the cross-sectional area of the inside, perpendicular to the axial direction, of the housing vessel.

Additionally, the above-mentioned spacer is normally preferably set in such a way that the ratio of the portion area of the spacer to the cross-sectional area of the inside equipped with the spacer, perpendicular to the axial direction, of the housing vessel is from 3 to 10%.

Also, in a filtration membrane module for use in an immersion type membrane filter apparatus of the present invention, the housing vessel may be provided with a columnar water-collecting tube having fluid-passing holes and an outer column disposed with space on the outer peripheral of the water-collecting tube, with the group of tubular membrane being disposed between the water-collecting tube and the outer column, the water-collecting tube having the aforementioned discharge port. Preferably, such a filtration membrane module uses a tubular membrane having an inside diameter of 3 to 15 mm and is fabricated so that the ratio ($d_s/S_1$) of the outside diameter $d_s$ of the water-collecting tube to the cross-sectional area $S_1$ perpendicular to the axial direction between the water-collecting tube and the outer column is set at from 0.3 to 1 $m^{-1}$. Also, the packing rate of the tubular membranes expressed by Equation (II) below is preferably set at least at 0.8:

$$\text{Packing rate} = \frac{N\pi d_o^2}{4S_1} \quad (II)$$

wherein N is the number of tubular membranes contained in the group of tubular membranes, and $d_0$ is the outside diameter of the tubular membrane.

In a filtration membrane module of this type, a group of tubular membranes is normally placed between the water-collecting tube and the outer column with a distance from the water-collecting tube. In addition, the water-collecting tube and the outer column normally have a cylindrical shape.

A housing vessel of a filtration membrane module for use in the aforementioned immersion type membrane filter apparatus may have a wall portion extending from the end of the air bubbles supply device side toward the air bubbles supply device.

When a fluid to be processed is filtrated by means of the above-mentioned immersion type membrane filter apparatus relating to the present invention, the fluid to be processed stored in the storage bath is passed from the down side toward the upside through each tubular membrane along with air bubbles supplied from the air bubbles supply device toward the filtration membrane module and is naturally circulates in the storage bath. At this time, part of the fluid to be processed is passed through the tubular membrane from the inside toward the outside and components to be filtrated contained in the fluid to be processed are collected on the inner surfaces of the tubular membrane having filtration function. In this manner, the components removed fluid processed (filtrate) is flowed into the housing vessel and then is discharged at the discharge port. The filtration membrane module used in this procedure uses a tubular membrane having filtration function on the inner surface, and thus has a large membrane area per volume as compared with conventional modules using a hollow fiber membrane or a flat sheet membrane. Therefore, the module is more readily miniaturized than conventional modules. In addition, immersion type membrane filtration processing by use of this filtration membrane module provides a larger flow rate per volume of filtration membrane module than the process where a hollow fiber module or a flat sheet module is employed, when the volume of air bubbles to be supplied is set at a level similar to that where a conventional module is used, on account of similar reasons. In other words, this filtration membrane module enables the enhancement of filtration efficiency while reducing energy required for air bubbles supply. Accordingly, an immersion type membrane filter apparatus of the present invention can be miniaturized as compared with a conventional one, and enables efficient and economical conduct of immersion type membrane filtration.

An immersion type membrane filter apparatus of the present invention may be provided with a guide column for guiding air bubbles from the air bubbles supply device toward the filtration membrane module. The guide column is capable of disposing a filtration membrane module on the upper portion thereof, wherein the shape and size of the inner circumference of the cross section, perpendicular to the axial direction, of the guide column is set substantially equal to the shape and size of the inner circumference of the outer circumferential portion of the cross section, perpendicular to the axial direction, of the housing vessel.

In this case, the air bubbles supply device preferably has a plurality of air bubbles spouting pores, and the air bubbles spouting pores may be placed in a configuration pattern such that the air bubbles at least at 30% of the average value of the air flow rate per tubular membrane, i.e. the total flow rate of air bubbles to be supplied to the filtration membrane module divided by the total number of tubular membranes, can be distributed to at least half the number of tubular membranes.

Alternatively, the air bubbles supply device is preferably provided with a plain body made of a elastic rubber body having substantially the same size and shape as the inner circumferential line of the outer circumferential portion in the cross section, vertical to the axial direction, of the guide column and the air supply device for supplying air from the lower portion relative to the plain body. The plain body preferably has on the whole face thereof a plurality of air bubbles spouting pores for spouting air bubbles, the spouting pores being capable of opening and shutting according to increase and decrease of the pressure of the air supplied from the air supply device. In this case, the air bubbles spouting pores of the plain body are preferably set to be able to spout air bubbles having a diameter of at least $\frac{1}{3}$ of the inside diameter of the tubular membrane.

When an immersion type membrane filter apparatus of the present invention is equipped with a guide column and an air bubbles supply device as stated above, air bubbles can uniformly be supplied to each of tubular membranes of the filtration membrane module, and thus the filtration flow rate in each tubular membrane is enhanced, leading to further enhancement of the filtration efficiency. Accordingly, this immersion type membrane filter apparatus is more readily miniaturized as compared with conventional apparatuses and also can conduct immersion type membrane filtration more efficient and economical.

In particular, when a device equipped with a plain body made of an elastic rubber body as mentioned above is used as an air bubbles supply device, the elastic force contracts this plain body to shut the air bubbles spouting pores, when the supply of air from the air supply device is stopped, i.e. when the body does not undergo the pressure of the air from the air supply device. For this reason, this air bubbles supply device prevents effectively the blockage of the air bubbles spouting pores due to contamination components contained in a fluid to be processed, thereby enabling stably the supply of air bubbles.

In addition, an immersion type membrane filter apparatus of the present invention may further comprise a filling material bed containing a filling material and disposed between the filtration membrane module and the air bubbles supply device, for guiding the air bubbles with dispersion from the air bubbles supply device toward the filtration membrane module. In this case, the filling material bed is preferably set to be able to disperse air bubbles from the air bubbles supply device in such a way that air bubbles at least at 30% of the average value of the air flow rate per tubular membrane, i.e. the total flow rate of air bubbles to be supplied from the air bubbles supply device divided by the total number of tubular membranes, can be distributed to at least half the number of tubular membranes. Furthermore, the filling material used here is normally a porous hollow cylindrical material having an outside diameter of 5 to 50 mm and a length of 5 to 50 mm. This hollow cylindrical material is, for example, a microorganism carrier.

When an immersion type membrane filter apparatus of the present invention is provided with a filling material bed as stated above, air bubbles from the air bubbles supply device is raised in a fluid to be processed, and then is supplied to the filtration membrane module subsequent to passing through the filling material bed. Here, the air bubbles from the air bubbles supply device are disturbed when passing through the filling material bed and dispersed, and then can equally be supplied to each tubular membrane of the filtration membrane module. As a result, in the filtration membrane module, the filtration flow rate is increased leading to further enhancement of the filtration efficiency of the fluid to be processed. In addition, the filling material bed can disperse air bubbles from the air bubbles supply device and at the same time capture a variety of contaminants contained in the fluid to be processed. Because of this, tubular membranes constituting the filtration membrane module undergoes the suppression of blockage due to contaminants and thus enables stable maintenance of filtration efficiency.

Furthermore, when the filling material bed contains as the filling material porous hollow cylindrical materials as mentioned above and also the hollow cylindrical materials are a microorganism carrier, the efficiency of immersion type membrane filtration processing is maintained even though a fluid to be processed is microorganism-containing material such as an activated sludge processed fluid of domestic wastewater. In other words, in this case, because microorganisms contained in the fluid to be processed is captured by the hollow cylindrical material and maintained, the quality of processed liquid is scarcely lowered even if the fluid to be processed is abruptly flowed in. For this reason, clogging of the tubular membrane is suppressed, the efficiency of the immersion type membrane filter apparatus is maintained.

An immersion type membrane filter apparatus of the present invention may further be provided with a filtrate discharge pathway extending from the discharge port of the housing vessel and a backwashing device for flowing the filtrate in the filtrate discharge pathway backwards while pressurizing it via the discharge port into the housing vessel. This backwashing device is equipped with, for example, an air supply device and pressurizing means for applying the pressure of air coming from the air supply device to the filtrate within the filtrate discharge pathway in the discharge port direction. In this case, the backwashing device is preferably further provided with a back-flow rate setting device for setting the amount of filtrate that is caused to flow backwards into the housing vessel at least at 200 ml per square meter of membrane area of tubular membranes housed within the housing vessel. Here, the back-flow rate setting device is, for example, a quantity float valve. In addition, air from the air supply device is preferably set so that the air can also be supplied to the air bubbles supply device.

When an immersion type membrane filter apparatus of the present invention is equipped with a backwashing device as mentioned above, the tubular membranes are pressurized from the outside toward the inside by the filtrate flowing backwards through the discharge port into the housing vessel and are thereby washed. Namely, in the tubular membranes, filtrated components deposited on the inner surface thereof, from a fluid to be processed, is removed by the filtrate. For this reason, the filtration membrane module can recover filtration performance and thus can maintain filtration performance. Therefore, the immersion type membrane filter apparatus in this case can efficiently perform the filtration processing of a fluid to be processed over extended periods of time.

The immersion type membrane filtration method of the present invention is a method for obtaining filtrate by filtrating a fluid to be processed stored in a storage bath. The method comprises a step of disposing in a storage bath a filtration membrane module which is provided with a group of tubular membranes containing a plurality of tubular membranes having on the inner surfaces thereof the function of filtrating the fluid to be processed and having a protrusion partially formed on the outer periphery thereof being disposed within a columnar housing vessel having a discharge port, and which is supported at both ends of the housing vessel, in such a way that the tubular membranes are opened in the vertical direction; a step of storing the fluid to be processed in the storage bath and immersing the filtration membrane module in the fluid to be processed; and a filtrating step of filtrating the fluid to be processed and then discharging the filtrate from the discharge port while naturally circulating the fluid to be processed from the down side toward the upside of the tubular membranes by supplying air bubbles from beneath to the filtration membrane module.

In this immersion type membrane filtration method, the water head pressure of the fluid surface of the fluid to be processed and the discharge port preferably cause the filtrate to be discharged from the discharge port. Alternatively, preferably, by setting the pressure at the discharge port at a negative pressure, the filtrate is discharged from the discharge port.

In the immersion type membrane filtration method of the present invention, the supply of air bubbles from beneath to the filtration membrane module immersed in a fluid to be processed in a storage bath allows the fluid to be processed to pass from the down side toward the upside of each tubular membrane and to naturally circulate. At this time, part of the fluid to be processed passes through the tubular membrane from the inside toward the outside and at that time components to be filtrated contained in the fluid to be processed are captured by the inner surfaces of the tubular membrane having filtration function. In this manner, the processed fluid (filtrate) having removed therefrom components to be filtrated flows into the housing vessel and then discharged from the discharge port. The filtration membrane used in this case uses a tubular membrane having on the inner surface thereof the function of filtrating a fluid to be processed, and thus has a large membrane area per volume as compared with a conventional module utilizing a hollow fiber membrane or a flat sheet membrane. In addition, in the immersion type membrane filtration method, when the volume of air bubbles to be supplied is set at a level similar to the case in a conventional module, the flow rate per volume of filtration membrane module becomes a larger than the flow rate where a hollow fiber module or a flat sheet module is employed, on account of similar reasons. Therefore, this immersion type membrane filtration method can reduce energy required for the supply of air bubbles to thereby economically enhance the filtration efficiency.

The immersion type membrane filtration method of the present invention may further include a backwashing step of flowing backwards filtrate to be discharged from the discharge port into the housing vessel via the discharge port with pressurization. In this case, a filtrating step and a backwashing step are preferably repeated periodically. Here, the pressure when the filtrate is made to flow backwards by pressurization is normally preferably set at least at a filtration pressure in the filtrating step. Additionally, the amount of filtrate to be flowed backwards into the housing vessel is preferably set at least at 200 ml per square meter of membrane area of tubular membranes housed within the housing vessel.

When a backwashing step as mentioned above is conducted in the immersion type membrane filtration method of the present invention, the tubular membranes are pressurized from the outside toward the inside by filtrate to be flowed backwards into the housing vessel through the discharge port and are thereby washed. In other words, in the tubular membranes, components to be filtrated of the fluid to be processed deposited on the inner surface thereof are removed by the filtrate. Hence, the filtration membrane module can recover filtration performance and thus maintain the filtration performance. Accordingly, this immersion type membrane filtration method can efficiently conduct filtration processing of a fluid to be processed over extended periods of time.

Furthermore, a fluid to be processed to be filtrated by the immersion type membrane filtration method of the present invention is, for example, an activated sludge processed fluid of domestic wastewater.

A tubular membrane of the present invention filtrates a fluid to be processed by means of the immersion type membrane filtration method. The tubular membrane is provided with a cylindrically formed filtration membrane layer and a support membrane layer being disposed on the outer periphery of the filtration membrane layer and having liquid permeability for imparting shape keeping property to the filtration membrane layer. The tubular membrane has a protrusion partially formed on the outer periphery thereof. The crushing pressure of the tubular membrane is set at least at 20 kPa. Here, the filtration membrane layer is comprised of, for example, a microfiltration membrane. This tubular membrane may further be provided with a reinforcing layer having liquid permeability disposed on the outer periphery of the support membrane layer. In this case, the support membrane layer and the reinforcing layer are preferably formed by using a polyester resin-based unwoven cloth. The inside diameter of the tubular membrane is normally preferably set at from 3 to 15 mm. In addition, the ratio (A/B) of the wall thickness A to the outside diameter B of the tubular membrane is normally preferably set at from 0.025 to 0.1.

In addition, the aforementioned protrusion normally has a height of 0.02 to 0.2 mm. Furthermore, the protrusion is preferably spirally formed, with the axis of the filtration membrane layer being the center thereof.

In a tubular membrane of the present invention, when a fluid to be processed is made to pass through the inside toward the outside of a cylindrical formed filtration membrane layer, components to be filtrated contained in the fluid to be processed are captured by the filtration membrane. Thus, the processed fluid from which components to be filtrated are removed can be discharged toward the outside from the support membrane layer side. Here, the filtrated components accumulate on the inner surface of the filtration membrane layer to form a cake layer. However, this cake layer can be removed from the filtration membrane layer by pressurizing the tubular membrane from the outside toward the inside for backwashing. At this time, inasmuch as the crushing pressure is set at least at 20 kPa, the tubular membrane can keep the shape thereof against a pressure applied during the backwashing, thereby enabling an increase in longevity.

A group of tubular membranes of the present invention is for filtrating a fluid to be processed by means of the immersion type membrane filtration method. It comprises a plurality of tubular membranes having on the inner surfaces thereof the function of filtrating a fluid to be processed and having a protrusion partially formed on the outer periphery thereof, the plurality of tubular membranes being disposed flatly and parallel and being integrally knitted using a connection thread. The tubular membrane used in this case is preferably provided with a cylindrically formed filtration membrane layer and a support membrane layer having liquid permeability for imparting shape keeping property to the filtration membrane layer, the support membrane layer being disposed on the outer periphery of the filtration membrane layer.

A group of tubular membranes of the present invention has a plurality of tubular membranes that are integrally knitted as stated above using a connection thread, and so clearances due to the connection thread are formed between the tubular membranes. This clearance can be a pathway of a processed fluid (filtrate) that has passed through the tubular membrane from the inside to the outside. Therefore, conduct of immersion type membrane filtration using this group of tubular membranes lowers the filtration resistance in each tubular membrane, thereby enabling the high filtration flow rate. In addition, in this group of tubular membranes, numerous tubular membranes can integrally handled, and so filtration membrane modules for immersion type membrane filter apparatuses using tubular membranes can efficiently be manufactured.

An immersion type membrane filter module of the present invention, kept immersed in a fluid to be processed, can filtrate the fluid to be processed. The module comprises a group of tubular membranes containing a plurality of tubular membranes having filtration function on the inner surfaces thereof and having a protrusion partially formed on the outer periphery thereof, a columnar housing vessel housing the tubular membranes and having a discharge port for discharging to the outside a processed fluid that has passed through the tubular membrane, and support portions which are placed on both the ends of the housing vessel and which support both the ends of the group of tubular membranes in the direction of length while opening both the ends of the tubular membranes. In this module, the support portions are normally made of a resin, and the housing vessel preferably has on the both ends at least either one of a convex portion and a concave portion.

An immersion type filtration membrane module of the present invention may be further provided with spacers for creating clearances between the discharge port and the group of tubular membranes. In this case, preferably, the immersion type filtration membrane module uses a tubular membrane having an inside diameter of 3 to 15 mm, and is also set in such a way that the packing rate of tubular membranes expressed by Equation (I) below is at least 0.7:

$$\text{Packing rate} = \frac{N\pi d_o^2}{4S} \quad \text{(I)}$$

wherein N is the number of tubular membranes contained in a group of tubular membranes, $d_o$ is the outside diameter of the tubular membrane, and S is the cross-sectional area of the inside, perpendicular to the axial direction, of the housing vessel.

In this case, the spacer is preferably set such that the ratio of the portion of the spacer to the cross-sectional area of the inside, perpendicular to the axial direction, of the housing vessel is from 3 to 10%.

In addition, a tubular membrane for use in this immersion type filtration membrane module is normally preferably set such that the ratio (A/B) of the wall thickness A to the outside diameter B is from 0.025 to 0.1.

Furthermore, the shape of the housing vessel used in this module is normally a cylinder shape or a squared column shape.

An immersion type filtration membrane module regarding another aspect of the present invention can likewise filtrate a fluid to be processed while being kept immersed in the fluid to be processed. The module comprises a columnar housing vessel equipped with a columnar water-collecting tube having fluid-passing holes and an outer column disposed at intervals on the outer periphery of the water-collecting tube; a group of tubular membranes which is placed between the water-collecting tube and the outer column and which contains a plurality of tubular membranes having filtration function on the inner surfaces and having a protrusion partially formed on the outer periphery thereof; and support portions which are disposed on both the ends of the housing vessel and which hold both the ends of the group of tubular membranes in the direction of the length while opening both the ends of the tubular membranes. The water-collecting tube has a discharge port for discharging a fluid that has passed through the tubular membrane to the outside.

Preferably, this module uses a tubular membrane having an inside diameter of 3 to 15 mm and is set in such a way that the ratio ($d_s/S_1$) of the outside diameter $d_s$ of the water-collecting tube to the cross-sectional area $S_1$, perpendicular to the axial direction, between the water-collecting tube and the outer column is set at from 0.3 to 1 m$^{-1}$. Also, the packing rate of tubular membranes expressed by Equation (II) below is preferably set at least at 0.8:

$$\text{Packing rate} = \frac{N\pi d_o^2}{4S_1} \quad \text{(II)}$$

wherein N is the number of tubular membranes contained in the group of tubular membranes, and $d_0$ is the outside diameter of the tubular membrane.

In addition, a tubular membrane used in this case is preferably set such that the ratio (A/B) of the wall thickness A to the outside diameter B is from 0.025 to 0.1.

Furthermore, in this module, the group of tubular membranes is normally preferably disposed between the water-collecting tube and the outer column at a distance from the water-collecting tube. Also, the water-collecting tube and the outer column preferably have a cylindrical shape.

When immersion type membrane filtration is conducted by means of a filtration membrane module of the present invention, a fluid to be processed that is supplied while naturally circulating in each tubular membrane forming a group of tubular membranes passes through the tubular membrane from the inside toward the outside. At this time, components to be filtrated contained in the fluid to be processed are captured by the inner surface of the tubular membrane having filtration function. The processed fluid (filtrate) from which the components to be removed have been removed flows into the housing vessel and then is discharged from the discharge port toward the outside. This filtration membrane module uses tubular membranes as mentioned above, and thus has a large membrane area per volume as compared with a conventional filtration membrane module, i.e. a hollow fiber module or a flat sheet module. As a result, it is more readily miniaturized than the conventional modules. In addition, immersion type membrane filtration processing by use of this filtration membrane module provides a larger flow rate per volume of filtration membrane module than the processing where a hollow fiber module or a flat sheet module is employed, when the volume of air bubbles to be supplied is set at a level similar to that where the conventional module is used, on account of similar reasons. Accordingly, a filtration membrane module of the present invention can reduce energy required for the supply of air bubbles, and therefore can conduct immersion type membrane filtration efficiently and economically.

Other objects and effects of the present invention will be clarified from detailed descriptions hereinafter.

BRIEF DESCRIPTION OF THE DRAWINGS

FIG. 44 is a diagram indicating the positions of the air bubbles spouting pores placed in the air bubbles supply device used in Comparative Experimental Example 1 in contrast to the positions of the air bubbles spouting pores placed in the air bubbles supply device used in Experimental Example 9.

BEST MODE FOR CARRYING OUT THE INVENTION

Figure 1:
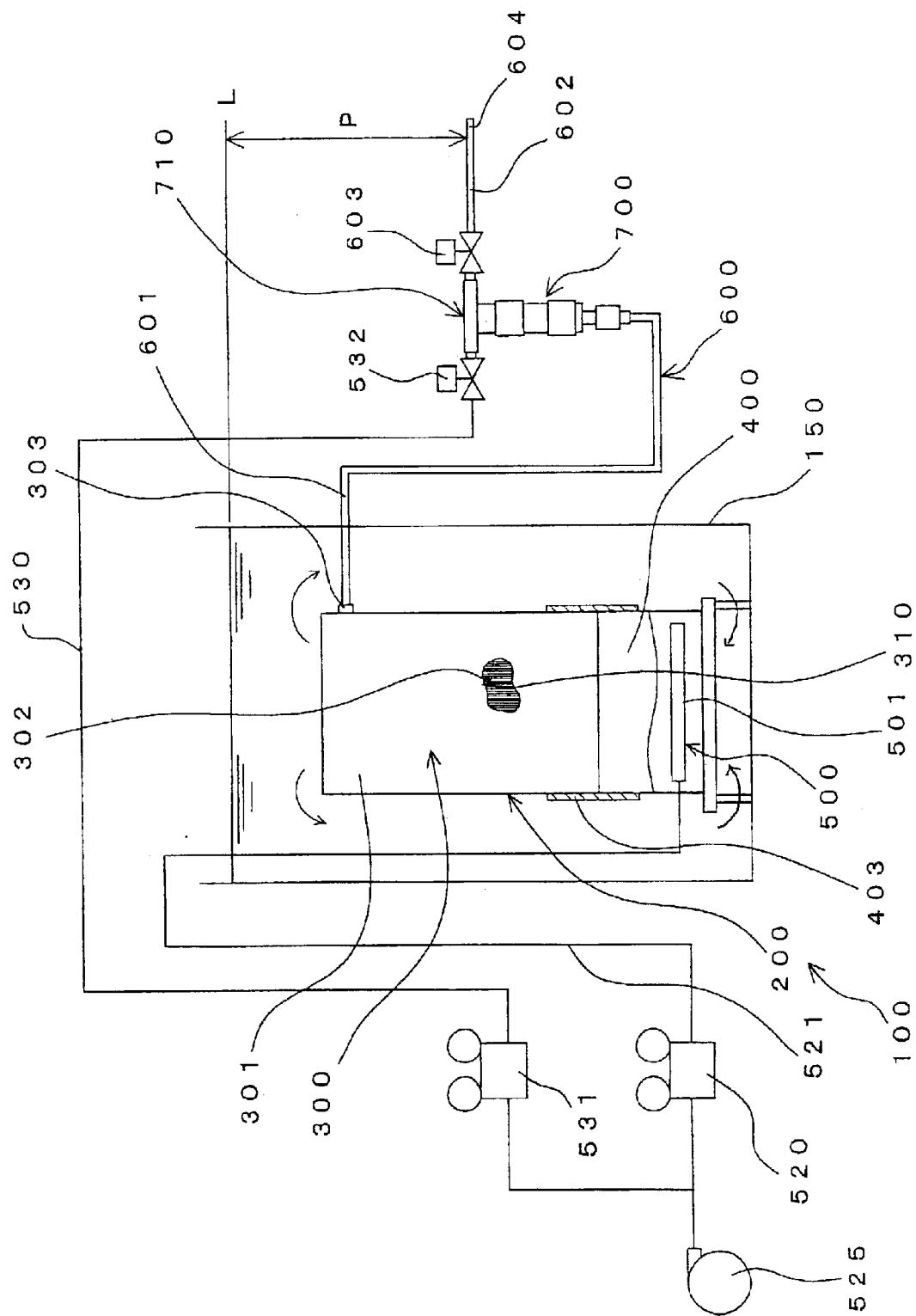
FIG. 1 is a schematic diagram of an immersion type membrane filtration system that adopts an immersion type membrane filter apparatus relating to an embodiment of the present invention.

Referring to FIG. 1, there will be described an immersion type membrane filtration system having adopted therein an immersion type membrane filter apparatus regarding an embodiment of the present invention. In the figure, an immersion type membrane filtration system 100 is primarily provided with a storage bath 150 and an immersion type membrane filter apparatus 200.

The storage bath 150 is formed in a vessel form having an opening at the top thereof and stores therein a fluid to be processed. In addition, the storage bath 150 is provided with a supply passage (not shown) of a fluid to be processed.

The immersion type membrane filter apparatus 200 is primarily provided with a filtration membrane module 300 disposed within the storage bath 150, a guide column 400 supporting the filtration membrane module 300 within the storage bath 150, an air bubbles supply device 500, a filtrate discharge pathway 600, and a backwashing device 700.

Figure 2:
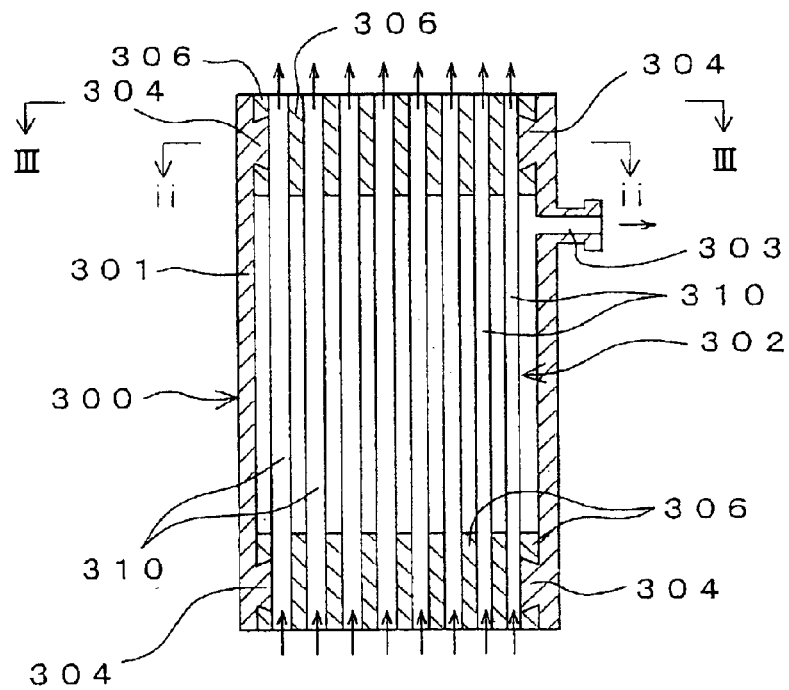
FIG. 2 is a longitudinal section of a filtration membrane module that is adopted for the aforementioned immersion type membrane filter apparatus.

The filtration membrane module 300, as shown in FIG. 2, is mainly equipped with a cylindrical housing vessel 301 and a group of tubular membranes 302 packed in this housing vessel 301. The housing vessel 301 is, for example, a resin member and has on the side thereof a discharge port 303 for discharging a processed fluid (filtrate) subsequent to filtration processing. In addition, the inner periphery of the housing vessel 301 has at the upper and lower portions thereof spacers 304 for creating clearances between the group of tubular membranes 302 and the inner periphery of the housing vessel 301, the spacer 304 protruding toward the center.

Figure 3:
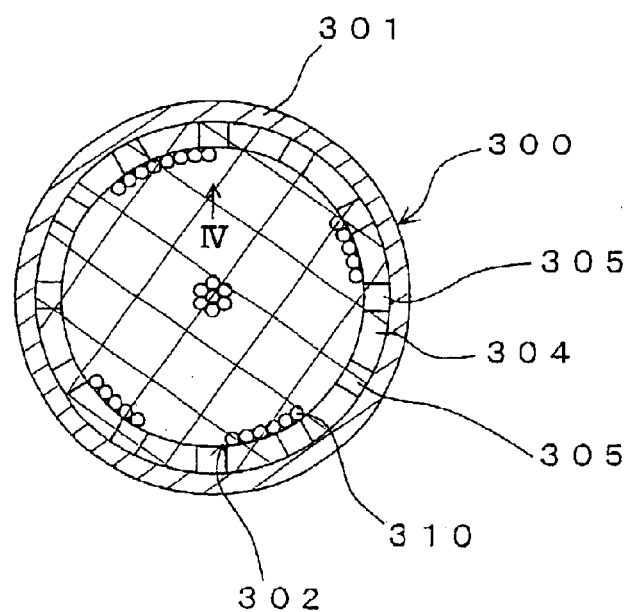
FIG. 3 is a diagram corresponding to the III—III section of the above-mentioned filtration membrane module in FIG. 2.
Figure 4:
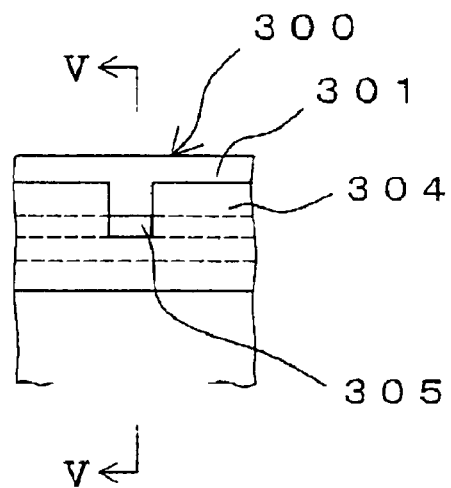
FIG. 4 is a diagram in the direction of arrow IV of FIG. 3.
Figure 5:
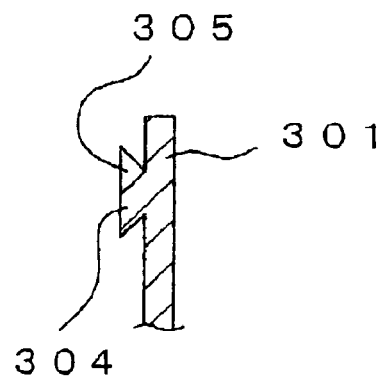
FIG. 5 is a V—V sectional view of FIG. 4.

The spacer 304 is formed into roughly a wedge shape in section shape that enlarges toward the center side of the housing vessel 301. Also, as illustrated in FIGS. 3, 4 and 5, it possesses a plurality of slits 305 formed at roughly regular intervals in the circumferential direction of the housing vessel 301. Additionally, the spacers 304, 304 placed at the upper and lower portions of the housing vessel are respectively set such that the protrusion distances from the inner periphery of the housing vessel 301 are the same.

In addition, it is preferable that the cross-sectional area of each spacer 304 is set to the ratio of 3 to 10% with respect to the cross-sectional area inside the housing vessel 301 (corresponding to a shaded portion in FIG. 3) in a cross-section perpendicular to the housing vessel 301 in the axial direction in the portion having the spacer 304 (cross-section at the central portion of the spacer 304 in the vertical direction, i.e., the cross-section taken along the ii—ii portion of FIG. 2). At the ratio less than 3%, clearances are hard to form in the inner periphery of the housing vessel 301, in particular between the discharge port 303 and the group of tubular membranes 302. As a result, within the housing vessel 301, a processed fluid (filtrate) having passed through a tubular membrane 310 described below declines in flowability leading to the possibility of decrease in the filtration flow rate. In contrast, at the rate exceeding 10%, the ratio of occupation of the group of tubular membranes 302 within the housing vessel 301 decreases, thus resulting in the possibility of decline in filtration efficiency of a fluid to be processed.

The group of tubular membranes 302 is a group containing a large number of slenderly, cylindrically formed tubular membranes 310. Each of the tubular membranes 310 is compactly collected along the opening direction of the housing vessel 301 in parallel to each other while being prevented from contacting with each other (i.e. making intervals to each other) by a protrusion 320 mentioned below. The upper and the lower ends of this group of tubular membranes 302 are maintained and fixed integrally to both ends of the housing vessel 301 by means of support portions 306 fabricated using a resin material such as an urethane resin while keeping an open state of both ends of each of the tubular membranes 310. In addition, both ends of the housing vessel 301 are liquid-tightly sealed by the support portions 306.

Figure 6:
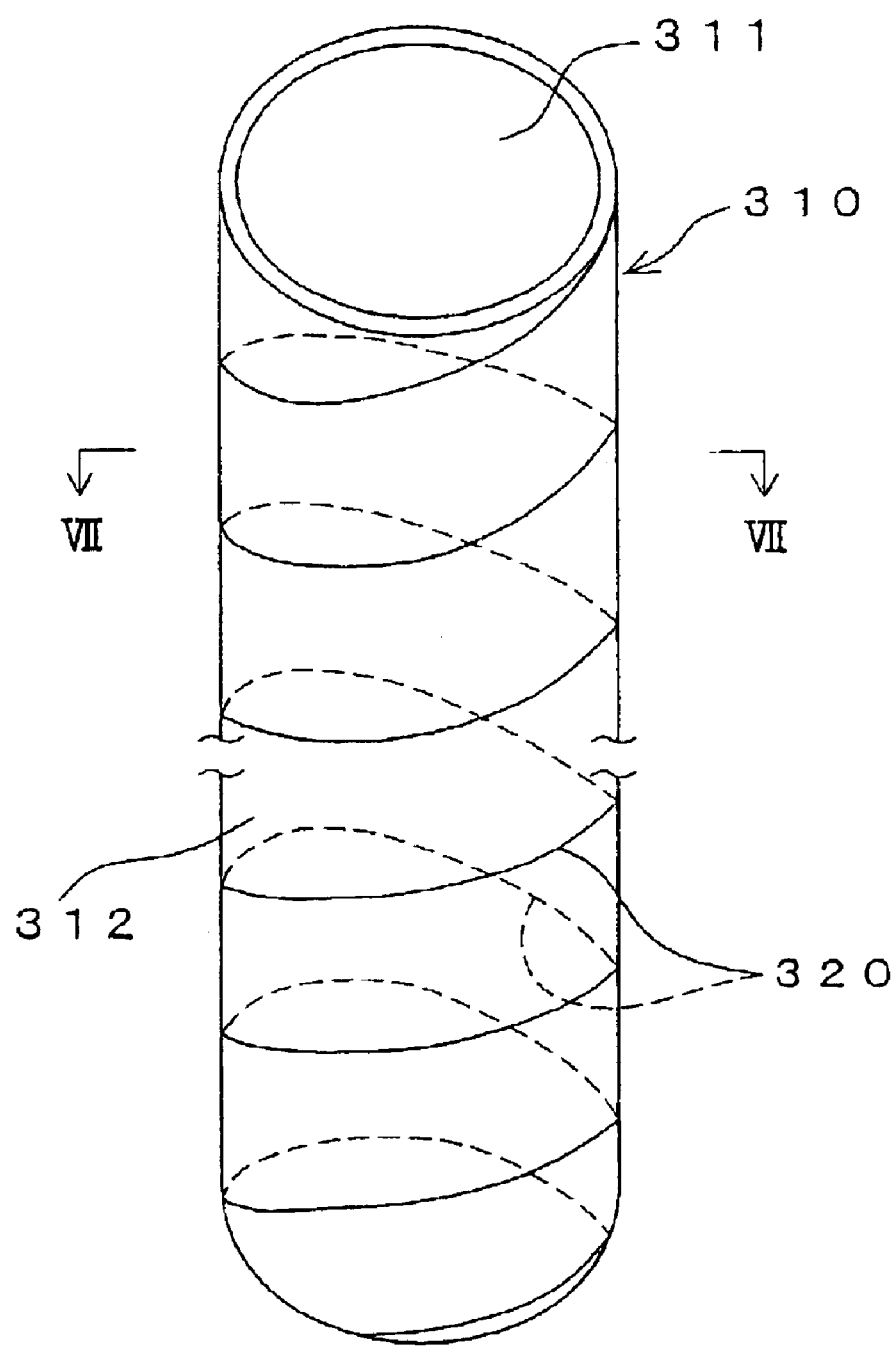
FIG. 6 is a perspective view of a tubular membrane for use in the aforementioned filtration membrane module.
Figure 7:
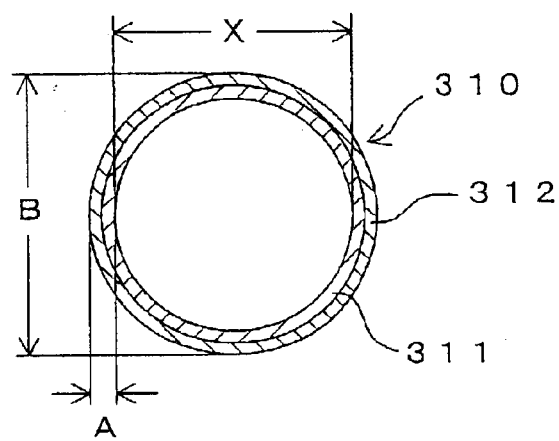
FIG. 7 is a VII—VII longitudinal end view of FIG. 6.

The tubular membranes 310 constituting the above-mentioned group of tubular membranes 302 is cylindrically formed as illustrated in FIG. 6 and, as shown in FIG. 7, possesses a two-layer structure comprising a filtration membrane layer 311 and a support membrane layer 312 in the order from the inner periphery side toward the outer periphery side.

The kind of filtration membrane layer 311 can be selected as appropriate according to the type of components to be filtrated to be removed from the fluid to be processed and is not particularly limited. For example, when particulates such as microorganisms need to be removed, a microfiltration membrane is employed. A microfiltration membrane is defined as, for example in JIS K 3802 "a membrane used for separating by filtration particulates and microorganisms of about 0.01 to several micrometers." In this case, it is preferable that a porous membrane having numerous pores with a pore size exceeding 0.04 μm and being capable of practical filtration at a pressure of 20 kPa or less is utilized. In this connection, such a microfiltration membrane is not particularly limited in kind, but known various types, for example, organic polymer membranes such as a cellulose membrane and polyolefin base resin membrane can be employed.

A support membrane layer 312 imparts shape keeping property to the above-mentioned filtration membrane layer 311 and sets the filtration membrane layer 311 in a cylindrical shape. This support membrane layer 312 can use a variety of types if they are porous materials having liquid permeability. Normally, it preferably uses an unwoven cloth of polypropylene resin or polyester resin possessing firm preservation properties, excellent strength, excellent chemical resistance, high thermal resistance and cost efficiency, and particularly preferably uses an unwoven cloth of polyester resin.

In addition, the tubular membrane 310, as illustrated in FIG. 6, has the protrusion 320 continuously formed in a helical fashion, with the axis of the filtration membrane layer 311 being the center thereof, on the outer periphery and thus on the outer periphery of the support membrane layer 312. This protrusion 320 prevents the tubular membranes 310 from coming in contact with each other in the group of tubular membranes 302 and enhances the flowability of a processed fluid (filtrate) having passed through each of the tubular membranes 310 within the housing vessel 301.

For example, when the height of the protrusion 320 is set at 0.05 mm and if the effective length of the tubular membrane 310 is for example 70 cm, an area of at least $0.005 \times 70 = 0.35$ cm$^2$ is secured between two neighboring tubular membranes 310. Accordingly, the presence of a large number of such clearances in the group of tubular membranes 302 remarkably reduces the resistance to the flow of filtrate within the housing vessel 301, thereby significantly increasing the flowability of the filtrate.

The inside diameter (X in FIG. 7) of the tubular membrane 310 as mentioned above is normally preferably set at from 3 to 15 mm, more preferably at from 5 to 10 mm. At the inside diameter less than 3 mm, the filtration of a fluid to be processed, particularly a highly contaminated fluid to be processed, readily suffers clogging of the tubular membrane 310 due to a variety of components to be filtrated or contaminants contained in the fluid to be processed, thus leading to the possibility of difficulty in keeping stable, continuous filtration processing for extended periods of time. In contrast, at the inside diameter above 15 mm, the number of the tubular membranes 310 to be contained in the group of tubular membranes 302 packable in the housing vessel 301 having a limited volume is decreased, and therefore the filtration area (effective membrane area) per volume of filtration membrane module 300 becomes small. As a result, a resulting decrease in filtration flow rate may create difficulty in conducting an efficient filtration processing of a fluid to be processed, with miniaturization of the filtration membrane module 300.

In addition, in the tubular membrane 310, the ratio (A/B) of the wall thickness A to the outside diameter B is preferably set at from 0.025 to 0.1, more preferably set at from 0.03 to 0.1. Incidentally, the wall thickness and outside diameter of the tubular membrane 310 in this case includes the thickness (height) of the aforementioned protrusion 320. At this ratio below 0.025, application of pressure to the tubular membrane 310 from the outside leads to easy collapse of the tubular membrane 310. This dislodges a cake layer including components to be filtrated accumulated on the inner periphery of the tubular membrane 310 in the step of filtrating the fluid to be processed. Therefore, when a backwashing operation is conducted by applying a pressure to the tubular membrane 310 from the outside, the tubular membrane 310 collapses, thus creating a substantial difficulty in backwashing the tubular membrane 310. In addition, for attaining a pressure resistance of 20 kPa or more, the ratio is preferably set at 0.03 or more. On the other hand, at this ratio above 0.1, the filtration area (effective membrane area) per volume of filtration membrane module 300 becomes small. This drops the filtration flow rate, which may create difficulty in conducting an efficient filtration processing of a fluid to be processed, with miniaturization of the filtration membrane module 300.

In the above-mentioned tubular membrane 310, the ratio of the wall thickness to the outside diameter is specified as stated above, and so the crushing pressure is large. In particular, when this ratio is 0.03 or more, the crushing pressure of the tubular membrane 310 can be set at an upper limit of 20 kPa or more of the filtration pressure normally set in the immersion type filtration process, and thus can be set at least at 20 kPa. Incidentally, the term "crushing pressure" refers to a pressure when the tubular membrane 310 starts to collapse in the case where a pressure is applied from the outside of the tubular membrane 310 (i.e. the support membrane layer 312 side) to the inside thereof.

In this connection, the crushing pressure of the tubular membrane 310 is proportional to the third power of the ratio of the wall thickness to the outside diameter (See, for example, "Handbook for Charts of Machinery Design," written by Fujio Oguri, 9-2, Kyoritsu Shuppan Co., Ltd.), which means that the crushing pressure is increased as the ratio is increased.

Furthermore, the height of the protrusion 320 is normally preferably set at from 0.02 to 0.2 mm. At the height of the protrusion 320 below 0.02 mm, the tubular membranes 310 readily come into contact with each other in the group of tubular membranes 302, thus probably making it difficult to increase the flowability of filtrate. In contrast, at the ratio above 0.2 mm, the number of the tubular membranes 310 contained in the group of tubular membranes 302 and thus the number of tubular membranes 310 packable in the housing vessel 301 of the filtration membrane module 300 is decreased, and thereby the filtration area per volume of filtration membrane module 300 becomes small. This drops the filtration flow rate, which may create difficulty in conducting an efficient filtration processing of a fluid to be processed, with miniaturization of the filtration membrane module 300. Incidentally, the height of the protrusion 320 in this case refers to the extent of protrusion from the surface of the support membrane layer 312.

The height of the protrusion 320 can be selected as appropriate according to the kind of fluids to be processed as well. For example, when the filtration flow rate of a fluid to be processed is comparatively small like that of an activated sludge fluid, the height of the protrusion 320 is preferably set to be smaller from the viewpoint of securing the filtration area. On the other hand, where the filtration flow rate of a fluid to be processed is relatively large as in water of rivers, the height of the protrusion 320 is preferably set to be higher from the viewpoint of increasing the flowability of the filtrate. In this connection, if the height of the protrusion 320 is within the above-mentioned range, even for a large-scale case where the filtration membrane module 300 has a membrane area of about 100 m$^2$, the clearances, formed by the protrusion 320, between the tubular membranes 310 rarely have a large resistance to the flow of filtrate for most fluids to be processed.

Figure 8:
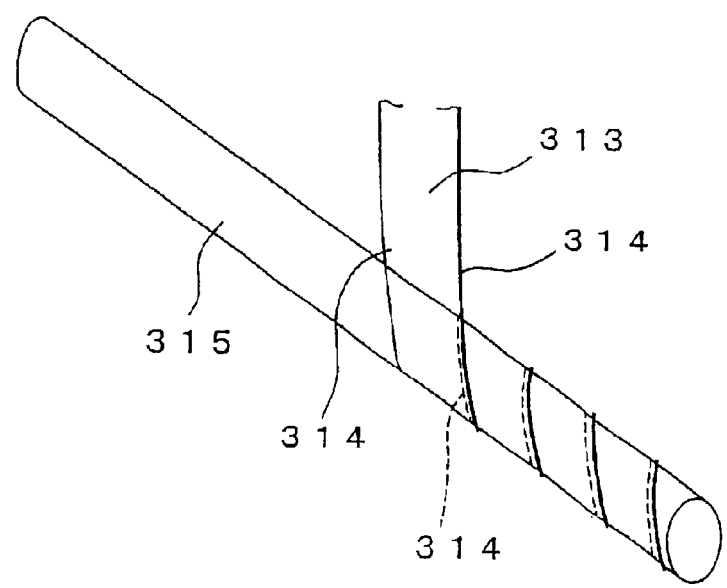
FIG. 8 is a diagram showing a step of producing the aforementioned tubular membrane.

Next, referring to FIG. 8 there will be described an example of a method for producing the above-mentioned tubular membranes 310.

First, a large-length and small-width (tape-like) composite membrane 313 fabricated by integrally laminating the filtration membrane layer 311 on the support membrane layer 312 is prepared. Then, this composite membrane 313, as illustrated in FIG. 8, is wound spirally around a separately prepared columnar rod 315 in such a way that the support membrane layer 312 side becomes the surface side while overlapping both ends 314 in the widthwise direction. Both the ends 314 overlapped in this manner are bonded with each other using an adhesive or the ultrasonic adhesion method to be able to a target tubular membrane 310. Incidentally, a method of producing such a tubular membrane 310 is already well-known, for example, in Japanese Patent Laid-Open No. 56-35483.

In a manufacturing step of such a tubular membrane 310, both the ends 314 made by overlapping the composite membrane 313 come to form the aforementioned helical protrusion 320. During this time, adjusting as appropriate the extent of overlap of the composite membrane 313 or the adhesion method enables setting of the height of the protrusion 320 within the above-mentioned range.

Figure 9:
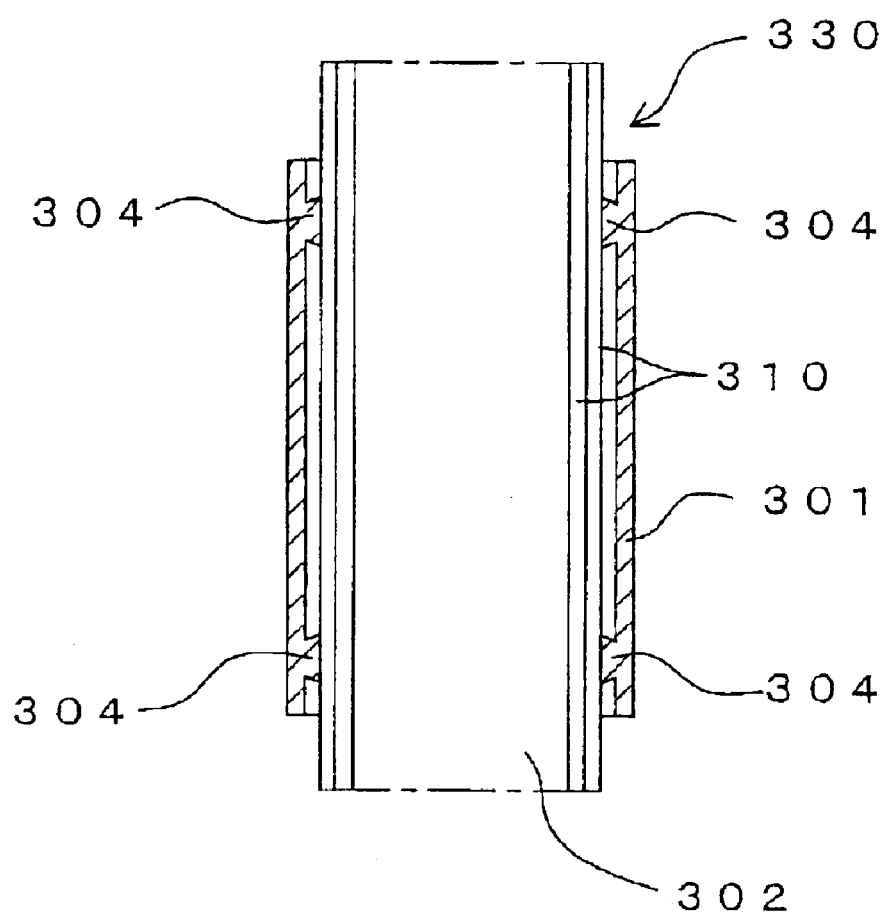
FIG. 9 is a diagram indicating a step of producing the aforementioned filtration membrane module.

Now, with reference to FIGS. 9 and 10, there will be described a method of producing the above-mentioned filtration membrane module 300. This filtration membrane module 300 can be readily manufactured by a simple step as compared with a flat sheet module or a hollow fiber module in which the handling of the flat sheet membrane or the hollow fiber membrane requires close attention as well as the production requiring numerous manufacturing steps.

First, a large number of the tubular membranes 310 are bundled up to form the group of tubular membranes 302. Separately, the housing vessel 301 is prepared and, as shown in FIG. 9, the group of tubular membranes 302 is inserted into this housing vessel 301 to form a combination 330 of the housing vessel 301 and the group of tubular membranes 302. In this combination 330, the group of tubular membranes 302 is set in such a way that both ends of the group of tubular membranes 302 are projected from both ends of the housing vessel 301. Additionally, both ends of the tubular membranes 310 constituting the group of tubular membranes 302 are rendered to be closed by, for example, heat sealing.

Figure 10:
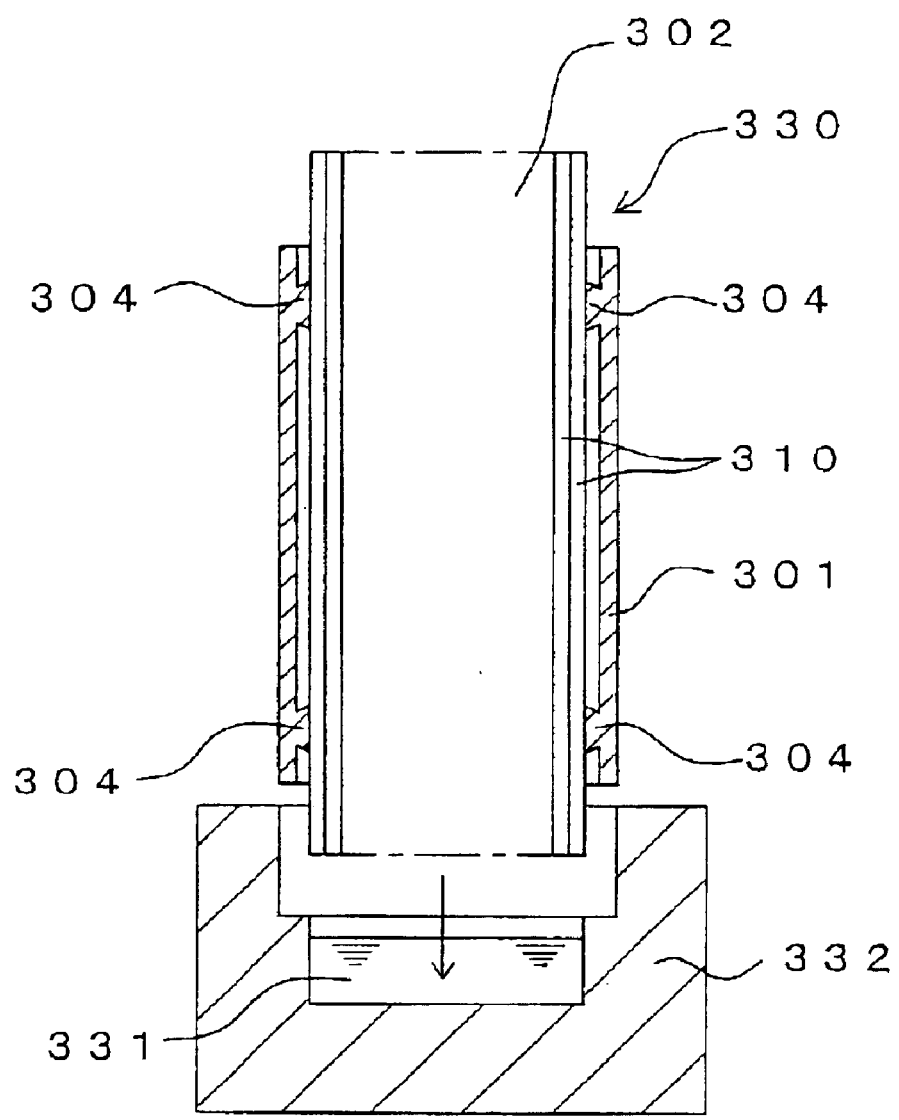
FIG. 10 is a diagram indicating another step of producing the aforementioned filtration membrane module.

Thereafter, as shown in FIG. 10, one end of the aforementioned combination 330 is soaked in a mold 332 containing an uncured resin 331 such as an uncured urethane resin. Here, the uncured resin 331 is loaded in between the tubular membranes 310 constituting the group of tubular membranes 302 as well as uniformly reaching the inner periphery of the housing vessel 301 past the slits 305 placed in the spacers 304, thus completely closing the opening portion of the housing vessel 301. In this state, the resin 331 is cured completely and then the mold 332 is removed. A similar operation is performed on the other end of the combination 330 as well. In this way, the group of tubular membranes 302 comes to be maintained and fixed to the housing vessel 301.

Then, cured resin portions protruded from both the ends of the housing vessel 301 are cut off along with both the ends of the tubular membranes 310, so that the remaining resin portions form the support portions 306. Also, both ends of each of the tubular membranes 310 are opened to obtain the target filtration membrane module 300. In this filtration membrane module 300, both ends of the housing vessel 301 without both ends of each of the tubular membranes 310, as stated earlier, are liquid-tightly closed by means of the cured resin and thus the support portions 306. These support portions 306 are likely to be strongly fixed to the inner periphery of the housing vessel and come to cause the group of tubular membranes 302 to stably be maintained and fixed to the housing vessel 301 because the spacer 304 of the housing vessel 301 is formed convexly in the form of a wedge as described above. In other words, the spacers 304 not only simply create clearances between the group of tubular membranes 302 and the inner periphery of the housing vessel 301, but also are capable of functioning as the convex portion for stably fixing the support portions 306 and the housing vessel 301.

Furthermore, in both ends of the housing vessel 301, the inner periphery thereof may have, for example, a groove-like concave portion in ring form. In this case, the resin 331 flows into the concave portion to more strongly fix the support portions 306 and the housing vessel 301.

Usable materials for fabricating the support portion 306 include, in addition to urethane resins as stated above, other thermosetting resins such as epoxy resins and hot melt adhesives. However, when a large-scale filtration membrane module 300 is manufactured, the amount of resin material to be used needs to be set in quantity. In this case, a material having a relatively slow reaction rate and having a relatively small elasticity is preferably used in order to suppress excessive heat liberation and to suppress contraction by curing. In addition, a hot melt adhesive that is cut off in the above-mentioned manufacturing step can be recovered for reuse. In this respect as well, the filtration membrane module 300 is advantageous as compared with a hollow fiber module in which a hot melt adhesive is difficult to utilize due to a relatively high viscosity thereof.

Further, in FIG. 2 and so forth concerning the filtration membrane module 300, for convenience in understanding, there are stressed the thickness of the tubular membrane 310, clearances between the tubular membranes 310, clearances between the tubular membranes 310 and the inner periphery of the housing vessel 301, etc. In addition, for readily understanding diagrams, in FIG. 2, the tubular membranes 310 are expressed in a smaller number than in an actual number and only part of the tubular membranes 310 is presented in FIG. 3.

The guide column 400, as shown in FIG. 1, supports the filtration membrane module 300 within the storage bath 150 in a stand-up state such that the tubular membranes 310 open in the vertical direction. The guide column 400 is a cylindrical resin member and the inner circumferential line in the cross section vertical to the axial direction thereof is set to be substantially the same size and shape as the inner circumferential line of the outer circumferential portion in the cross section vertical to the axial direction of the housing vessel 301. In other words, the guide column 400 has the same inside diameter and outside diameter as those of the housing vessel 301.

Figure 11:
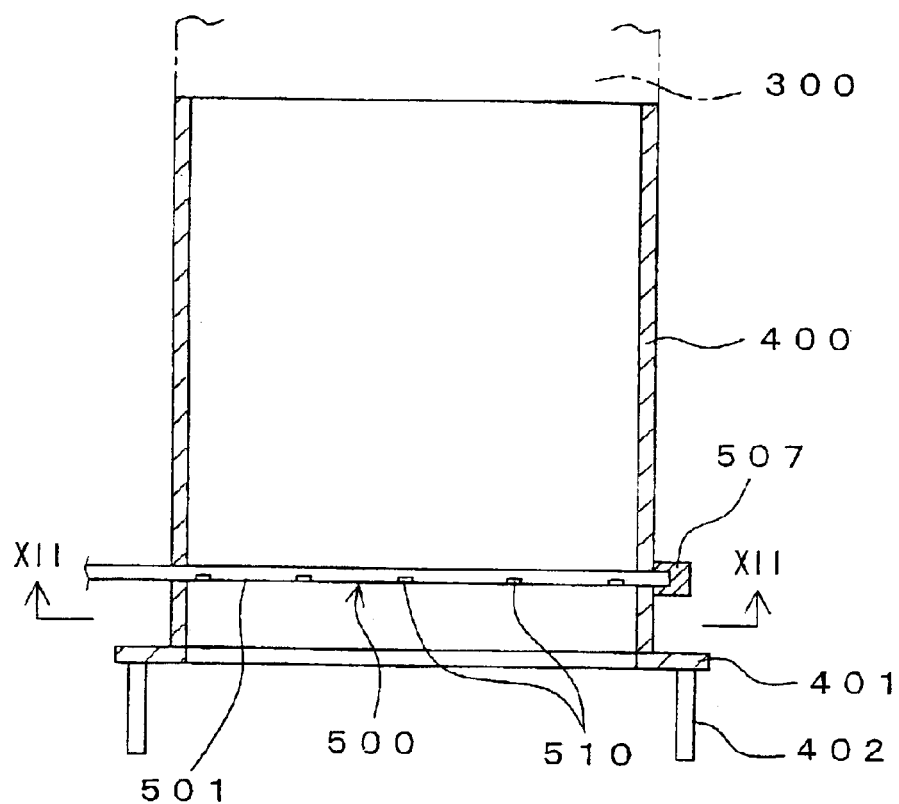
FIG. 11 is a longitudinal section of a guide column adopted for the aforementioned immersion type membrane filter apparatus.

In the lower edge of the guide column 400, as illustrated in FIG. 11, a flange 401 equipped with a leg 402 is placed. The guide column 400 is disposed in the bottom of the storage bath 150 by means of the legs 402 and on the upper portion thereof is placed the filtration membrane module 300. Here, the guide column 400 and the filtration membrane module 300 are connected to each other by means of a cylindrical socket 403 (FIG. 1). The filtration membrane module 300 is supported using this guide column 400, and thus is positioned separately from the bottom of the storage bath 150.

The air bubbles supply device 500 is intended for supplying air bubbles to the filtration membrane module 300. As illustrated in FIG. 1, it is disposed within the guide column 400 beneath the filtration membrane module 300 in the storage bath 150.

Figure 12:
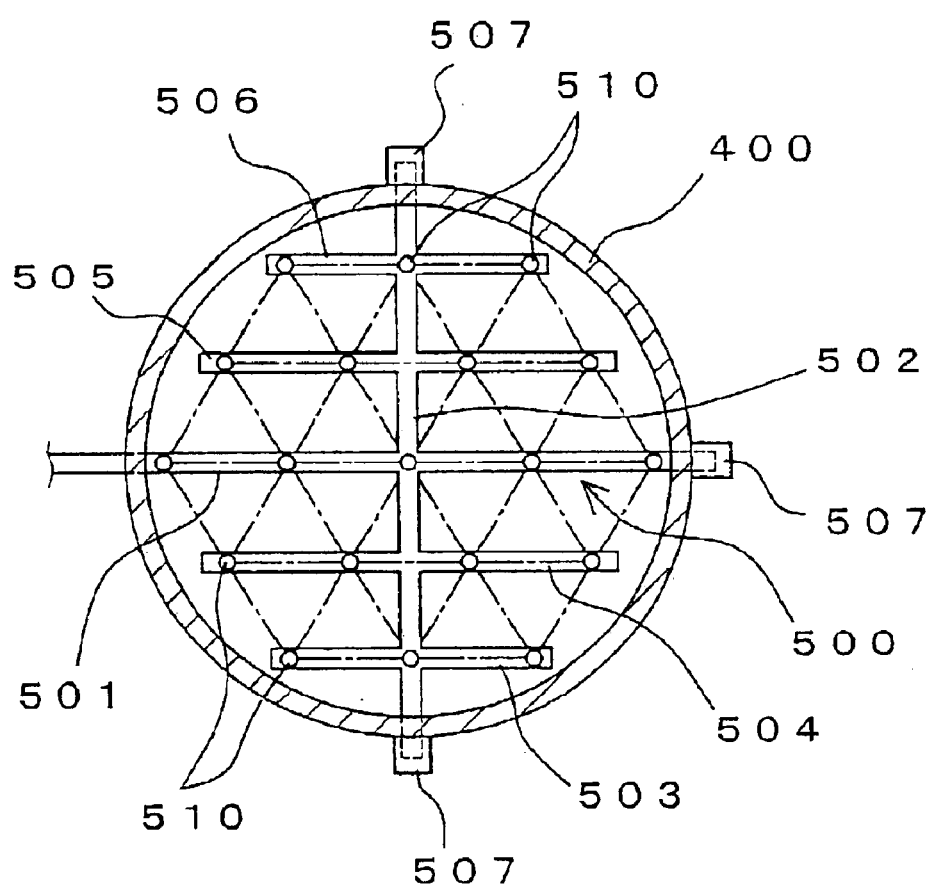
FIG. 12 is a diagram corresponding to the VII—VII section of the above-mentioned guide column in FIG. 11.

Referring to FIGS. 11 and 12, the air bubbles supply device 500 will be described in detail. The air bubbles supply device 500 primarily possesses a first pipe 501, a second pipe 502, and four branch pipes 503, 504, 505 and 506. The first pipe 501 is placed horizontally such that it penetrates through the guide column 400 and passes through the center thereof within the guide column 400. One end of it is hermetically closed with a cap 507 in the outside of the guide column 400. Also, the second pipe 502 horizontally combines and intersects with the first pipe 501 at right angles, with both the ends of the second pipe 502 each penetrating the wall of the guide column 400 and being hermetically closed with the caps 507. In addition, the intersection of the first pipe 501 and the second pipe 502 coincides with the center of the guide column 400. Furthermore, the four branch pipes 503, 504, 505 and 506 combine with the second pipe 502 parallel and horizontally, with two pipes each being distributed to both sides of the first pipe 501. The branch pipes 504, 503 are placed at regular intervals from the first pipe 501. The branch pipes 505, 506 are also placed in the same fashion. Accordingly, the first pipe 501 and the four branch pipes 503, 504, 505 and 506 are disposed at regular intervals. Additionally, both the ends of the branch pipes 503, 504, 505 and 506 each extend toward near the inner periphery of the guide column 400 and hermetically closed with caps (not shown).

The first pipe 501 and the second pipe 502 combined with each other as mentioned above are communicated at the intersection. Also, the four branch pipes 503, 504, 505 and 506 are communicated with the second pipe 502 at the intersections with the second pipe 502. As a result, the first pipe 501, the second pipe 502 and the four branch pipes 503, 504, 505 and 506 form a series of air flowing pathways.

In addition, the first pipe 501, the second pipe 502 and the four branch pipes 503, 504, 505 and 506 possess a plurality of air bubbles spouting pores 510 for spouting air in the form of bubbles (with FIG. 12 showing, for example, 19 air bubbles spouting pores 510). These air bubbles spouting pores 510 each are opened toward the bottom face of the storage bath 150. Also, as illustrated in FIG. 12, they are placed in a closest packing pattern in the inside (horizontal face of the inside of the guide column 400) of the section vertical to the axial direction of the guide column 400. In other words, each air bubbles spouting pore 510 is dispersedly disposed at regular intervals in the horizontal face of the inside of the guide column 400 in such a way that the air bubbles spouting pore 510 is positioned at each vertex of numerous equilateral triangles as indicated by an alternate long and short dash line in FIG. 12.

In addition, the material of the pipes 501 to 506 constituting the aforementioned air bubbles supply device 500 is not particularly restricted if it does not prevent the circulating flow of a fluid to be processed caused by an ascending flow of air bubbles being emitted from the air bubbles spouting pores 510. However, the pipe is normally preferably a cylindrical plastic pipe in terms of cost efficiency, processability, and easiness of installation to the guide column 400.

To the first pipe 501 of the aforementioned air bubbles supply device 500, as illustrated in FIG. 1, is connected an air supply device 525 such as an air compressor by way of an air supply pathway 521 equipped with a secondary pressure/flow rate adjusting valve 520. This renders air from the air supply device 525 to be supplied to the first pipe 501 as well as the second pipe 502 and the four branch pipes 503, 504, 505 and 506, communicated therewith.

The filtrate discharge pathway 600 is intended for discharging filtrated fluid, i.e. filtrate, processed in the filtration membrane module 300 into the outside. It is provided with a first discharge pathway 601 coming from the discharge port 303 of the filtration membrane module 300 and a second discharge pathway 602 for discharging the filtrate through a backwashing device 700. The second discharge pathway 602 possesses a first electromagnetic valve 603, with the tip portion 604 thereof being located below the surface L of a liquid to be processed stored in the storage bath 150. This generates a water head pressure P between the tip portion 604 and the surface L of the fluid to be processed.

Figure 13:
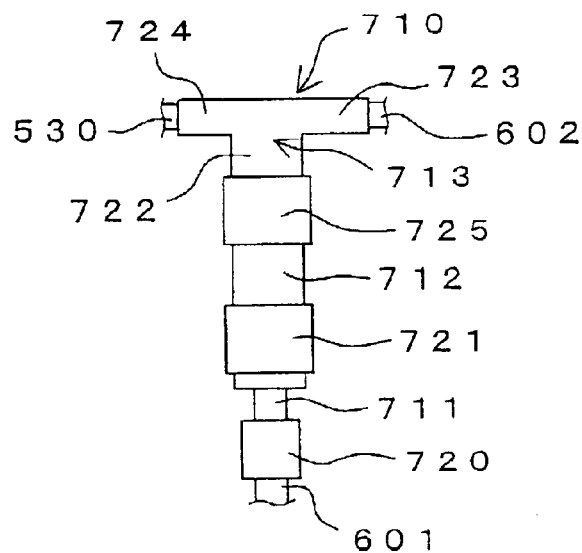
FIG. 13 is a schematic diagram of a quantitative float valve constituting a backwashing device adopted for the aforementioned immersion type membrane filter apparatus.
Figure 14:
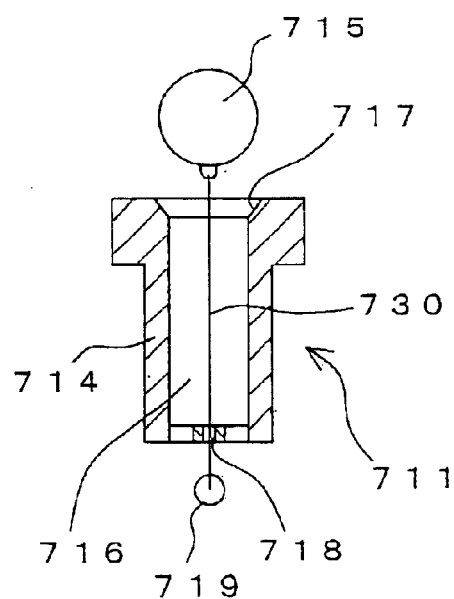
FIG. 14 is a sectional view of a float valve portion constituting the aforementioned quantitative float valve.

The backwashing device 700 is provided with a quantitative float valve 710 (an example of back-flow rate setting devices) and is placed in the filtrate discharge pathway 600 and thus between the first discharge pathway 601 and the second discharge pathway 602. The quantitative float valve 710, as illustrated in FIG. 13, is primarily equipped with a float valve portion 711, a fluid amount setting pipe 712 and a three-way pipe 713. The float valve portion 711, as shown in FIG. 14, is equipped with a float receiver 714 and a float 715. The float receiver 714 is a columnar member with a pathway 716 of filtrate being formed in the axial direction thereof. It possesses a taper portion 717 expanding toward the outside direction at the upper end of the pathway 716. Also, the lower end of the pathway 716 has an opening 718 in the center and is fabricated in net form. On the other hand, the float 715 is floatable in filtrate and is spherically formed so as to be capable of closing the pathway 716 when it makes contact with the aforementioned taper portion 717. The float 715 is equipped with a polyester resin filament 730 that extends downward. The filament 730 extends downward through the opening 718 beneath the float receiver 714 and has a float stopper 719 at the lower end.

The above-mentioned float valve portion 711, as illustrated in FIG. 13, renders the lower end of the float receiver 714 to be connected to the tip of the first discharge pathway 601 of the filtrate discharge pathway 600 by means of a socket 720.

The fluid amount setting pipe 712 is intended for controlling the volume of filtrate residing within the quantitative float valve 710 and is communicated with the upper end of the float receiver 714 using a socket 721.

The three-way pipe 713 possesses a first connection portion 722 having a slightly larger aperture and two slightly smaller connection portions compared with the first connection portion 722, i.e. a second connection portion 723 and a third connection portion 724. The first connection portion 722 is connected to the upper end side of the fluid amount setting pipe 712 by means of a socket 725. In addition, the second connection portion 723 is connected to the second discharge pathway 602 of the filtrate discharge pathway 600. Furthermore, the third connection portion 724 is communicated with a backwashing air supply pathway 530 (an example of pressurizing means), which branches from the above-mentioned air supply pathway 521 and extends. Additionally, the backwashing air supply pathway 530 has a secondary pressure/flow rate adjusting valve 531 and a second electromagnetic valve 532 in the order from the air supply pathway 521 side (FIG. 1).

Now, with reference to FIG. 1, there will be described a method for filtrating a fluid to be processed using the aforementioned immersion type membrane filter apparatus 200 (immersion type membrane filtration method).

First, into the storage bath 150 is supplied and stored a fluid to be processed containing components to be filtrated including micro-gel, colloid components and microorganisms, for example, an activated sludge fluid to be processed of domestic wastewater. This event makes the filtration membrane module 300 disposed within the storage bath 150 to be immersed in the fluid to be processed.

Then, the second electromagnetic valve 532 of the backwashing air supply pathway 530 is set closed and the first electromagnetic valve 603 of the second discharge pathway 602 is set open. In this state, when air is supplied to the air bubbles supply device 500 from the air supply device 525 via the air supply pathway 521, this air spouts from the air bubbles spouting pores 510 in the form of bubbles. These air bubbles rise in the fluid to be processed while receiving a guide by the guide column 400 and are almost uniformly supplied to each of the tubular membranes 310 contained in the filtration membrane module 300.

The buoyancy of air bubbles supplied to the filtration membrane module 300 renders the fluid to be processed stored in the storage bath 150 to pass through each of the tubular membranes 310 from the lower side upwards as indicated by arrows in FIG. 2. During this time, part of the fluid to be processed is made to filtrate and pass through the tubular membranes 310 from the inside toward the outside by the above-mentioned water head pressure P. Also, components to be filtrated contained in the fluid to be processed are captured by the filtration membrane layers 311 constituting the inner periphery of the tubular membranes 310 to be dislodged from the fluid to be processed. The processed fluid from which the components to be filtrated are dislodged and thus the filtrate passes through clearances between the tubular membranes 310 within the housing vessel 301 and then is discharged from the discharge port 303 into the first discharge pathway 601. The filtrate discharged into the first discharge pathway 601 passes through the quantitative float valve 710 and then is continuously discharged into the outside from the tip portion 604 of the second discharge pathway 602.

At this time, although the float 715 along with the float stopper 719 is made floated by the filtrate that is passing to set the pathway 716 in a open state, the float stopper 719 makes contact with the opening 718 to prevent the float 715 from separating from the float receiver 714 at a specified distance or more. Such a series of filtration conducts causes the fluid to be processed within the storage bath 150 to naturally circulate through the filtration membrane module 300 from the lower side upwards, as indicated by the arrows in FIG. 1.

In the filtrating step as mentioned above, each of the tubular membranes 310 has the protrusion 320 on the outer periphery as stated earlier, and so it hardly makes contact with the neighboring tubular membranes 310 within the filtration membrane module 300 to form effective clearances for passing the filtrate between the tubular membranes 310. Therefore, the filtration membrane module 300 equipped with these tubular membranes 310 can enhance the flowability of the filtrate within the housing vessel 301, thereby readily discharging the filtrate at the discharge port 303 without a hitch.

In addition, in the filtrating step as mentioned above, components to be filtrated contained in a fluid to be processed gradually deposit on the inner periphery of the tubular membranes 310 and thus the surface of the filtration membrane layers 311 to form cake layer, thereby lowering the filtration performance of the tubular membranes 310. In this case, backwashing operation by means of the backwashing device 700 dislodges the cake layers of the tubular membranes 310 to be capable of recovering the filtration performance. For the conduct of backwashing operation, first, the second electromagnetic valve 532 of the backwashing air supply pathway 530 is set open and the first electromagnetic valve 603 of the second discharge pathway 602 is set closed. This operation adjusts the flow rate of air from the air generating device 530 at the secondary pressure/flow rate adjusting valve 531 and flows the air within the backwashing air supply pathway 530 to render it to reach the quantitative float valve 710. The air having reached the quantitative float valve 710 pushes out the filtrate within the quantitative float valve 710 by means of a pressure (air pressure) corresponding to a flow rate adjusted at the secondary pressure/flow rate adjusting valve 531 toward the first discharge pathway 601. This causes the filtrate within the quantitative float valve 710 and the first discharge pathway 601 to backflow from the discharge port 303 into the filtration membrane module 300 and to pass with the pressure corresponding to the above-mentioned air pressure through each of the tubular membranes 310 from the outside toward the inside. As a result, in each of the tubular membranes 310, the deposit layers (cake layers) accumulated on the inner periphery due to components to be filtrated are dislodged and thus cleaned.

In the backwashing step as mentioned above, in the quantitative float valve 710, when filtrate within the fluid amount setting pipe 712 and the three-way pipe 713 is pushed out, the float 715 makes contact with the taper portion 717 of the float receiver 714 due to its own weight to close the pathway 716. Because of this, the amount of filtrate flowing back into the filtration membrane module 300 from the discharge port 303 comes to be limited to the amount specified by the volume of the quantitative float valve 710 and the first discharge pathway 601. Accordingly, the amount of filtrate used for backwashing can be set arbitrarily by adjusting the volume of the quantitative float valve 710, particularly the volume of the fluid amount setting pipe 712.

In addition, in the aforementioned backwashing step, the flow rate of air to be set by the secondary pressure/flow rate adjusting valve 531 is preferably set in such a way that the air pressure corresponding to the flow rate becomes at least the above-mentioned filtration pressure based on the water head pressure P, or the above-mentioned filtration pressure or higher based on the water head pressure P. At this flow rate of air (i.e. the aforementioned air pressure) less than the filtration pressure, cleaning of the tubular membranes 310 become insufficient, and thereby the filtration performance of the tubular membranes 310 is sometimes difficult to recover.

In this regard, inasmuch as the tubular membranes 310 has a large crushing pressure as stated earlier (for example, with the crushing pressure being set at least at 20 kPa), they are not crushed by the application of pressure during the backwashing operation as described above. The membranes 310 maintain the shapes thereof subsequent to backwashing processing and therefore are continually applicable to the filtration step as mentioned above. In other words, this immersion type membrane filter apparatus 200, after the backwashing operation as described above, can continually conduct filtration processing when the second electromagnetic valve 532 of the backwashing air supply pathway 530 is set closed and the first electromagnetic valve 603 of the second discharge pathway 602 is set open.

Therefore, in the aforementioned immersion type membrane filtration system 100, periodical repetitions of the above-mentioned filtration step and the backwashing step with the operations of the first electromagnetic valve 603 and the second electromagnetic valve 532 enables the recovery of filtration performance of the tubular membranes 310 without replacing the filtration membrane module 300, thereby permitting an efficient continuation of filtration processing of a fluid to be processed over extended periods of time.

In addition, in the immersion type membrane filter apparatus 200, the filtration membrane module 300 can be miniaturized as described in detail below and also the air supply device 525 is used for both the air supply source for the air bubbles supply device 500 and the air supply source for the backwashing device 700. Hence, the whole structure of the apparatus 200 can be miniaturized and also the apparatus 200 can carry out cost efficient filtration step and backwashing step.

Incidentally, in the aforementioned immersion type membrane filtration method, the first electromagnetic valve 603 and the second electromagnetic valve 532 may be manually run or may be automatically run using a timer.

Additionally, the above-mentioned immersion type membrane filter apparatus 200 is particularly effective in filtrating highly contaminated fluids such as an activated sludge fluid. It is also effectively utilizable for filtrating low contaminated fluids such as river water in addition to such a highly contaminated fluid. In other words, the immersion type membrane filter apparatus 200 does not depend on the kind of fluids to be processed, and is widely usable for filtrating a variety of fluids to be processed.

Next, comparing to the conventional filtration membrane module, the possibility of compaction and the cost efficiency of the filtration membrane module 300 using the tubular membranes 310 will be discussed. In addition, in this connection, the relationship between distribution states of air bubbles supplied to the filtration membrane module 300 from the air bubbles supply device 500 and filtration properties is also discussed for depicting in more detail an optimal configuration pattern of the air bubbles spouting pores 510 in the air bubbles supply device 500. Moreover, effective backwash conditions of the filtration membrane module 300 by means of the backwashing device 700 will be discussed.

Incidentally, by estimating scientifically the characteristics of the filtration membrane module 300 using the tubular membranes 310, many advantages over those of a hollow fiber module or a flat sheet module are found out. For example, they include:

1. the flow of all the air bubbles from the air bubbles supply device 500 can be utilizable due to enlarging parallel flows of cross-flows, 2. the material shift factor is large as compared with that of the conventional module mode and thus the flux (filtration flow rate per unit membrane area) is in principle large because of the pathways of air bubbles and a fluid to be processed being cylindrical, 3. the structure of the filtration membrane module 300 becomes compact because the tubular membranes 310 themselves constitute the pathways of air bubbles and a fluid to be processed, and 4. the pressure loss being small and the backwashing efficacy being large due to the inside diameter of the tubular membranes 310 being by far larger than that of hollow fiber membranes.

Recently, technologies for effectively removing contaminants contained in fluids to be processed have been greatly advanced, and so possibilities of realizing these advantages are being increased.

However, in order to show that the above-mentioned advantages are not limited to specific actual fluids, but are general and basical, first, it is necessary to analyze hydrodynamically the filtration properties of the filtration membrane module 300 using the tubular membranes 310 comparing with the conventional filtration membrane module and then to inspect the results by means of an appropriate model fluid. Doing so is thought to lead to the possibility of utilizing the same advantages in many actual fluids also. However, such an evaluation method is unknown, and therefore the properties of the filtration membrane module 300 are unknown in principle and scientifically as well. Further, even though such an evaluation method is established and thereby the advantages of the filtration membrane module 300 are proved generally and in principle, a designing method of realizing more effectively the advantages on the filtration membrane module 300 needs to be made concrete.

Analytical Estimation of the Properties of Filtration Membrane Modules

As seen in the "Report on Commercialization of Small-Size Domestic Wastewater Processing Apparatus that Introduces a Membrane Processing Method, 1992 to 1995 Edition," published by Japan Education Center of Environmental Sanitation referred in the description of "Background Art," fluxes are larger in the flat sheet module than in the hollow fiber module. For this reason, a flat sheet module has been selected as the conventional module for a comparison target.

Figure 15:
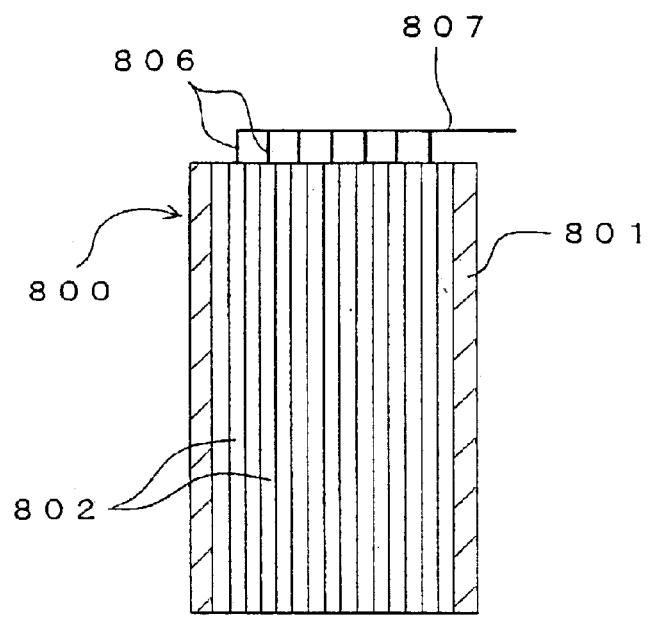
FIG. 15 is a partial sectional front view of a flat sheet module as a comparison example when analyzing the properties of the aforementioned filtration membrane module.
Figure 16:
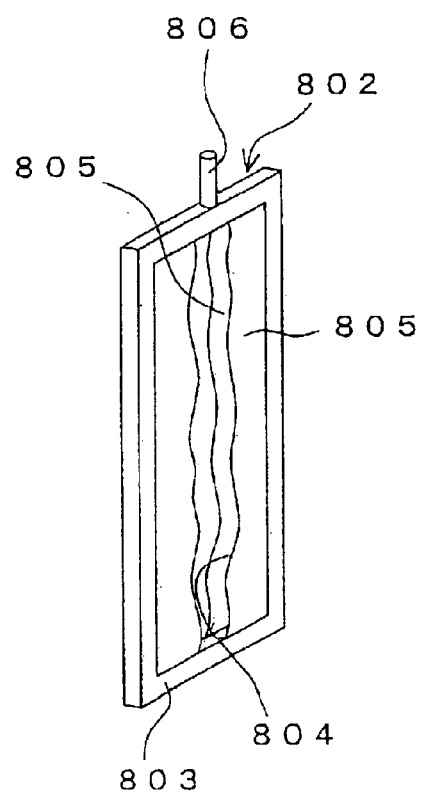
FIG. 16 is a partial cutaway perspective view of a membrane plate for use in the aforementioned flat sheet module.

For reference, referring to FIG. 15, there will be briefly described a flat sheet module as a comparison target. In the figure, a flat sheet module 800 is primarily provided with a housing vessel 801 and a number of membrane plates 802 disposed within this housing vessel 801. The housing vessel 801 is, for example, a squared column-like member having the upper and lower portions each opened. On the other hand, the membrane plate 802, as illustrated in FIG. 16, is primarily provided with a rectangular frame 803 and a pair of filtration membranes 805, 805 opposed to each other in a clearance 804 in the frame 803. This filtration membrane 805 is for example a microfiltration membrane. At the upper portion of the frame 803, a discharge port 806 of filtrate, communicating with the clearance 804, is fabricated. The discharge port 806 of each of the membrane plates 802 is normally, as shown in FIG. 15, connected to a discharge tube 807. Incidentally, this type of flat sheet module 800 is briefly explained in, for example, the "Water and Wastewater" Vol. 40, No. 3, 45 (1998), edited by the Research Association on High-Processing Clarifying Bathes Using Membrane Separation Technologies at Construction Research Institute in Japanese Ministry of Construction.

Such a flat sheet module 800 is placed in a storage bath 150 like the aforementioned filtration membrane module 300 to be made available for immersion type membrane filtration of fluids to be processed. In this case, a fluid to be processed together with air bubbles, flowing between the membrane plates 802, flows from the outside of the filtration membranes 805 to the inside thereof to thereby be filtrated. Then, the filtrate at this time passes through the clearance 804 and is discharged into a discharge tube 807 by way of the discharge port 806.

In Table 1, main properties of a filtration membrane module 300 as mentioned above (hereinafter, this filtration membrane module is sometimes expressed as the "tubular module") and a flat sheet module 800 as described above are summarized. Here, to avoid unnecessary complication, the lengths L's of the membranes of both modules have been set to be the same. For the same reason, with the areas for setting the modules, the areas occupied by the membrane portions are indicated excluding the thickness of the housing vessel 301 for the filtration membrane module 300 and the thickness of the frame 803 for the flat sheet module 800.

TABLE 1

| Module type | Membrane size | Number | Total membrane area | Module setting area | Flow rate of air |
|---|---|---|---|---|---|
| Tubular module | Tubular membrane size $d_i \times d_0 \times L$ | Number of tubular membranes N | $M_T = \pi d_i L N$ | $S_T = \pi d_0^2 N / 4\epsilon$ | $Q_T$ |
| Flat sheet module | Membrane plate size $W \times t \times L$ | Number of membrane plates n | $M_P = 2WLN$ | $S_P = W(d + t)n$ | $Q_P$ |

$d_i \times d_0$: Inside diameter of tubular membrane × outside diameter,
$\epsilon$: Packing rate,
$W \times t$: Membrane width of membrane plate × thickness
d: Interval between membrane plates
Common conditions: n, N >> 1

Incidentally, viscosities of actual fluids (fluids to be processed) to which immersion type membrane filtration is applied are a couple of mPa·s and more, and so a flow of a fluid to be processed within a module can be considered as a laminar flow for both the flat sheet module 800 and the filtration membrane module 300.

In cross-flow filtration for the parallel flow being a laminar flow, the filtration flow rate of the filtration membrane module 300 relative to the flat sheet module 800 is expressed as Equation (1) below: (For example, refer to the "Outline on Membrane Processing Technologies" by Nakagaki and Shimizu, First volume, Chapter 3, Fuji Technosystem Co., Ltd. (1991))

$$\frac{J_T}{J_P} = 2^{1-a-c} \frac{M_T}{M_P} \left(\frac{d}{d_i}\right)^{1-c} \left(\frac{d_i u_T}{d u_P}\right)^a \quad (1)$$

wherein J, M and u are, respectively, the filtration flow rate, the membrane area and the linear velocity of a parallel flow, and the subscripts T and P indicates the values for the filtration membrane module 300 and the flat sheet module 800, respectively. While the parallel flow consists of a mixture of flows of bubbles and a fluid, the flows are assumed to have the same moving velocity. d represents an interval between the membrane plates 802 of the flat sheet module 800 and $d_i$ represents an inside diameter of the tubular membrane 310 of the filtration membrane module 300.

Here, the exponents a and c each are ⅓ for the laminar flow. Therefore, substitution of this value gives Equation (2) below:

$$\frac{J_T}{J_P} = 1.26 \left(\frac{M_T}{M_P}\right) \left(\frac{d}{d_i}\right)^{1/3} \left(\frac{u_T}{u_P}\right)^{1/3} \quad (2)$$

Wherein assuming that bubbles are uniformly distributed to all the tubular membranes 310 for the filtration membrane module 300 and to between all the membrane plates 802 for the flat sheet module 800, linear velocities for parallel flows for the modules expressed by Equations (3) and (4) below, respectively, are derived:

$$u_T = \frac{u_{aT}}{2} \left\{1 + \sqrt{1 + \frac{2\rho_f g d_i^2}{\sigma_T \mu_f} \bigg/ \left(\frac{u_{aT}}{2}\right)}\right\} \quad \left[u_{aT} = \frac{4 q_{aT}}{\pi d_i^2}\right] \quad (3)$$

$$u_P = \frac{u_{aP}}{2} \left\{1 + \sqrt{1 + \frac{2\rho_f g d^2}{\sigma_P \mu_f} \bigg/ \left(\frac{u_{aP}}{2}\right)}\right\} \quad \left[u_{aP} = \frac{q_{aP}}{wd}\right] \quad (4)$$

Wherein $q_a$ is the flow rate of air in one flow pathway equivalent, and the flow rate of air per tubular membrane 310 for the filtration membrane module 300, and the flow rate of air per interval of membrane plate 802 having a width of w for the flat sheet module 800. Therefore, $u_a$ is the reduced linear velocity. $\rho_f$ and $\mu_f$ are, respectively, the density and the viscosity of a fluid to be processed. $\sigma$ is the dimensionless pressure loss coefficient, and 32 for the filtration membrane module 300, and 12 for the flat sheet module 800. g is the gravitational acceleration.

As shown in Table 2, the reduced linear velocity can be converted into the flow rate of air per unit area of membrane, or the total flow rate per module by means of a numerical value expressing the shape of each module.

TABLE 2

| Type | Tubular module | Flat sheet module | $q_M$: Flow rate of air per square meter of membrane |
|---|---|---|---|
| $q_M$ | $Q_T/(N\pi d_i L)$ | $Q_P/(2nWL)$ | $u_a$: Reduced linear velocity of air |
| $u_a$ | $4Q_T/(N\pi d_i^2)$ | $Q_P/(nWd)$ | Q: Flow rate of air per module |
| | | | L: Length of membrane |
| Conversion multiplier | $4L/d_i$ | $2L/d$ | N: Number of tubular membranes<br>n: Number of membrane plates<br>(N, n >> 1) |

From Tables 1 and 2, the linear velocity ratio of the filtration membrane module 300 to the flat sheet module 800 is expressed by Equation (5) below:

$$\frac{u_T}{u_P} = 2\left(\frac{Q_T}{Q_P}\right)\left(\frac{M_P}{M_T}\right)\left(\frac{d}{d_i}\right) \frac{1 + \sqrt{1 + \frac{2\rho_f g d_i^2}{32\mu_f} \bigg/ \left(\frac{2LQ_T}{d_i M_T}\right)}}{1 + \sqrt{1 + \frac{2\rho_f g d^2}{12\mu_f} \bigg/ \left(\frac{LQ_P}{dM_P}\right)}} \quad (5)$$

Use of Equations (2) and (5) can compare the abilities of the filtration membrane module 300 and the flat sheet module 800 from various standpoints. However, in order to make simplification without losing actuality, in this case, the density $\rho_f$ of a fluid to be processed is set at 1,000 kg/m³ and the length L of the membrane at 1 m as common conditions for both the modules. In addition, the thickness t of the membrane plate 802 is set at 5 mm for the flat sheet module 800. For the filtration membrane module 300, the ratio $(d_o/d_i)$ of the outside diameter $d_o$ to the inside diameter $d_i$, of the tubular membrane 310, is set at 1.2, and the packing rate ϵ at 0.8 (with a closest packing state having about 0.9). For the flow rate of air, a flow rate per unit area of membrane of 15 L/min/m² normally used in the flat sheet module 800 is selected as the comparison standard.

Table 3 below shows the calculation results for the viscosity $\mu_f$ of a fluid to be processed being set at 10 mPa·s, the interval d of the membrane plate 802 being set equal to the inside diameter $d_i$ of the tubular membrane 310, and the total membrane areas and the total flow rates of air being set equal for both the modules.

TABLE 3

| | | L = 1 m, $Q_P/M_P$ = 15 L/min/m² | |
|---|---|---|---|
| Comparison conditions | Comparison item | d = 5 mm | d = 10 mm |
| d = $d_i$ | $u_T/u_P$ | 1.00 | 0.91 |
| $M_P$ = $M_T$ | $J_T/J_P$ | 1.26 | 1.22 |
| $Q_P$ = $Q_T$ | $S_T/S_P$ | 0.45 | 0.6 |

In addition, Table 4 below shows the calculation results in the same conditions except that the viscosity $\mu_f$ of a fluid to be processed only is changed to 100 mPa·s.

TABLE 4

| | | L = 1 m, $Q_P/M_P$ = 15 L/min/m² | |
|---|---|---|---|
| Comparison conditions | Comparison item | d = 5 mm | d = 10 mm |
| d = $d_i$ | $u_T/u_P$ | 1.29 | 1.02 |
| $M_P$ = $M_T$ | $J_T/J_P$ | 1.37 | 1.27 |
| $Q_P$ = $Q_T$ | $S_T/S_P$ | 0.45 | 0.6 |

Tables 3 and 4 show that for fluids to be processed having a wide range of viscosities, the filtration membrane module 300 is larger in filtration flow rate than the flat sheet module 800 although the set area of the former is about ½ of that of the latter.

As another example, Table 5 shows the calculation results for the viscosity $\mu_f$ of a fluid to be processed being set at 10 mPa·s, the interval d of the membrane plate 802 being set equal to the inside diameter $d_i$ of the tubular membrane 310, and the module set areas and the total flow rates of air being set equal for both the modules.

TABLE 5

| | L = 1 m, $Q_P/M_P$ = 15 L/min/m² | | |
|---|---|---|---|
| Comparison conditions | Comparison item | d = 5 mm | d = 10 mm |
| d = $d_i$ | $u_T/u_P$ | 0.62 | 0.69 |
| $S_P = S_T$ | $J_T/J_P$ | 2.39 | 1.86 |
| $Q_P = Q_T$ | $M_T/M_P$ | 2.22 | 1.67 |

Table 5 shows that the filtration membrane module 300 has a filtration flow rate that is twice or more the filtration flow rate of the flat sheet module 800 when both the modules have the same module set area and the same total flow rate of air.

Moreover, Tables 3 to 5 indicate that the filtration membrane module 300 also has a larger flux, the filtration flow rate divided by the membrane area, than the flat sheet module 800, suggesting that the filtration membrane module 300 is also excellent in principle as compared with the flat sheet module 800.

The analytical examples above show that the filtration membrane module 300 has an excellent potential in principle as compared with the flat sheet module 800 and the hollow fiber module if air bubbles are uniformly distributed to all the tubular membranes 310. Next, the validity of these analytical results was inspected by means of model fluids.

Testing Method for Inspecting the Validity of the Analytical Results

In order to study the validation of the analytical results discussed above, the tests below were investigated. The details on the testing methods and results will be described later on. Here, the logical background to the testing methods for inspecting the validity of the analytical results will be explained.

Use of a specified actual fluid (fluid to be processed) essentially leads to specific results that reflect its specific properties, and so the general characteristics of the filtration membrane module 300 may not be always elucidated. On the other hand, a basic, scientific evaluation method using a model fluid having specified properties may generate a concern about the alienation from an actual fluid. However, unless dissolved components irreversibly adhere to a membrane and a cake layer formed by the accumulation of components to be filtrated on a filtration membrane has a special behavior, and also if basic, hydrodynamic properties of an actual fluid can be approximated to a Newtonian fluid as in a model fluid, the results obtained using the model fluid are thought to hold for the actual fluid in principle, even though specific ideas need to be applied to each kind of actual fluids.

The present inventors have set the following requirements for model fluids:

1. the characteristics being clear and being simply capable of being measured,
2. the characteristics not being altered within the time required for testing,
3. being readily available and also a third party being capable of conducting a follow-up study,
4. not exhibiting a specific chemical adsorptivity relative to membranes, and
5. having sparing filtration properties.

Latex and a suspension of clay minerals, which have been widely utilized as evaluation fluids for microfiltration membranes, do not meet requirement 5. As a result of investigating various fluids besides these materials, the present inventors have found out that aqueous suspension fluids of carboxymethyl cellulose almost satisfy all requirements 1 to 5 above.

Carboxymethyl cellulose is a typical water-soluble polymer. An aqueous solution thereof is transparent and the filtration pressure thereof rapidly rises when it is subjected to constant-speed filtration using a microfiltration membrane. In addition, inasmuch as the viscosity of a filtrate thereof is close to that of water, carboxymethyl cellulose seems not to dissolve in water in the form of molecules, but to suspend in water as the microgel.

It is known that filtration resistance increases when an activated sludge solution is filtrated by means of the immersion type membrane filtration method. It is suggested that the cause is not due to sludge microorganisms, but due to water-soluble large polymeric materials of secretions thereof (For example, Shin-ichiro Hamatani et al., the Lecture Collection for the Presentation on Sewage Water Studies, 37th, 7–90, 2000). In view of this suggestion, an microgel aqueous suspension of carboxymethyl cellulose is thought to have a potential as a suitable filtration model fluid.

When the viscosity of a carboxymethyl cellulose aqueous suspension needs to be greatly changed, relatively large molecular weight polyethylene oxide is added. Different from carboxymethyl cellulose, polyethylene oxide almost completely dissolves in water in a molecular form. The viscosity of the filtrate obtained by filtration of the aqueous solution by means of a microfiltration membrane is the same as that of the original aqueous solution. Accordingly, use of a carboxymethyl cellulose aqueous suspension or a solution prepared by adding to this suspension polyethylene oxide for viscosity adjustment is thought to be capable of inspecting objectively the above-mentioned analytical estimation without losing generality. Therefore, in this testing, a carboxymethyl cellulose aqueous suspension is utilized as a model fluid (test fluid).

Verification Testing on Validity of Analytical Results

Now, in order to verify the validity of analytical results, there will be discussed results obtained by verifying analytical estimation using a model fluid.

First, 14 parts by weight of heat resistant polyvinyl chloride resin was dissolved in 56 parts by weight of tetrahydrofuran as the solvent and to this solution was further added 30 parts by weight of isopropyl alcohol. With the synthetic resin solution thus obtained was an impregnated porous polyester resin unwoven cloth having a thickness of 0.12 mm and then the cloth was dried. This procedure provided a composite membrane having a thickness of 0.15 mm prepared by laminating a filtration membrane layer of a polyvinyl chloride resin film having numerous pores with an average pore size of 0.4 μm and a support membrane layer of a polyester resin-based unwoven cloth. In addition, a reinforced composite membrane was separately produced by dotting a hot melt adhesive on the support membrane layer side of the composite membrane and further laminating a polyester resin-based unwoven cloth having a thickness of 0.15 mm as the reinforcing layer.

The reinforced composite membrane thus obtained was cut into a tape shape having a width of 2 cm. This reinforced composite membrane tape was wound spirally around a columnar rod in such a way that the reinforcing layer side became the surface side. At this time, both the ends of the reinforcing composite membrane tape in the widthwise directions are rendered overlapped to form a spiral protrusion on the surface thereof. Thereafter, the overlapped portion was subjected to ultrasonic adhesion to produce a tubular membrane having a length of about 70 cm, an inside diameter of 7 mm, a wall thickness of 0.3 mm, a protrusion height of 0.05 mm, an outside diameter including this protrusion of 7.7 mm, and a ratio of the wall thickness to the outside diameter being 0.045.

Next, a flat sheet module 800 as mentioned above was fabricated using the composite membrane (without reinforcing layer) obtained as described above. In addition, a filtration membrane module 300 as described above was fabricated using the tubular membranes obtained as mentioned above. The specifications of each module are given in Table 6. Additionally, in the filtration membrane module 300, a plastic pipe having an inside diameter of 28 mm was employed as the housing vessel 301. On the other hand, in the flat sheet module 800, the interval of the membrane plates 802 was set at 7 mm by means of a spacer having a thickness of 7 mm and having the same width as that of the frame 803 constituting the membrane plate 802, and also the width of the flow pathways of air bubbles and a fluid to be processed was set at 4 cm, which is the same as the membrane width. The reason why each of the modules was set like these small sizes is that the distribution of air bubbles is made uniform since it is assumed that in Equation (5) above, air bubbles are uniformly distributed to all the tubular membranes 310 and to all the membrane plates 802.

TABLE 6

| Type | Nominal pore diameter | Size, etc. | Effective membrane area |
|---|---|---|---|
| Tubular module | 0.4 μm | Inside diameter ($d_I$) = 5 mm<br>Outside diameter ($d_O$) = 5.3 mm<br>Effective length (L) = 33 cm<br>Number (N) = 19 | 0.1 m² |
| Flat sheet module | 0.4 μm | Plate interval (d) = 5 mm<br>Membrane width (W) = 7.5 cm<br>Membrane length (L) = 33 cm<br>Number of membrane plates (n) = 2 | 0.1 m² |

Next, immersion type membrane filtration systems similar to the immersion type membrane filtration system as described above were fabricated using the fabricated modules. Here, an immersion type membrane filtration system utilizing the filtration membrane module 300 was set in such a way that within the guide column 400 air was rendered spouted from the air bubbles spouting pores 510 having a pore diameter of 4 mm formed in the air bubbles supply device 500 located 30 cm beneath the bottom face of the module 300. On the other hand, an immersion type membrane filtration system using the flat sheet module 800 was set such that similarly within a member corresponding to the guide column 400 air was rendered spouted from the air bubbles spouting pores having a pore diameter of 4 mm positioned 30 cm beneath the bottom face of the module 800.

A transparent vessel having a diameter of 25 cm and a depth of 170 cm was used as the storage bath 150 and immersion type membrane filtration was performed on a model fluid stored in this storage bath 150. During this time, the temperature of the model fluid was adjusted to 26±1° C. An aqueous solution shown in Table 7 was used as the model fluid. In Table 7, CMC refers to carboxythemyl cellulose and PEO means polyethylene oxide. The viscosity in Table 7 was measured at 26±1° C.

TABLE 7

| Model fluid | CMC alone | | CMC (0.1%) + PEO | | |
|---|---|---|---|---|---|
| Concentration (wt %) | 0.1 | 0.3 | 0.9 | 1.9 | 4.1 |
| Viscosity (mPa · s) | 2.5 | 7 | 8 | 17 | 96 |

First, the viscosity of filtrate was determined and the permeability of CMC and PEO was confirmed. The viscosity of an aqueous solution of CMC alone was about 1.5 mPa·s or less (limit of readout precision for viscometer), while the viscosity of a mixture aqueous solution of CMC and PEO was a viscosity equivalent to the concentration of PEO. This suggests that most of the CMC does not penetrate the membrane since it is suspending in water in microgel form, whereas PEO passes through the membrane without hindrance because it dissolves in water in the form of molecules.

While the time required for the filtration flow rate to reach a constant value tends to elongate as the flow rate of air decreases and the model fluid concentration increases, it was generally three hours. The filtration flow rate below uses this stationary value. Additionally, the filtration flow rate was determined using a 20 ml graduate cylinder and a stopwatch. The measurement error for the volume is ±0.1 ml.

If components to be removed from a model fluid by filtration is CMC alone, $C_g$ and $C_b$ (with $C_g$ being the gelation concentration and $C_b$ being the CMC concentration in the model fluid) of a mixture solution of CMC and PEO are determined by the CMC concentration alone in Equation (6) below, the well-known cross-flow filtration flux equation, and also, the dispersion coefficient D is almost inversely proportional to the viscosity of the mixture solution:

$$j = 1.63\left(\frac{D^2}{L}\right)^{1/3} u^{1/3} d_i^{-1/3} \ln\frac{C_g}{C_b} \tag{6}$$

Therefore, the flux of the mixture solution with the CMC concentration being constant may be expressed by Equation (7) below:

$$j = \alpha\left(\frac{1}{\mu_f}\right)^{\beta} u^{1/3} d_i^{-1/3} \tag{7}$$

wherein α and β are constants.

Figure 17:
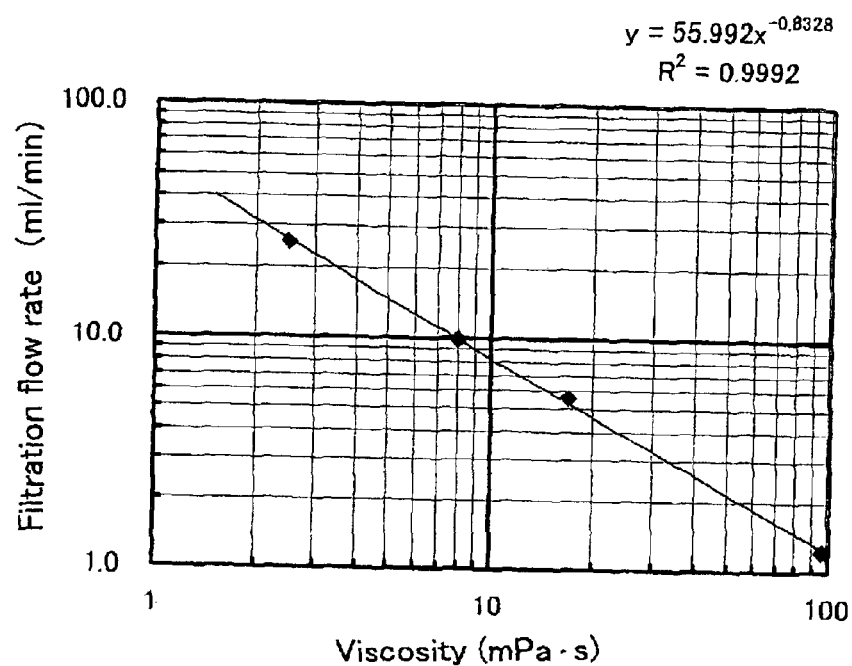
FIG. 17 is a graph indicating the relationship between the viscosity and the filtration flow rate of a model fluid used in a verification test.

FIG. 17 illustrates the relationship between the filtration flow rate and the viscosity of the model fluid, the filtration flow rate being determined by setting the flow rate of air at 1.5 L/min and the water head difference (P of FIG. 1) at 60 cm by using the filtration membrane module 300. In the figure, the slope of the linear line is smaller than −0.67, a theoretical value where the dispersion coefficient D is inversely proportional to the viscosity, indicating a good linearity (if the dispersion coefficient D is proportional to the viscosity to the −1.25th power, the theoretical value agrees with the measured value).

Figure 18:
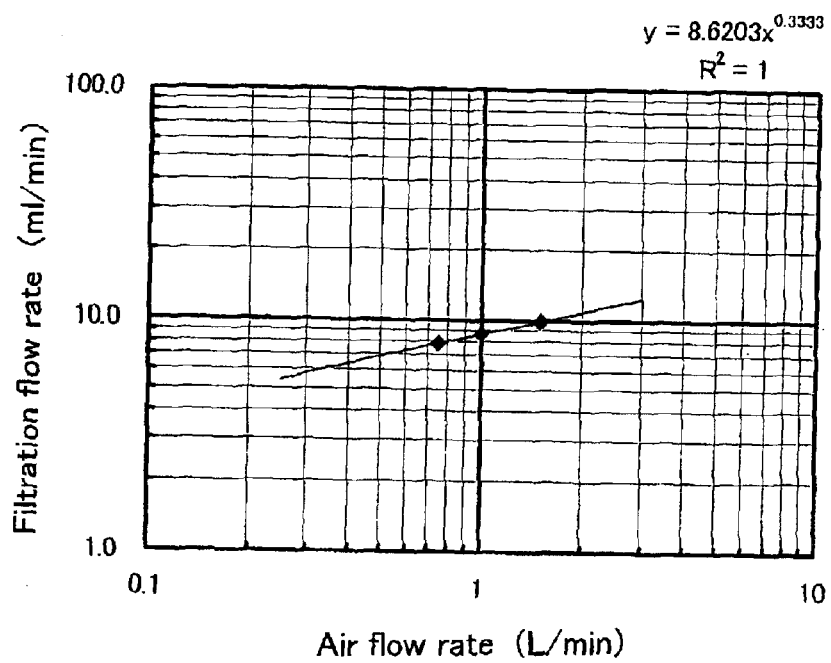
FIG. 18 is a graph indicating the results obtained for the relationship between the flow rate of air and the filtration flow rate for the aforementioned filtration membrane module in a verification test.

Because the square root value of Equation (5) above is approximately 1 in the range where the reduced linear velocity of air corresponds to the flow rate of air adopted by an actual immersion type membrane filtration method, the linear velocity u of Equation (7) above is proportional to the reduced linear velocity of air and thus the flow rate of air. Accordingly, from Equations (2), (5) and (7), actually, the filtration flow rate is estimated to be proportional to the flow rate of air to the one-third power. Then, the water head difference was similarly set at 60 cm using a mixture solution of 0.9% CMC and PEO to confirm the relationship between the flow rate of air and the filtration flow rate by changing the flow rate of air. FIG. 18 illustrates the result. In FIG. 18, the slope of the linear line of 0.33 agrees with the analytical estimation value of ⅓.

Figure 19:
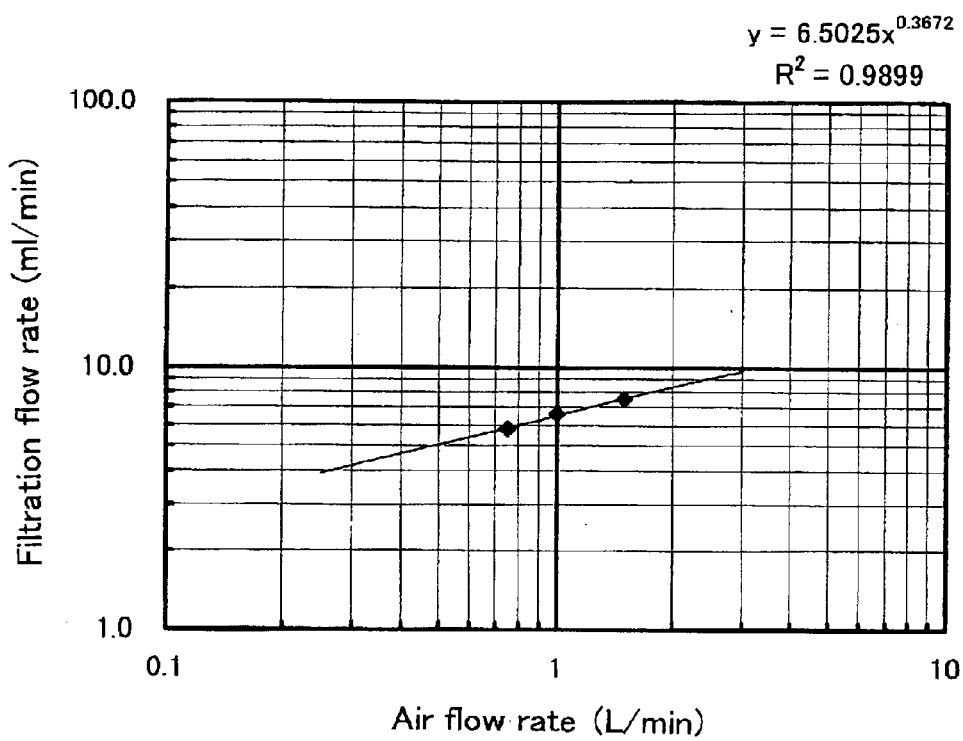
FIG. 19 is a graph indicating the results obtained for the relationship between the flow rate of air and the filtration flow rate for a flat sheet module as a comparison example in a verification test.

Next, in the flat sheet module 800, the water head difference was similarly set at 60 cm using a mixture solution of 0.9% CMC and PEO to confirm the relationship between the flow rate of air and the filtration flow rate by changing the flow rate of air. The result is shown in FIG. 19. FIG. 19 shows that Equation (7) above holds as in the case of the filtration membrane module 300.

Finally, Equations (2) and (5) are verified using these measurement results. In view of the specifications of both the modules, when the flow rates of air are set equal, these equations are given by Equations (2-1) and (5-1) below:

$$\frac{J_T}{J_P} = 1.26 \left(\frac{u_T}{u_P}\right)^{1/3} \tag{2-1}$$

$$\frac{u_T}{u_P} = 2 \frac{1 + \sqrt{1 + \frac{2\rho_f g d_i^2}{32\mu_f} \Big/ \left(\frac{2LQ_T}{d_i M_T}\right)}}{1 + \sqrt{1 + \frac{2\rho_f g d^2}{12\mu_f} \Big/ \left(\frac{LQ_P}{dM_P}\right)}} \tag{5-1}$$

Here, the ratios of the filtration flow rates were calculated with the density of the fluid to be processed being set at 1,000 kg/m³ and the viscosity at 8 mPa·s. The results are given in Table 8. In addition, the measured values in Table 8 were evaluated from data in FIGS. 18 and 19.

TABLE 8

| Flow rate of air (mL/min) | 1.5 | 1 | 0.75 |
|---|---|---|---|
| $u_T/u_P$ (Analytical value) | 0.93 | 0.92 | 0.91 |
| $J_T/J_P$ (Analytical value) | 1.23 | 1.23 | 1.22 |
| $J_T/J_P$ (Measured value) | 1.31 | 1.28 | 1.32 |

In the flat sheet module 800 used in the testing, there are three flow pathways with respect to the two membrane plates 802. Hence, considering that the linear velocity is smaller than the case where n>>1, the analytical values and the measured values of the ratios of the filtration flow rates are in good agreement.

When the interval d of the membrane plates 802 is set equal to the inside diameter $d_i$ of the tubular membrane 310 and the module set areas and the total flow rates of air are set equal in both the modules, the obtainment of the results in Table 5 above is logically proved. In addition, if dissolved components in the fluid to be processed adsorb irreversibly, or unless the cake layer specially behaves, the results obtained here hold for all the actual fluids that are approximated as the laminar flow.

Actually, in relatively well controlled immersion type membrane filtration tests on an activated sludge fluids (For example, Sadamu Ohkawa et al., the Lecture Collection for the Presentation on Sewage Water Studies, 37th, 7–94, 2000), the filtration flow rate is nearly proportional to the total flow rate of air to the one-third power (although the graph shown in the Lecture Collection is small and thus precise data are difficult to read out, it is possible to judge that the filtration flow rate is nearly proportional to the total flow rate of air to the one-third power).

As a result, the aforementioned filtration membrane module 300 is particularly excellent in possibility of compaction as compared with the conventional membrane module and thus the flat sheet module 800.

In addition, taking into account the results of the verification testing discussed above, in the filtration membrane module 300 for use in the present embodiment, the filtration flow rate per unit volume on the basis of the outer dimensions is twice or more that of the flat sheet module or the hollow fiber module that is used in a flow rate of air similar to the filtration membrane module 300. Immersion type membrane filtration needs increased energy costs required for filtration processing as the flow rate of air used during processing is increased. Therefore, this filtration membrane module 300 is truly excellent in cost efficiency in comparison with the conventional flat sheet module or hollow fiber module as well.

Means for Compaction of the Filtration Membrane Module

In order to attain the compaction of the filtration membrane module 300 for use in the present embodiment, it is preferable that the tubular membranes 300 are made closely packed as much as possible rather than elements besides the group of tubular membranes 302 being made included in the housing vessel 301.

Incidentally, the effective membrane area per unit volume of module, an index of compaction of the filtration membrane module 300, is expressed by Equation (8) below:

$$\frac{M}{S(L+l)} = 4\varepsilon \frac{d_i}{d_o^2} \frac{L}{L+l} = 4\varepsilon \frac{1}{d_o}\left(1 - \frac{2\delta}{d_o}\right)\frac{L}{L+1} \tag{8}$$

wherein l represents the overall length of the support portions 306 (corresponding to the total of the lengths of the upper portion and the lower portion of the support portions 306 in the vertical direction in FIG. 2), and δ represents the wall thickness of the tubular membrane 310. In addition, S is the cross-sectional area of the inside, perpendicular to the axial direction, of the housing vessel 301 and thus the module set area in Table 1 above.

The support portion 306 and the frame 803 of the membrane plate 802 of the flat sheet module 800 require a similar length in all the module forms for the purpose of fixing filtration membranes. Thus, the term L/(L+1) in Equation (8) can be considered as rarely varying depending on type of modules. Then, the effective membrane area per unit volume of filtration membrane module 300 is proportional to the packing rate (packing rate of the tubular membranes 310 within the housing vessel 301) and the ratio of the inside diameter to the outside diameter (inside diameter/outside diameter), and is inversely proportional to the outside diameter.

Here, the packing rate is, as indicated in Table 1, defined as the ratio of the area occupied by the tubular membranes 310 to the cross-sectional area of the inside, perpendicular to the axial direction, of the housing vessel 301. More specifically, the packing rate (ε) in the aforementioned filtration membrane module 300 is given by Equation (I) below:

$$\text{Packing rate } (\varepsilon) = \frac{N\pi d_o^2}{4S} \tag{I}$$

Here, in the filtration membrane module 300, the packing rate of the tubular membranes 310 can be set at 0.9, nearly equal to that of the closest packing, with respect to the inside of the spacer 304, while it becomes less than 0.9 with respect to the inside of the housing vessel 301 including the spacer 304.

The spacer 304 is, as stated earlier, intended for reducing the resistance of the flow of filtrate toward the discharge port 303 by creating clearances between the discharge port 303 and the group of tubular membranes 302. The ratio of the area occupied by the spacer 304 in the cross-sectional area of the inside, perpendicular to the axial direction, of the housing vessel 301 is from 3 to 10%, which is sufficient as described earlier. Therefore, considering this point, in order to attain the compaction of the filtration membrane module 300, the packing rate of the tubular membranes 310 is preferably set at least at 0.70 or more, more preferably set at 0.75 or more.

In addition, the tubular membranes 310, as can be seen from Equation (2) above, decreases in filtration flow rate, and inevitably increases in outside diameter, as the inside diameter increases. Also, as seen from Equation (8), the effective membrane area per unit volume of module is decreased. Hence, from such a standpoint, the inside diameter of the tubular membrane 310 is preferably set at 15 mm or less, more preferably set at 10 mm or less.

Furthermore, as can be seen from Equation (8) above, in order to obtain a filtration membrane module 300 having a large effective membrane area per unit volume, a tubular membrane 310 having a small ratio of the wall thickness to the outside diameter is preferable. Thus, from such a viewpoint, the ratio for the tubular membrane 310 is preferably set at 0.1 or less, as stated above.

Designing of Air Bubbles Supply Device

As shown by the above-mentioned analyses and verification testing, the analytical estimations are extremely in good agreement with the results by the verification testing using model fluids. Hence, it is clear that the filtration membrane module 300 is particularly excellent in compactness and cost efficiency in comparison with conventional membrane modules. However, as a requirement for exhibiting such excellent properties, the distribution of air bubbles supplied from the air bubbles supply device 500 needs to be appropriately set within the guide column 400. This point will be described hereinafter.

As stated earlier, the filtration flow rate is proportional to the flow rate of air to the one-third power. Accordingly, it is possible to precisely estimate the relationship between the distribution state of air bubbles and the filtration flow rate.

In a filtration membrane module 300 having N (total number) tubular membranes 310, when air bubbles are uniformly distributed to all the tubular membranes 310, the filtration flow rate $J_N$ for the filtration membrane module 300 is given by Equation (9) below:

$$J_N = M_N j_N = (\pi d_i L N) j_N = \kappa' N \left(\frac{Q}{N}\right)^{1/3} = \kappa N^{2/3} \quad (9)$$

wherein $M_N$ is the effective membrane area of the filtration membrane module 300, $j_N$ is the filtration flow rate for one tubular membrane 310, Q is the total flow rate of air, and k and k' are constants. In addition, the total flow rate of air Q, more specifically, refers to the total-flow rate of air per unit time (one minute) supplied in the form of air bubbles to the filtration membrane module 300 from the air bubbles supply device 500.

On the other hand, when the ratio φ of air relative to the total average value (average value of flow rate of air for one tubular membrane 310, obtained by dividing the total flow rate supplied from the air bubbles supply device 500 by the total number of tubular membranes, i.e. Q/N) is flowed into n membranes of the tubular membranes 310, the flow rate of air per membrane of remaining (N−n) membranes is given by Equation (10) below:

$$\left(Q - n\phi \frac{Q}{N}\right) \bigg/ (N-n) = \frac{N - n\phi}{N(N-n)} Q \quad (10)$$

Therefore, the filtration flow rate of the filtration membrane module 300 is expressed by Equation (11) below:

$$J_{N,n} = \kappa' n \left(\phi \frac{Q}{N}\right)^{1/3} + \kappa'(N-n)\left\{\frac{(N-n\phi)Q}{N(N-n)}\right\}^{1/3} \quad (11)$$

$$= \kappa\left[n\left(\frac{\phi}{N}\right)^{1/3} + (N-n)\left\{\frac{N-n\phi}{N(N-n)}\right\}^{1/3}\right]$$

This leads to Equation (12) below:

$$J_{N,n} = \frac{n}{N}\phi^{1/3} + \frac{N-n}{N}\left\{\frac{N-n\phi}{N-n}\right\}^{1/3} J_N \quad (12)$$

$$= \{r\phi^{1/3} + (1-r)^{2/3}(1-r\phi)^{1/3}\} J_N$$

wherein r=n/N, which means the ratio of tubular membranes 310 having small flow rates of air.

Figure 20:
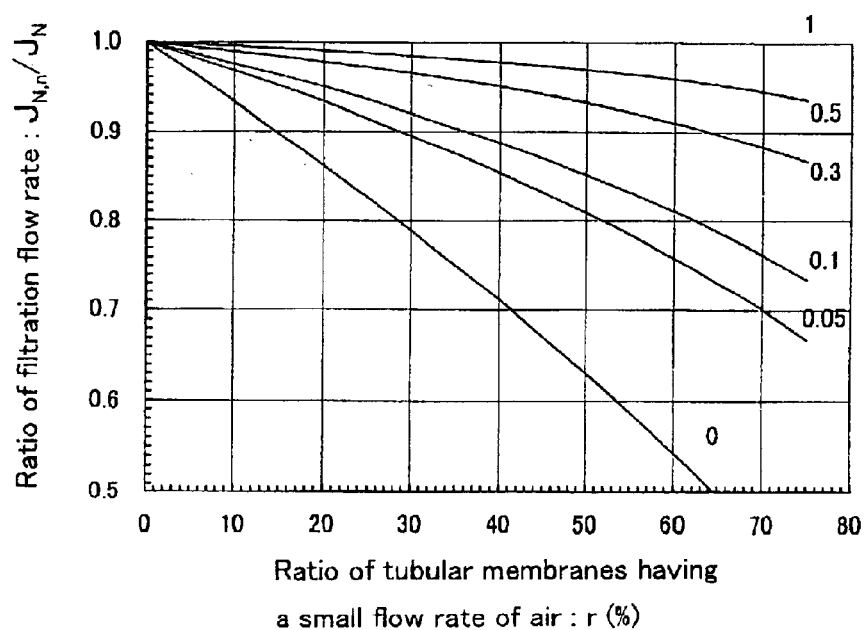
FIG. 20 is a graph indicating the relationship between the proportion of tubular membranes having a small flow rate of air and the filtration flow rate in the aforementioned filtration membrane module.

FIG. 20 shows how the filtration flow rate of the filtration membrane module 300 depends on φ and r using Equation (12).

In the figure, the numerical values of the curve indicate the values of φ. As shown in the figure, if into ½ or more (i.e. at least half of the membranes) of the tubular membranes 310 was flowed air at at least 30% of average value of flow rate of air ("total average value" as stated above, hereinafter referred to as total average value) for one tubular membrane 310, obtained by dividing the total flow rate supplied from the air bubbles supply device 500 by the total number of tubular membranes 310, 90% or more of the filtration flow rate can be secured when air bubbles are uniformly distributed to all the tubular membranes 310.

Thus, a matter of importance as a design goal for the air bubbles supply device 500 is to be able to render air bubbles to be distributed to at least half of the tubular membranes 310 at at least 30% of the total average value. More specifically, the air bubbles supply device 500 needs to possess the air bubbles spouting pores 510 in a configuration pattern capable of distributing air bubbles at at least 30% of the total average value to at least half of the tubular membranes 310.

Incidentally, the shape of an air bubble rising in a liquid is almost a sphere when the diameter thereof is less than about 1 cm. At the diameter more than that, the shape becomes a complicated mushroom shape. The present inventors regarded the volume of a mushroom-like air bubble as being equal to the volume of the sphere having a diameter equivalent to the diameter of the cap of the mushroom. They actually generated air bubbles in the above-mentioned model fluids to observe the relationship between the size of air bubbles and the shape of the air bubbles spouting pore 510, the flow rate of air, the viscosities of fluids and so forth. As a result, in air bubbles spouting pores 510 placed in a pipe having 4 mm pores opened downwardly, the pipe having an inside diameter of 4 mm and an outside diameter of 6 mm, when the viscosity of the liquid is in the range of about 1 to 100 mPa·s, Equation (13) below has been found to roughly hold:

$$d_p \approx \left\{ \frac{18000 \mu_f Q}{\pi \rho_f g} \right\}^{1/4} \quad (13)$$

wherein $d_p$ is the diameter of the bubble.

As the pipe becomes thick and the pore becomes large, the diameter of the air bubble slightly tended to become larger than the diameter calculated using Equation (13), but Equation (13) was used as a design equation.

On the other hand, the air bubble was also observed to rise in the fluid while meandering complicatedly. For a rough summary of the movement of the bubble, the diameter (m) of the area where 30% of the total air bubbles generated passed through expanded in proportion to the distance H (cm) from the air bubbles supply device 500 briefly according to Equation (14):

$$d_p + \frac{0.03H}{20} \quad (14)$$

Of this, the ratio of the area of about 30% of the air bubbles passing through is less than ½.

Therefore, when this area covers the opening portions of all the tubular membranes 310, air bubbles at at least 30% of the total average value are distributed to ½ or more of the total number of the tubular membranes 310.

In order to cover with this area the openings of all the tubular membranes 310 H cm above the air bubbles supply device 500, when the air bubbles spouting pores 510 are disposed on the horizontal face within the guide column 400 in the closest packing pattern, one air bubbles spouting pore 510 per area (m²) expressed by Equation (15) below is required:

$$\frac{3\sqrt{3}}{8} \left( d_p + \frac{0.03H}{20} \right)^2 \approx 0.65 \left( d_p + \frac{0.03H}{20} \right)^2 \quad (15)$$

On the other hand, when the air bubbles spouting pores 510 are disposed on the horizontal face within the guide column 400 in the tetragonal lattice pattern, one air bubbles spouting pore 510 per area (m²) expressed by Equation (16) below is required:

$$0.5 \left( d_p + \frac{0.03H}{20} \right)^2 \quad (16)$$

When the two values are compared, even in any module shapes, the closest packing pattern requires the least number of pores for the air bubbles spouting pores 510. However, actually, in association with a method of producing the filtration membrane module 300, the configuration pattern of the air bubbles spouting pore 510 is preferably set in the tetragonal lattice pattern when the shape of the cross section, perpendicular to the axial direction, of the housing vessel 301 is a rectangular shape (i.e., when the shape of the cross section, perpendicular to the axial direction, of the guide column 400 is a rectangular shape). Also, the configuration pattern of the air bubbles spouting pore 510 is preferably set in the closest packing pattern when the cross section shape of the housing vessel 301 is a circular shape or a polygon shape with 5 angles or more (namely, when the cross section shape of the guide column 400 is a circular shape or a polygon shape with 5 angles or more).

For an example where the aforementioned cross section shape of the housing vessel 301 is a circular shape and where the diameter of the region occupied by the tubular membranes 310 (the diameter of the housing vessel 301 excluding the thickness, i.e. the diameter of the support portions 306) is DT (m), the relationship between the diameter and the number Z of the air bubbles spouting pores 510 required for the air bubbles supply device 500 is given by Equation (18) below from Equation (17) below:

$$Z = \pi \left( \frac{D_T}{2} \right)^2 \Big/ \left\{ 0.65 \left( d_p + \frac{0.03H}{20} \right)^2 \right\} \quad (17)$$

$$D_T = 0.9 Z^{1/2} \left\{ \left( \frac{18000 \mu_f}{\pi \rho_f g} \frac{Q}{Z} \right)^{1/4} + \frac{0.03H}{20} \right\} \quad (18)$$

On the other hand, in the case where the above-mentioned cross section shape of the housing vessel 301 is a rectangular shape, when the area of the region occupied by the tubular membrane 310 (area of the inside of the housing vessel 301 at the cross section perpendicular to the axial direction of the housing vessel 301) is taken as S, the number Z of the air bubbles spouting pores 510 required for the air bubbles supply device 500 is determined by Equation (19) below:

$$S = 0.5 Z \left\{ \left( \frac{18000 \mu_f}{\pi \rho_f g} \frac{Q}{Z} \right)^{1/4} + \frac{0.03H}{20} \right\}^2 \quad (19)$$

Incidentally, an attempt to array the air bubbles spouting pores 510 in the closest packing pattern or in the tetragonal lattice pattern is made, the pore number Z determined by Equation (18) or Equation (19) may inconveniently have a remainder. Accordingly, when such an inconvenience is created, the number Z of the air bubbles spouting pores 510 to be actually set is preferably amended as appropriate according to an actual size of the housing vessel 301 such that the number Z becomes close to the pore number determined by these equation as much as possible.

Examples of Design of Air Bubbles Supply Devices

Next, using the above-mentioned designing equations, a procedure for actually determining the number of the air bubbles spouting pores 510 and a configuration thereof will be described by means of examples. Here, the case of fabricating the aforementioned filtration membrane module 300 using a housing vessel utilizing a nominal 300 hard vinyl chloride pipe of JIS K 6741-1975 and using a tubular membrane 310 having an inside diameter of 7 mm and an outside diameter of 7.7 mm is taken as an example. In addition, in this filtration membrane module 300, the number of tubular membranes 310 contained in the group of tubular membranes 302 is set at 1,150, the diameter of the support portion 306 (i.e., the inside diameter of the spacer 304) is set at 28 cm, and the effective length (the length given by subtracting the length of the upper and lower support portions 306 from the length of the tubular membrane 310) of the tubular membrane 310 is set at 60 cm. Accordingly, the effective membrane area is assumed to be set at 15 m².

Using this filtration membrane module 300, the needed number Z of air bubbles spouting pores 510 is first determined when a fluid to be processed having a density $\rho_f$ of 1,000 kg/m³ and a viscosity $\mu_f$ of 8 mPa·s is filtrated at a flow rate of air of 150 L/min.

Figure 21:
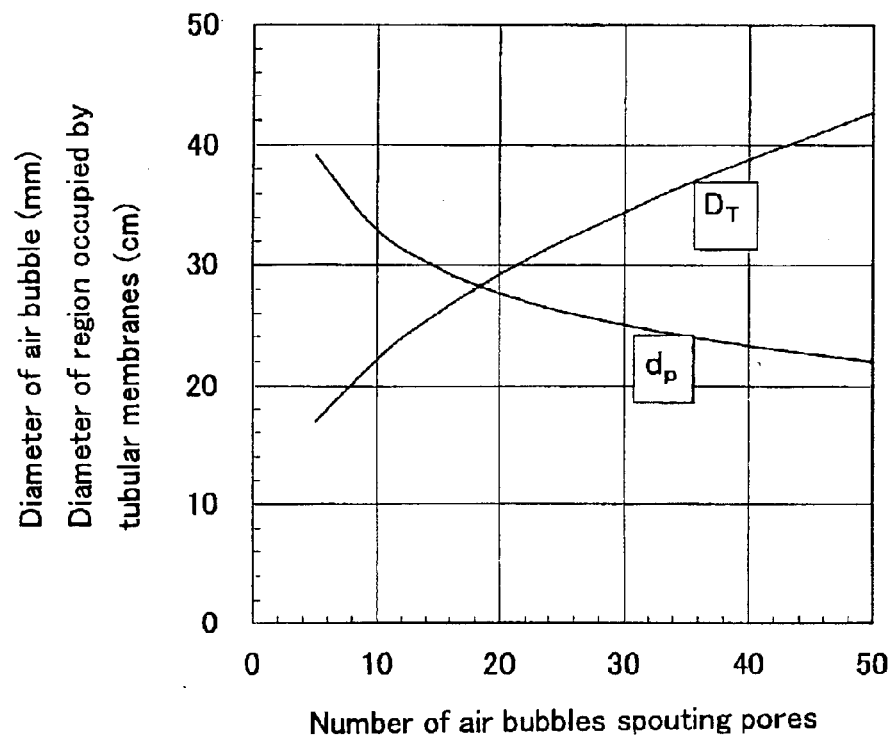
FIG. 21 is a graph indicating the relationship between the number of air bubbles spouting pores placed in an air bubbles supply device adopted for the aforementioned immersion type membrane filter apparatus, the diameter of the area occupied by tubular membranes, and the diameter of air bubbles, in the aforementioned filtration membrane module.

FIG. 21 illustrates the relationship between the number Z of air bubbles spouting pores 510 and the diameter $D_T$ of the region occupied by the tubular membranes 310 (i.e., the diameter of the support portion 306) and the diameter $d_p$ of air bubbles (not necessary for designing the air bubbles supply device 500, but indicated as reference material) obtained from Equations (13) and (18) above when the distance H between the air bubbles supply device 500 and the filtration membrane module 300 is set at 30 cm.

In the filtration membrane module 300 fabricated as an example, the number of the air bubbles spouting pores 510 required for the air bubbles supply device 500 is from 18 to 19 from the figure since the diameter $D_T$ of the region occupied by the tubular membranes 310 is 28 cm. Here, when the number of the air bubbles spouting pores 510 is set at 19 and they are disposed within the guide column 400 in the closest packing pattern, a state indicated in FIG. 12 is given. In the air bubbles spouting pores 510 set in such a configuration pattern, the cross section shape, perpendicular to the axial direction, of the guide column 400 is set to be substantially the same as the cross section shape, perpendicular to the axial direction, of the housing vessel 301, and so the air bubbles spouting pores 510 are disposed at almost regular intervals with respect to the group of tubular membranes 302 packed in the housing vessel 301.

Setting of Backwash Conditions

As stated earlier, the filtration membrane module 300 for use in the aforementioned immersion type membrane filter apparatus 200 is suitable for carrying out immersion type membrane filtration efficiently and economically with compaction, as compared with the hollow fiber module or the flat sheet module. Accordingly, in this immersion type membrane filter apparatus 200, if the backwash conditions of the filtration membrane module 300 by means of the backwashing device 700 can be appropriately set, the life span of the tubular membrane 310 can in turn be prolonged, which enables the conduct of efficient, economical immersion type membrane filtration. Then, the present inventors took up as factors concerning the backwashing the following:

1. pressure loss for a backwashing fluid within the tubular membrane 310,
2. the pore diameter of pores of filtration membrane layers 311 constituting the tubular membranes 310,
3. the filtration pressure history prior to backwashing,
4. components to be filtrated contained in a fluid to be processed,
5. the filtration mechanism,
6. backwash pressure, and
7. the amount of backwashing fluid.

Attempts to set effective backwash conditions were made by analyzing the relationship between these factors and the recovery rates of the tubular membranes 310 by backwashing.

Here, the filtration mode utilized quantitative filtration or constant-pressure filtration. Filtrate was used as the backwashing fluid taking into account the reality. In addition, an aqueous suspension of carboxymethyl cellulose (CMC) was used as a model fluid for an activated sludge fluid, a representative application for the immersion type membrane filtration method. Furthermore, colloidal silica having a variety of average particle diameters was employed as model fluids for river water, etc.

As stated earlier, the CMC suspension water is transparent and thus the CMC seems to be dissolved in a molecular form; however, the viscosity of the filtrate is almost equal to that of water, and so in reality the CMC is thought to be suspended in the form of gel. Additionally, the CMC suspension water is large in an increasing rate of filtration resistance in total filtration, and therefore it was thought to correspond to a model fluid for activated sludge, which is said to be molecular secretions of microorganisms to become clogging components (For example, Shin-ichiro Hamatani et al., the Lecture Collection for the Presentation on Sewage Water Studies, 37th, 7–90, 2000). For the adjustment of the viscosity of this suspension was used polyethylene oxide (PEO). Because in a PEO aqueous solution the viscosity of the solution subsequent to filtration is the same as the viscosity of the original aqueous solution, PEO is appeared to pass through a microfiltration membrane without hindrance. Moreover, the viscosity of the filtrate for a mixture solution of CMC and PEO corresponds to the PEO concentration, and thus even in such a mixture solution PEO is thought to pass through a microfiltration membrane without hindrance.

On the other hand, many suspension components in natural water such as river water are fine mineral powders. Although a kaolin powder is also used as an evaluation material for domestic cleaning devices, such a material is not only small in filtration resistance, but also very easy to backwash, and thus it is not suitable for a material for evaluating immersion type membrane filter apparatuses for use in extended periods of time. Accordingly, colloidal silica, at least having a soft surface and being sparingly filtrated, was selected as a model fluid for river water, etc.

In order to investigate the relationship between the aforementioned factors and the recovery rate, the aforementioned immersion type membrane filtration system 100 was constructed. In this case, there was used the tubular membrane 310 with an inside diameter of 7 mm and a crushing pressure of 33 kPa formed using the composite membrane 313 fabricated by integrally laminating the filtration membrane layer 311 of microfiltration membrane having a nominal diameter of 0.4 μm on the support membrane layer 312 of a polyester resin unwoven cloth. In addition, the filtration membrane module 300 made by packing seven tubular membranes 310 as stated above within the housing vessel 301 of a vinyl chloride pipe having an inside diameter of 28 mm and a length of 70 cm was employed. Moreover, both ends of the tubular membrane 310 were fixed to the housing vessel 301 using an urethane resin such that the effective length became about 65 cm (effective membrane area=about 0.1 $m^2$). Additionally, this filtration membrane module 300 was mounted on the guide column 400 of a vinyl chloride pipe with a length of 35 cm, having the legs 402 with a length of 10 cm. Further, the air bubbles supply device 500 was horizontally placed at the position about 30 cm beneath the filtration membrane module 300. There was employed the air bubbles supply device 500 which is made of a pipe having an inside diameter of 4 mm and an outside diameter of 6 mm and which has a large number of air bubbles spouting pores 510 in the above-mentioned configuration pattern. The cylindrical storage bath 150 having an inside diameter of 25 cm and a height of 170 cm was utilized.

Constant-pressure filtration was conducted at a water head difference P=60 cm (6 kPa) on a test fluid (a mixture solution of CMC/PEO=0.1% by weight/0.8% by weight; viscosity=8 cps) stored within the storage bath 150 using the immersion type membrane filtration system set as the above to thereby study the change of the filtration flow rate with time. The filtration flow rate was measured with a graduate cylinder and a stopwatch. In addition, the test fluid discharged via the second discharge pathway 602 of the filtrate discharge pathway 600 was recovered and made to return into the storage bath 150. Further more, the flow rate of air supplied from the air supply pathway 521 to the air bubbles supply device 500 was set at 1.5 L/min. by means of the secondary pressure/flow rate adjusting valve 520.

Figure 22:
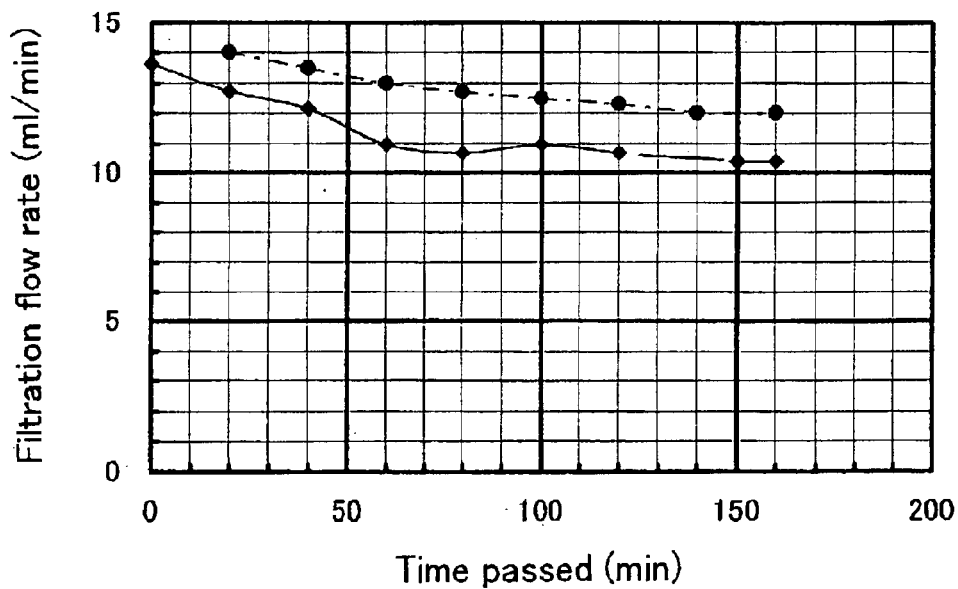
FIG. 22 is a graph indicating the results of constant-pressure filtration testing conducted for verifying the backwash conditions by means of the aforementioned back washing device.

FIG. 22 shows the results of the above-mentioned constant-pressure test. In FIG. 22, the solid line indicates the filtration flow rate when the constant-pressure filtration was continued. On the other hand, the alternate long and short dash line indicates as a single unit the filtration flow rate immediately after the amount of backwashing fluid specified by the quantitative float valve 710 was set at 25 ml by altering the filtration time and also backwashing was conducted for 30 seconds at a backwash pressure (air pressure) of 20 kPa. Additionally, although the backwashing time was set at 30 seconds, the total amount of filtrate within the quantitative float valve 710 and the first discharge pathway 601 was found to flow back into the filtration membrane module 300 within 10 seconds substantially by observing a pressure gage of the secondary pressure/flow rate adjusting valve 531 in the backwashing air supply pathway 530.

FIG. 22 shows that when the above-mentioned test fluid was subjected to constant-pressure filtration, at the filtration time exceeding 20 minutes, the filtration flow rate was not recovered to the original rate even though backwashing had been conducted.

Figure 23:
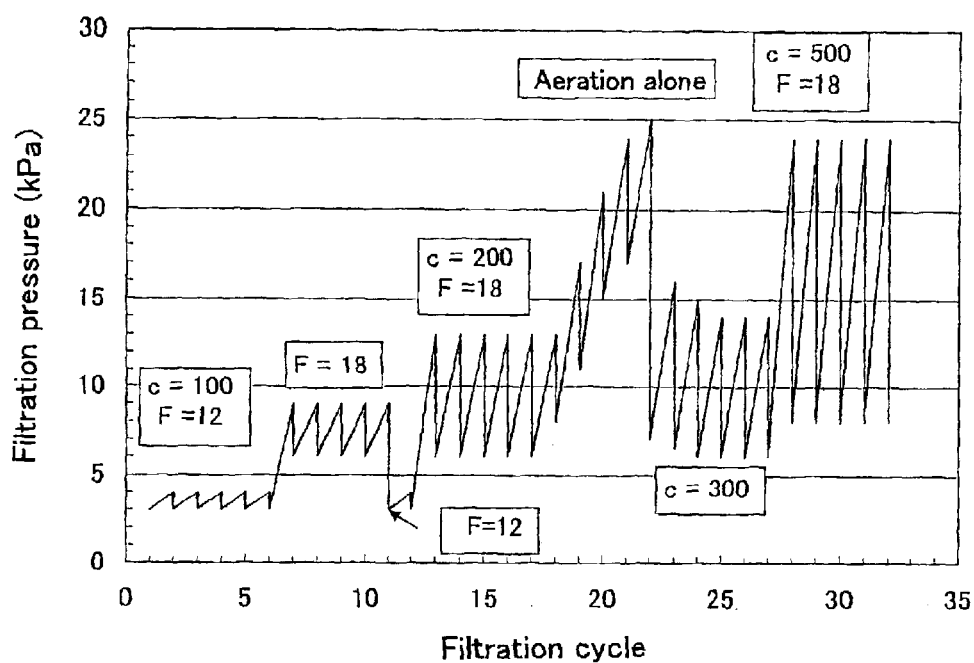
FIG. 23 is a graph indicating the results of quantitative filtration testing conducted for verifying the backwash conditions by means of the aforementioned back washing device.

Next, the relationship between the filtration/backwashing cycle and the filtration pressure was investigated by means of the immersion type membrane filtration system 100 set as the above when the test fluid (a colloidal silica suspension fluid having a concentration of "c" ppm indicated in FIG. 23 and having an average particle diameter of 0.5 μm) was subjected to quantitative filtration. Here, to the second discharge pathway 602 of the filtrate discharge pathway 600 was connected a flow meter, a digital pressure gage and a quantitative tube pump in this order to adjust the filtration flow rate by adjusting the suction force of the quantitative tube pump. Further, filtrate discharged from the quantitative tube pump was rendered to return to the storage bath 150 as in the case of the aforementioned constant-pressure filtration. Furthermore, in the storage bath 150, the colloidal silica suspension fluid used as the test fluid was agitated so as not to precipitate.

A filtration/backwashing cycle (filtration cycle) that involves conducting quantitative filtration for 9 minutes at a filtration flow rate of "F" L/min by means of a quantitative tube pump and subsequently carrying out backwashing for 30 seconds in a backwashing fluid amount of 25 ml at a backwash pressure (air pressure) of 30 kPa was repeated. The results are shown in FIG. 23. In FIG. 23, the filtration cycles without indicating "c" or "F" have the same condition as the previous cycle filtration condition for no indication condition. In addition, five cycles from the 17th to 21st are a filtration mode including 8-minute filtration/2-minute aeration (supply of air bubbles from the air bubbles supply device 500) alone and thus a filtration mode without conducting the backwashing operation.

Unlike the case of the constant-pressure filtration where a CMC/PEO mixture fluid was used as the test fluid, in this quantitative filtration using a colloidal silica suspension fluid as the test fluid, the filtration/backwashing cycle was continuously repeated under comparatively wide conditions. FIG. 23 shows that the filtration pressure after backwashing is recovered to the filtration pressure at each filtration cycle initiation. In addition, it also shows that the filtration pressure that was not recovered by aeration alone is effectively recovered by backwashing.

FIGS. 22 and 23 illustrate, respectively, typical examples of the constant-pressure filtration testing results and the quantitative filtration testing results. Similar tests were performed on various combinations of the above-mentioned factors. The results are summarized to roughly give the six matters of 1 to 6 as stated below. Here, in the quantitative filtration test, the recovery rate R was refined by Equation (20) below, and in the constant-pressure filtration test, the recovery rate R was defined by Equation (21) below:

$$R = \frac{P_f - P_i}{P_f - P_{i-1}} \quad (20)$$

$$R = \frac{J_f - J_i}{J_f - J_{i-1}} \quad (21)$$

In Equation (20), $P_f$ is the filtration pressure prior to backwashing, $P_i$ is the filtration pressure subsequent to backwashing, and $P_{i-1}$ is the filtration pressure immediately after the initiation of filtration. In addition, in Equation (21), $J_f$ is the filtration flow rate prior to backwashing, $J_i$ is the filtration flow rate subsequent to backwashing, and $J_{i-1}$ is the filtration flow rate immediately after the initiation of filtration. In Equations (20) and (21), when R=1, the filtration pressure is completely recovered.

1. In the tubular membrane 310 having an inside diameter of 3 mm or more, the pressure loss of the backwashing fluid (filtrate) can be neglected.

2. The filtration pressure history prior to backwashing has a large effect on the recovery rate, and thus at the pressure exceeding a certain pressure (pressure of the recovery limit) the filtration pressure does not completely recover, which results in irreversible clogging.

3. While the recovery rate seems to be related to the membrane structure more strongly than to the pore diameter of the pore of the filtration membrane layer 311 in the tubular membranes 310 (with the pressure of the recovery limit considerably varying depending on the membrane structure), complete recovery was possible when the filtration pressure history had not undergone a pressure over the pressure of the recovery limit.

4. The filtration mechanism being within the cake filtration mechanism (with the filtration pressure in quantitative filtration being proportional to the amount of integrated filtration) is a requirement for complete recovery.

5. Under the conditions satisfying the requirements for complete recovery by means of the above items 2 to 4, the filtration pressure for the colloidal silica suspension fluid was completely recovered, (a) when the backwashing amount of filtrate per membrane area of 1 m² of tubular membranes 310 was set at about 200 ml or more, (b) when the backwash pressure was set at the maximum filtration pressure or more, or (c) when independently of the amount of filtration, a pressure of the filtration pressure history is not greater than the recovery limit pressure and when the filtration mechanism is within the range of the cake filtration mechanism.

6. Under the conditions satisfying the requirements for complete recovery by means of the above items 2 to 4, the filtration pressure for the CMC/PEO suspension fluid (a) did not come to completely recover when the filtration amount exceeds a certain amount, or (b) did completely recover via a backwash pressure of the maximum filtration pressure or more at the filtration amount not exceeding a certain amount when the backwashing amount of filtrate per membrane area of 1 m² of tubular membranes 310 was set at about 200 ml or more.

The reason why the filtration pressure does not completely recover when the amount of CMC/PEO suspension fluid filtrated exceeds a certain amount seems to be that when CMC gels accumulate to make contact with each other on the membrane surface, a continuous film produced by mutual bonding of gels, though weak, is formed, with the film not readily being destroyed by backwashing. In other words, in such a case, unless backwashing is conducted before a complete film of suspension particles is formed and thus before the amount of filtration exceeds a certain amount, the complete recovery does not seem to be attained. On the other hand, since colloidal silica does not form such a film, the filtration pressure is thought to recover regardless of the amount of filtration. However, even in any of the test fluids, the suspension particles pushed into the pores by a pressure of a certain value or more associated with the membrane structure are not dislodged even if the backwash pressure and amount of backwashing fluid is made large. That is, when a filtration pressure of a certain value or more has been used for filtration, backwashing becomes substantially difficult.

As a result, preferred backwash conditions include two conditions: the backwash pressure being set at the maximum filtration pressure or more during the filtration, and the amount of filtrate for backwashing being set at a needed minimum amount of about 200 ml or more per membrane area of 1 m² of tubular membranes 310. Hence, for the quantitative float valve 710 in the aforementioned immersion type membrane filter apparatus 200, the volume thereof is preferably set in such a way that the amount of filtrate made flowed into the filtration membrane module 300 in the backwashing step becomes at least 200 ml for 1 m² of the membrane area of the tubular membranes 310 housed in the housing vessel 301.

[Other Embodiments]

Figure 24:
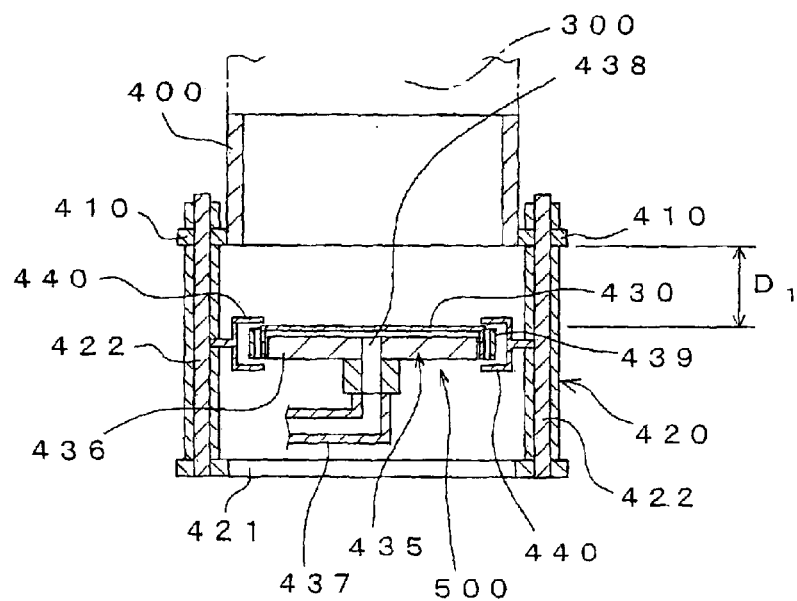
FIG. 24 is a diagram corresponding to FIG. 11 of a variation example of the aforementioned immersion type membrane filter apparatus.

(1) In the aforementioned immersion type membrane filter apparatus 200, the guide column 400 and the air bubbles supply device 500 may be altered as shown in FIG. 24. In FIG. 24, the guide column 400 is made of a material similar to that of the aforementioned housing vessel 301 and is a cylindrical member with the upper and lower ends opened. The shape of the cross section, particularly the shape of the inner circumference, perpendicular to the axial direction thereof, is substantially the same as the shape (circular shape) of the cross section, particularly the inner periphery of the outer circumferential portion, perpendicular to the axial direction of the aforementioned housing vessel 301, with the sizes being substantially the same. In addition, at the lower circumferential edge of the guide column 400, a flange 410 extending to the horizontal direction is formed.

This guide column 400 is held within the storage bath 150 by means of a support base 420. The support base 420 is provided with a base 421 placed at the bottom of the storage bath 150 and a plurality of support legs 422 standing vertical from this base 421. Also, the upper ends of the support legs 422 are fixed to the flange 410 of the guide column 400. This renders the guide column 400 to be placed at an interval from the bottom of the storage bath 150. On the upper portion of the guide column 400 disposed in this manner, as in the above-mentioned embodiment, the filtration membrane module 300 is mounted in a stand state.

Figure 25:
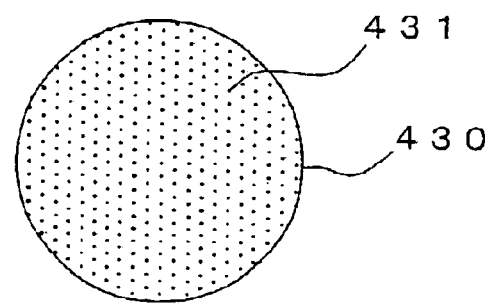
FIG. 25 is a plane view of a plain body for use in an air bubbles supply device adopted for an immersion type membrane filter apparatus concerning the aforementioned variation example.

On the other hand, the air bubbles supply device 500 is disposed beneath the guide column 400 and thus between the bottom of the storage bath 150 and the guide column 400, and is provided with a plain body 430 and an aerator 435. The plain body 430, as illustrated in FIG. 25, is a plane member having substantially the same shape and size as the inner circumferential shape in the cross section perpendicular to the axial direction of the guide column 400 and thus a disk-like member. It is fabricated using an elastic rubber body. In this plain body 430 were places numerous air bubbles spouting pores 431 perforated in the thickness direction thereof. Each of the air bubbles spouting pores 431 is set closable and openable according to an increase and decrease of air supplied from the aerator 435 as discussed in detail later on. More specifically, when air is supplied from the aerator 435 toward the plain body 430, the plain body 430 is expanded due to the pressure of the air. As a result, each of the air bubbles spouting pores 431 is expanded and opened to be capable of spouting air in the form of bubbles (air bubbles). Conversely, when air is not supplied from the aerator 435, the plain body 430 is contracted to come into close contact with an air supply plate 436 as stated below, and therefore each of the air bubbles spouting pores 431 is closed by rubber elasticity. In addition, such air bubbles spouting pores 431 are almost uniformly disposed over almost the entire surface of the plain body 430 at intervals of a couple of millimeters to a dozen of millimeters. In this connection, such a plain body 430 is already known (for example, "Elastoxsteller," (trade name) available from Misuzu Industry Co. Ltd.), and a variety of bodies can be utilized if they have the above-mentioned function.

The aerator 435 is primarily provided with the air supply plate 436 disposed beneath the plain body 430 and an air supply pipe 437 for supplying air to the air supply plate 436. The air supply plate 436 is a disk-like member paralleling to the plain body 430 and has the discharge port 438 of air in the central portion thereof. The plain body 430 is mounted on the upper face of the air supply plate 436, and the circumferential edge portion thereof is fixed to the air supply plate 436 by means of a fixing band 439. Further, the plain body 430 and the air supply plate 436 fixed to each other are held roughly horizontally by means of a plurality of supporters 440 extending from the support legs 422. In addition, the supporter 440 has a clamp shape and hold by pinching the plain body 430 and the air supply plate 436 fixed to each other by means of the fixing band 439.

The air supply pipe 437 is coupled, at one end thereof, to the discharge port 438 of the air supply plate 436, and also the other end is connected to the air supply pathway 521.

Furthermore, in the air bubbles supply device 500 as stated earlier, the plain body 430 is normally preferably set in such a way that the interval ($D_1$ in FIG. 24) between the plain body 430 and the lower end of the guide column 400, when the shape of the cross section, perpendicular to the axial direction, of the filtration membrane module 300 is a circle, is about from ⅓ to ¼ of the diameter of the circle, and when the shape of the cross section of the filtration membrane module 300 has another shape, the interval is about from ⅓ to ¼ of the diameter of the circle, the area of which is equal to the area of the shape. During immersion type membrane filtration by the immersion type membrane filtration system 100, a fluid to be processed as stated earlier naturally circulates within the storage bath 150 and the fluid to be processed travels between the lower end of the guide column 400 and the plain body 430. For this reason, when this interval is smaller than this, the circulating flow of this fluid to be processed pushes and flows air bubbles from the air bubbles supply device 500 toward the central axis of the filtration membrane module 300. Accordingly, the number of air bubbles supplied to the tubular membrane 310 located on the outer periphery side of the filtration membrane module 300 becomes small, which may make it difficult to conduct uniform filtration in the whole of the filtration membrane module 300.

When the air bubbles supply device 500 as described above is employed, the air supplied to the air supply pipe 437 from the air supply pathway 521 is discharged at the discharge port 438 of the air supply plate 436 toward the plain body 430. As a result, the plain body 430 of an elastic rubber body expands like a dome on the air supply plate 436 on account of the pressure of the air being discharged. Also, with this, a large number of air bubbles spouting pores 431 formed in the plain body 430 are opened to spout air bubbles.

Air bubbles spouted from the air bubbles spouting pores 431 rises in the fluid to be processed while being guided by the guide column 400 (i.e., while being prevented by the guide column 400 from leaking to the outside thereof). Then, along with the air bubbles rising in this manner in the fluid to be processed, the fluid to be processed stored within the storage bath 150, as indicated by the arrows in FIG. 2, pass in each of the tubular membranes 310 of the filtration membrane module 300 from the lower side upwards, being subjected to the filtration as stated above. In addition, the plain body 430 possesses the air bubbles spouting pores 431 uniformly on the entire surface thereof, and thus can almost uniformly supply air bubbles to each of the tubular membranes 310.

On the other hand, halting the supply of air to the air supply pipe 437 renders the plain body 430 to contract to come into close contact with the air supply plate 436 and in turn the opened air spouting pores 431 are closed. Consequently, although the air spouting pores 431 are set to become large in the pore diameter during air bubbles spouting, they are effectively avoided being clogged by polluting substances contained in a fluid to be processed. In other words, the air bubbles supply device 500, even when polluting substances are present in a fluid to be processed, can stably continue to supply air bubbles. Hence, the immersion type membrane filter apparatus 200 equipped with this air bubbles supply device 500 is particularly useful when a fluid to be processed containing a variety of contaminants or polluting substances is filtrated.

In addition, the diameter of the air bubble spouted from the air bubbles spouting pore 431 of the plain body 430 is preferably set at least at ⅓ of the inside diameter of the tubular membrane 310, normally from a couple of millimeters to a dozen of millimeters. The reason is in the following. In an immersion type membrane filter apparatus utilizing a flat sheet module as described above, air bubbles rise while meandering in the intervals between wide membrane plates. Thus, the ascending speed of an air bubble also decreases with decreasing air bubble diameter, which in turn decreases the flow speed of cross-flows tending to lower the filtration flow rate. Also, in an immersion type membrane filter apparatus using a hollow fiber module, the efficacy of swinging the hollow fiber membrane decreases with decreasing air bubble diameter, which is likely to reduce the filtration flow rate. On the other hand, in the filtration membrane module 300 as stated above, the buoyancy applied to a liquid column within the tubular membranes 310, as long as the diameter of the air bubble is not extremely small, is determined not by the diameter of each air bubble, but by the total volume of the air bubbles residing within the tubular membranes 310. Therefore, in the filtration membrane module 300, when the total volumes are the same, the flow speeds of cross-flows are almost the same. Accordingly, the filtration membrane module 300 can utilize air bubbles having far smaller diameters than those of air bubbles for use in the flat sheet module or the hollow fiber module. However, even in the filtration membrane module 300, when the diameter of the air bubble is extremely small as compared with the inside diameter of the tubular membrane 310, the situation becomes similar to the case of the flat sheet module, and thus the flow speed of cross-flows becomes small. For this reason, in order to enhance the filtration flow rate by suppressing substantially the meander of air bubbles within the tubular membrane 310, the diameter of the air bubble needs to be set at least at ⅓ of the inside diameter of the tubular membrane 310.

From such a viewpoint, each of the air bubbles spouting pores 431 of the plain body 430 is preferably set so as to be capable of spouting air bubbles having a diameter of at least ⅓ of the inside diameter of the tubular membrane 310. In this regard, the air bubbles spouting pores 431 may be set so as to be capable of spouting air bubbles having such a diameter by adjusting the number of the pores (number of pores per unit area of plain body 430). Alternatively, they may also be set so as to be capable of spouting such air bubbles by adjusting, as appropriate, the number of the pores (number of pores per unit area of plain body 430) and the flow rate of air supplied from the air supply plate 436 to the plain body 430.

In addition, air bubbles generating devices for conventional flat sheet modules or hollow fiber modules are provided with a few number of air bubbles spouting pores with a diameter exceeding a couple of millimeters, and so air bubbles having a diameter exceeding a couple of millimeters are sparsely generated and rise while widening the meander range. Because of this, the air bubbles generating device is elaborately fabricated by setting slightly longer the member corresponding to the guide column 400 so as to uniformly hit air bubbles on the whole of the membrane module. In contrast, air bubbles emitted from the plain body 430 rise in the form of a bundle-like flow almost equal to the face shape of the plain body 430 (columnar flow when the plain body 430 has a disk-like shape) Thus, the function of the guide column 400 is primarily intended for delivering the air bubbles spouted from the air bubbles supply device 500 to the filtration membrane module 300 as much as possible without leaking rather than uniformly dispersing air bubbles to the filtration membrane module 300. On account of this, when the air bubbles supply device 500 equipped with the plain body 430 as stated above is used, the length of the guide column 400 can be shortened to ½ or less of the length of the conventional flat sheet module or hollow fiber module.

Incidentally, even in the air bubbles supply device 500 equipped with the plain body 430 as well, in the guide column 400 the distribution of air bubbles supplied from the air bubbles supply device 500 needs to be appropriately set. For this purpose, as described earlier, the air bubbles supply device 500 is preferably set such that air bubbles at least at 30% of the total average value can be distributed to at least half of the tubular membranes 310. Therefore, for the air bubbles supply device 500 regarding this variation, the plain body 430 preferably possesses the air bubbles spouting pores 431 in a configuration pattern in which air bubbles at least at 30% of the total average value can be distributed to at least half of the tubular membranes 310.

Different from the case of the air bubbles supply device provided with air bubbles spouting pores of large apertures, air bubbles supplied from the plain body 430 having numerous minute air bubbles spouting pores 431 perforated therein rise in a bundle-like form (columnar form) that is like a slightly expanded face shape of the plain body 430. Hence, in comparison with the case of using air bubbles spouting pores of large apertures, designing of the plain body 430 for attaining the aforementioned purpose is far easy. In other words, the purpose is attained simply by making the face shape of the plain body 430 having a large number of the air bubbles spouting pores 431 almost equal to the cross section shape of the guide column 400 (the shape of the cross section perpendicular to the axial direction).

In addition, points to be taken care have already been discussed, which are related to the guide column 400 for almost uniformly delivering air bubbles emitted from the plain body 430 to all the tubular membranes 310 and to the interval between the guide column 400 and the plain body 430.

The air bubbles spouting pores 431 placed in the plain body 430 are numerously perforated at relatively short intervals, and thus particularly strict limitations do not exist for the configuration pattern thereof. However, the distribution of air bubbles is desirably made uniform as much as possible, and so the air bubbles spouting pores 431 are preferably configured so as to attain a closest packing pattern or a tetragonal lattice pattern in the face shape (plane shape) of the plain body 430.

Figure 26:
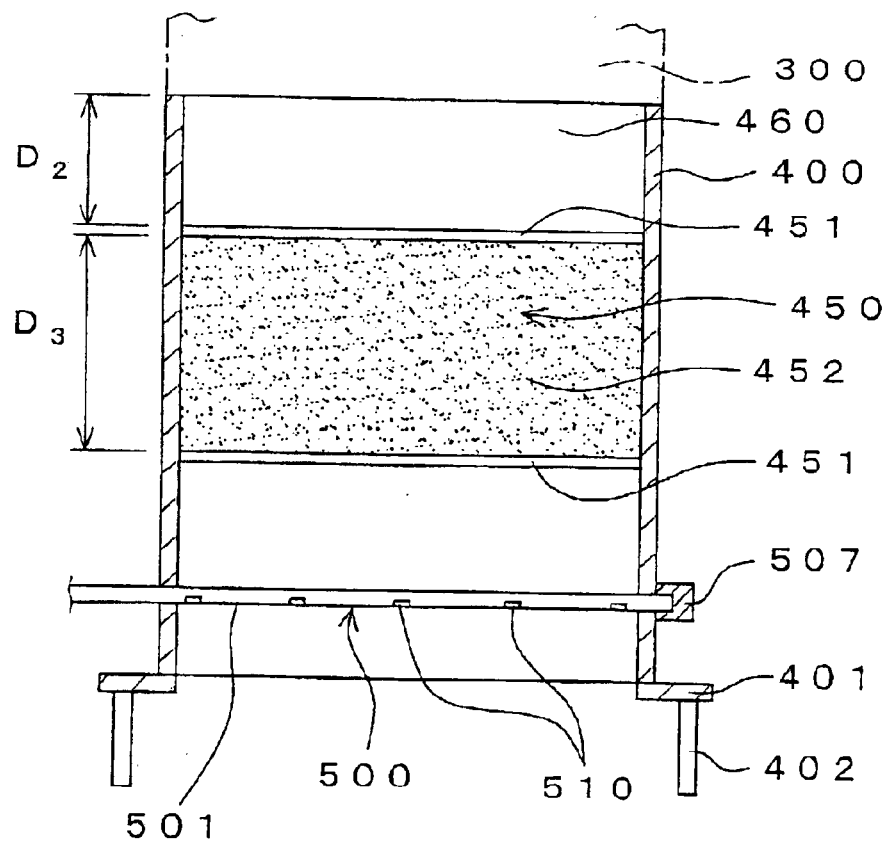
FIG. 26 is a diagram corresponding to FIG. 11 of another variation example of the aforementioned immersion type membrane filter apparatus.

(2) In the aforementioned immersion type membrane filter apparatus 200, the guide column 400 may be altered as shown in FIG. 26. In FIG. 26, the guide column 400 is made of a material similar to the above-mentioned housing vessel 301. It is a cylindrical member with the upper and lower ends opened and is set so as to be able to mount on the upper portion thereof the filtration membrane module 300. Inside this guide column 400 are disposed the air bubbles supply device 500 as in the case of the aforementioned embodiment and a filling material bed 450.

The filling material bed 450 is placed above the air bubbles supply device 500 within the guide column 400. In addition, this filling material bed 450 is disposed beneath the filtration membrane module 300 so as to form a space 460 between the filling material bed 450 and the filtration membrane module 300. Furthermore, the thickness of the space 460 ($D_2$ in FIG. 26) is normally preferably set at from 5 to 20 cm.

The filling material bed 450 is provided with a pair of networks 451, 451 placed horizontally at an interval to each other within the guide column 400 and a filling material 452 packed between the networks 451, 451. Each of the networks, 451 is for example a metal net for holding the filling material 452 within the guide column 400. The filling material 452 is intended for dispersing air bubbles spouting from the air bubbles supply device 500 as well as capturing a variety of contaminants, particularly fibrous contaminants. The kind of the filling material 452 is not particularly limited, and a variety of materials can be utilized according to the purpose of filtration processing, the properties of a fluid to be processed, the kinds of contaminants contained in a fluid to be processed and so forth.

However, preferably, the filling material 452 can be set to be a size of being sufficiently capable of attaining the performance of filtrating a fluid to be processed by means of the aforementioned filtration membrane module 300 using air bubbles supplied from the air bubbles supply device 500. Also, it preferably does not hinder a smooth circulating flow of a fluid to be processed within the storage bath 150. Usable filling materials for this purpose normally include materials having simple shapes and small bulk densities. For example, a material formed into a shape having an outside diameter of 5 to 50 mm (preferably 5 to 15 mm) and a length of 5 to 50 mm (preferably 5 to 15 mm), e.g., a porous hollow cylindrical material (pipe-like material) made of polypropylene resin, is preferably employed.

Various materials for such hollow cylindrical materials are commercially available and are usable. It may also be a material having a function as a microorganism carrier. Examples of hollow cylindrical materials having a function as a microorganism carrier include "Biostage" (trade name) available from TSUTSUNAKA SHEET WATERPROOF SYSTEMS CO., LTD. In addition, hollow cylindrical materials may be used as appropriate in a combination of two or more kinds.

When a guide column 400 as described above is used, air bubbles discharged from the air bubbles supply device 500 rise in a fluid to be processed and pass through the filling material bed 450. At this time, the air bubbles flow inside and on the surface of the filling material 452 and disperse while continuously changing the directions thereof along with the fluid to be processed within the filling material bed 450. Then, the air bubbles having passed through the filling material bed 450 rise while meandering within the space 460 and also widening the meander range. They come to be supplied almost uniformly to each of the tubular membranes 310 contained in the filtration membrane module 300. Along with the air bubbles supplied to the filtration membrane module 300 in this way, the fluid to be processed stored within the storage bath 2, as illustrated with the allows in FIG. 2, passes through each of the tubular membranes 310 of the filtration membrane module 300 from the lower side upwards, being subjected to filtration processing as described above.

In addition, a variety of contaminants such as fibrous materials contained in a fluid to be processed are captured by the filling material 452 during passage through the filling material bed 450. As a result, in the fluid to be processed, which flows from the filling material bed 450 toward the filtration membrane module 300, contaminants are effectively dislodged. Hence, the tubular membranes 310 of the filtration membrane module 300 hardly create closing caused by clogging of contaminants and thus enables stable filtration processing of the fluid to be processed.

In particular, in the filling material bed 450, when a porous, hollow cylindrical material having a function as a microorganism carrier as mentioned above is employed as the filling material 452, a fluid to be processed, because of a large surface area of the filling material 452 thereof, efficiently comes in contact with the surface and the inside thereof. At this time, a variety of microorganisms contained in the fluid to be processed are efficiently carried on the filling material 452. As a result, the microorganisms contained in the fluid to be processed are removed when passing through the filling material bed 450, and so the tubular membranes 310 is effectively prevented from clogging due to such microorganisms. Consequently, the immersion type membrane filtration system 100 using the immersion type membrane filter apparatus 200 equipped with such a filling material bed 450 can stably carry out filtration processing, even when a large volume of fluid to be processed, particularly an activated sludge fluid to be processed, is abruptly flowed into the storage bath 150.

Incidentally, even in the immersion type membrane filter apparatus 200 provided with a guide column 400 as stated above, within the guide column 400 the distribution of air bubbles supplied from the air bubbles supply device 500 needs to be appropriately set. To this end, as stated earlier, the filling material bed 450 of the guide column 400 is preferably set in such a way that air bubbles at least at 30% of the total average value can be distributed to at least half of the tubular membranes 310. Such conditions can normally be accomplished by regulating as appropriate the inside diameter of the tubular membrane 310, the number of the air bubbles spouting pores in the air bubbles supply device 500, the size of the filling material 452, the properties of a fluid to be processed (particularly, viscosity), the thickness of the filling material bed 450, the thickness of the space 460, etc. However, for many applications of this immersion type membrane filter apparatus 200, the above-mentioned conditions are satisfied only by taking into account the viscosity range of 1 to 50 mPa·s for a fluid to be processed and fibrous materials for contaminants contained in a fluid to be processed. On the other hand, realistically, the total volume of air bubbles to be emitted from the air bubbles supply device 500 is from 5 to 15 l/min. per membrane area of 1 m² of tubular membranes 310. Further, the number of the air bubbles spouting pores in the air bubbles supply device 500 is realistically about one for 100 cm² of the cross-sectional area, perpendicular to the axial direction, of the guide column 400. For this reason, normally, when the thickness of the filling material bed 450 ($D_3$ in FIG. 26) is set to be from 5 to 50 times the size (length) of the filling material 452 contained therein, the aforementioned conditions can be attained.

Additionally, when the thickness of the filling material bed 450 and the size of the filling material 452 are set as described above, air bubbles at least at 30% of the total average value become readily distributed to at least half of the tubular membranes 310 even if the number of the air bubbles spouting pores 510 and the configuration pattern in the air bubbles supply device 500 are not particularly considered.

(3) In the aforementioned embodiment, the case of the filtration membrane module 300 having the discharge port 303 of filtrate placed on the side of the housing vessel 301 was discussed. However, the filtration membrane module usable in the immersion type membrane filter apparatus 200 is by no means restricted to this.

Figure 27:
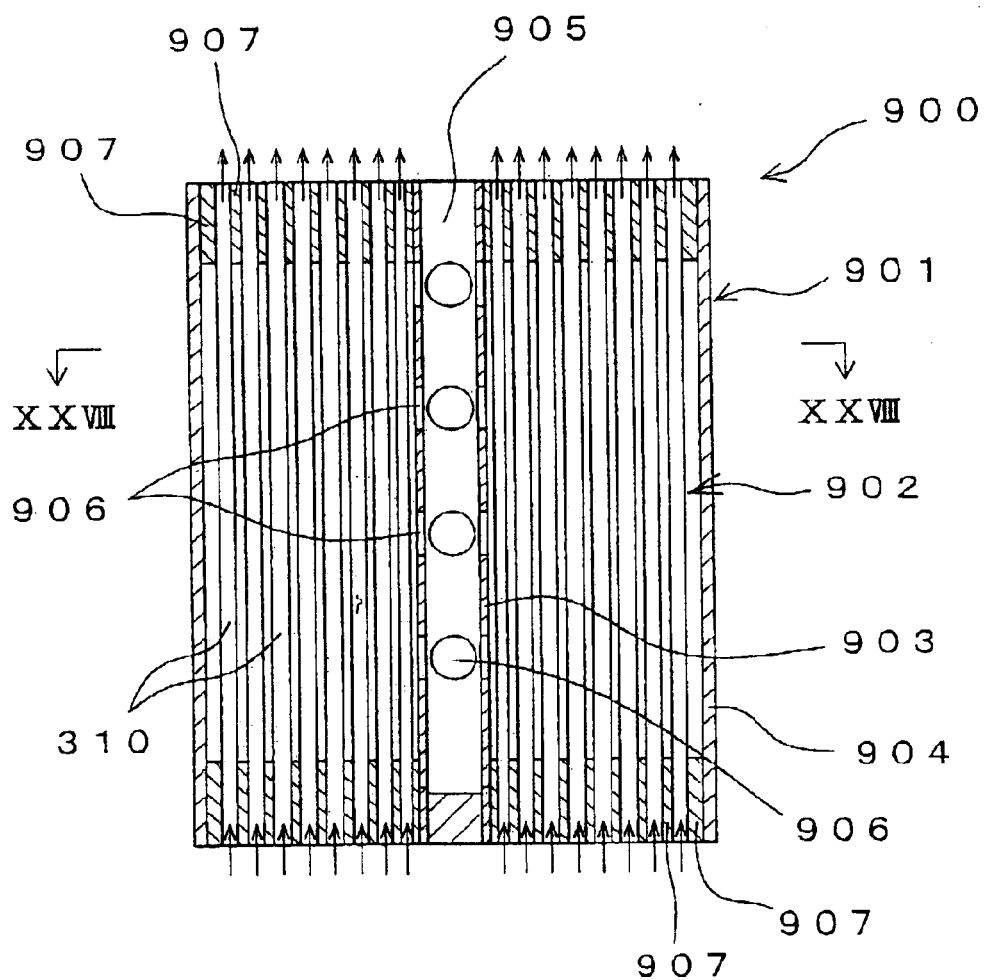
FIG. 27 is a longitudinal section of a filtration membrane module of another embodiment capable of being utilized in the aforementioned immersion type membrane filter apparatus.
Figure 28:
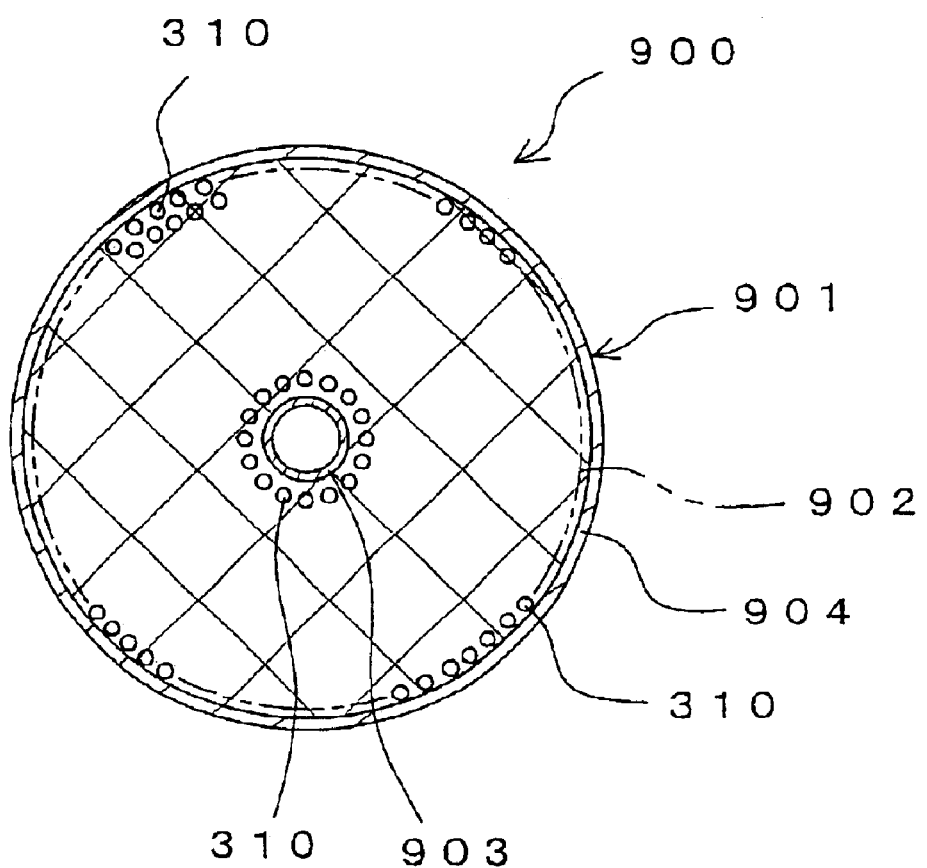
FIG. 28 is a diagram corresponding to the XXVIII—XXVIII section of FIG. 27 of another embodiment of the aforementioned filtration membrane module.

With reference to FIGS. 27 and 28, another embodiment of a filtration membrane module 900 usable in the immersion type membrane filter apparatus 200 will be discussed. This filtration membrane module 900 is primarily provided with a cylindrical housing vessel 901 and a group of tubular membranes 902 packed within this housing vessel 901. The housing vessel 901 is for example a resin member and is primarily equipped with a water-collecting tube 903 and a cylindrical outer column 904 disposed concentrically at intervals (gaps) outside the water-collecting tube 903 as the center thereof. The water-collecting tube 903 is closed at the lower end in the figure and is opened at the upper end in the figure to form a discharge port 905. In addition, the water-collecting tube 903 is provided with a plurality of fluid-passing holes 906 on the wall surface.

The group of tubular membranes 902 is a group containing a large number of the same tubular membranes 310 as those used in the aforementioned filtration membrane module 300. Each of the tubular membranes 310 is packed, in parallel with the water-collecting tube 903, in a space formed between the water-collecting tube 903 of the housing vessel 901 and the outer column 904. The upper and lower ends of this group of tubular membranes 902 each are integrally held and fixed to the housing vessel 901 by means of support portions 907 formed using a resinous material such as an urethane resin while keeping the both ends of each of the tubular membranes 310 open. As a result, both the ends of the housing vessel 901 are liquid-tightly closed by means of the support portions 907.

Further, in FIG. 27, for convenience in understanding, there are stressed the thickness of the tubular membrane 310, clearances between the tubular membranes 310, etc. In addition, for readily understanding diagrams, the tubular membranes 310 are expressed in a smaller number than in an actual number in FIG. 27 and only part of the tubular membranes 310 is presented in FIG. 28.

This filtration membrane module 900 can be produced for example via the following step.

Figure 29:
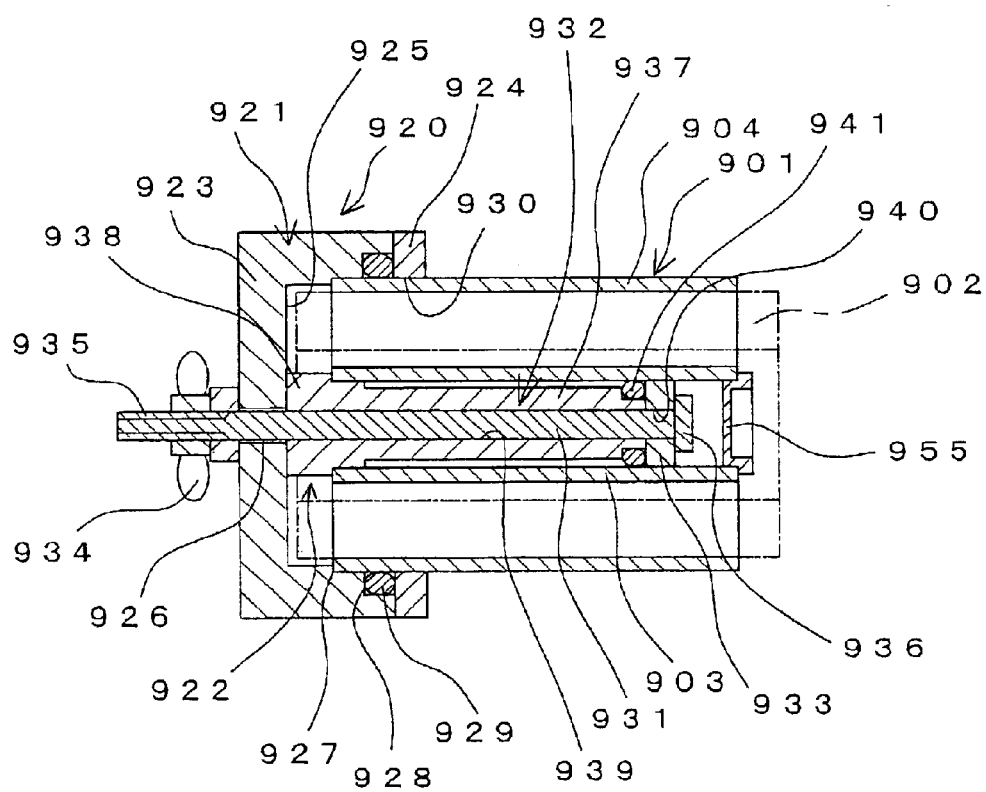
FIG. 29 is a diagram indicating a step of manufacturing the other embodiment of the aforementioned filtration membrane module.

First, the housing vessel 901 is formed using a fixing device 920 as illustrated in FIG. 29. The fixing device 920 used here is intended for fixing concentrically the water-collecting tube 903 within the outer column 904. It is provided with an outer column holding portion 921 for holding the outer column 904 and a water-collecting tube holding portion 922 for holding the water-collecting tube 903.

The outer column holding portion 921 possesses a receiving portion 923 for housing one end of the outer column 904 and a press plate 924 for fixing the outer column 904 to the receiving portion 923. The receiving portion 923 has a circular concave portion 925 capable of housing an end of the outer column 904 and forms a pore portion 926 in the center portion of the concave portion 925 thereof. In addition, the concave portion 925 is set such that the inside diameter of the opening side becomes large in a middle of the depthwise direction. In this altered diameter portion is formed a tier portion 927. Further, in the circumferential edge of the opened portion of the concave portion 925 is formed a groove 928. In this groove 928 is disposed a ringed elastic rubber body 929. On the other hand, the press plate 924 is a member equipped with an insertion hole 930 capable of inserting the outer column 904 into the central portion thereof. The shape of the flat plane is set to be almost the same as that of the receiving portion 923.

On the other hand, the water-collecting tube holding portion 922 is provided with a shaft 931, a position setting member 932, a press means 933 and a nut 934. The shaft 931 is a rod-like member capable of being inserted into the water-collecting tube 903 and being penetrated through the hole 926 of the receiving portion 923. It possesses a spiral portion 935 at one end thereof and the head 936 at the other end. The position setting member 932 is roughly a cylindrical member having integrally an insertion portion 937 capable of being inserted into the water-collecting tube 903 and a protrusion portion 938 protruding from the water-collecting tube 903 with the insertion portion 937 being inserted in the water-collecting tube 903. It forms in the central portion thereof a penetration hole 939 for penetrating the shaft 931. The extent of protrusion of the protrusion portion 938 is set to be the same as the distance between the lower portion in the concave portion 925 of the receiving portion 923 and the tier portion 927. The press means 933 is a disk-like member capable of being inserted into the inside of the water-collecting tube 903 and possesses in the center an insertion hole 940 for inserting the shaft 931. The nut 934 is placeable to a spiral portion 935 of the shaft 931.

When the housing vessel 901 is produced using the aforementioned fixing device 920, first, the outer column 904 is held with the outer column holding portion 921. Here, one end of the outer column 904 is inserted into the concave portion 925 of the receiving portion 923 to contact the tier portion 927. Then, with the outer column 904 being inserted in the insertion hole 930 of the press plate 924, the press plate 924 is fixed to the elastic rubber body 929 while being pressed. This allows the outer column 904 to be held with one end thereof being inserted in the concave portion 925.

Next, the water-collecting tube 903 is disposed in the inside of the outer column 904 using the water-collecting tube holding portion 922. Here, first, with a tubular elastic rubber body 941 being placed on the tip of the insertion portion 937 of the position setting member 932, the insertion portion 937 is inserted into the water-collecting tube 903. In addition, into the water collecting tube 903 is inserted the press means 933 from the other side of the side on which the position setting member 932 was inserted. Then, the shaft 931 is inserted into the insertion hole 940 of the press means 933 and the penetration hole 939 of the position setting member 932 such that the head 936 of the shaft 931 contacts the press means 933. Keeping this state, the water-collecting tube 903 is inserted into the inside of the outer column 904 so that the spiral portion 935 of the shaft 931 projects from the hole portion 926 of the receiving portion 923 and then the nut 934 is placed in the spiral portion 935. As a result, the fixing device 920 holds the water-collecting tube 903 and the outer column 904, with the water-collecting tube 903 being concentrically placed within the outer column 904, to form the housing vessel 901.

Next, into the housing vessel 901 formed as described above is packed the group of tubular membranes 902. Here, the group of tubular membranes 902 made by parallel bundling numerous tubular membranes 310 is inserted into a space formed between the outer column 904 and the water-collecting tube 903. At this time, the length of each of the tubular membranes 310 is set to be longer than that of the housing vessel 901 and then each of the tubular membranes 310 is set such that both the ends of the group of the tubular membranes 902 project from the housing vessel 901. In addition, both ends of each of the tubular membranes 310 are kept closed by heat sealing.

Figure 30:
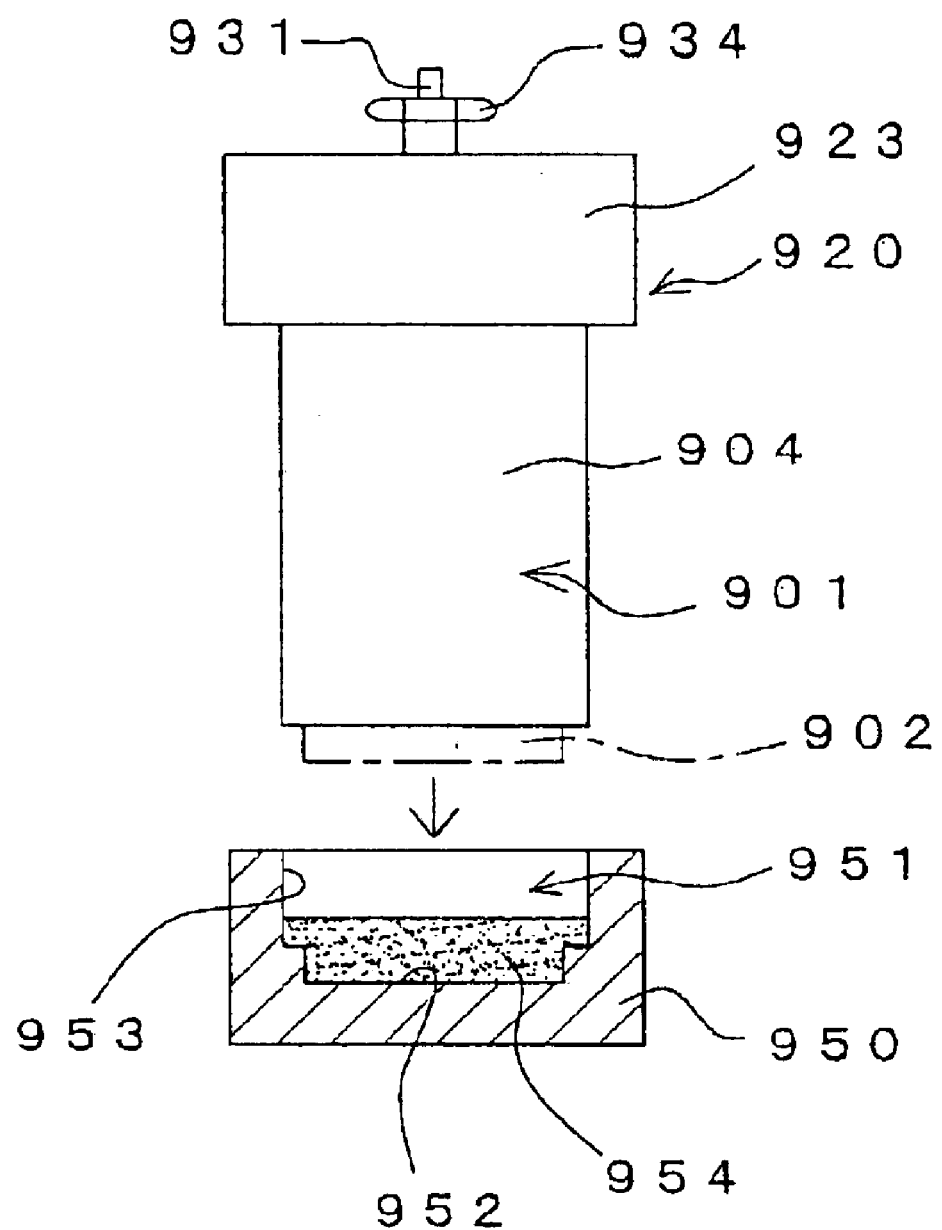
FIG. 30 is a diagram indicating another step of manufacturing the other embodiment of the aforementioned filtration membrane module.

Next, the group of the tubular membranes 902 is fixed to the housing vessel 901 using a resin material. Here, first, a mold 950 as indicated in FIG. 30 is prepared. This mold 950 is provided with a cavity 951, which is equipped with the central portion 952 into which the group of tubular membranes 902 can be inserted and an outer column insertion portion 953 continuously formed around the central portion 952, into which the outer column 904 of the housing vessel 901 can be inserted. Into the central portion 952 of this mold 950, an uncured resin material 954 (e.g., an uncured urethane resin) is poured.

On the other hand, in the housing vessel 901 formed by means of the fixing device 920, the opening side of the water-collecting tube 903 is closed with a cap 955 (FIG. 29). Then, as shown in FIG. 30, the group of the tubular membranes 902 projecting from the housing vessel 901 is gradually soaked into the resin material 954 poured in the central portion 952 of the cavity 951 and then the end of the outer column 904 is held within the outer column insertion portion 953. This state is maintained until the resin material 954 is cured. The mold 950 is removed after the complete cure of the resin material 954. This operation fixes one end side of the group of tubular membranes 902 to one end side of the housing vessel 901. Thereafter, the cured resin material 954 and the group of tubular membranes 902 protruding from the housing vessel 901 are cut away and the cap 955 is taken out.

Next, the housing vessel 901 is temporarily separated from the fixing device 920 and the housing vessel 901 was made reversed and then again fixed by means of the fixing device 920. In this state, a repetition of the operation as described above to the mold 950 fixes also the other end side of the group of tubular membranes 902 to the other end side of the housing vessel 901, thus obtaining the target filtration membrane module 900. In this case, unless the opening portion of the water-collecting tube 903 is closed with the cap 955, the resin material 954 also flows into the inside of the water-collecting tube 903, which comes to close one end of the water-collecting tube 903. In the filtration membrane module 900 thus obtained, the holding portion 907 by means of the cured resin material 954 is formed in both ends of the housing vessel 901, excluding both ends of each of the tubular membranes 310. As stated earlier, the ends come to be closed liquid-tightly by means of this holding portion 907.

Further, the resin material 954 for use in the above-mentioned manufacturing step, as in the filtration membrane module 300 used in the above-mentioned embodiment, may be, in addition to an urethane resin, another thermosetting resin such as an epoxy resin or a hot melt adhesive. Moreover, in the aforementioned manufacturing step, for the purpose of enhancing the adhesion between the housing vessel 901 and the resin material 954, the inner periphery of the outer column 904 and the outer periphery of the water-collecting tube 903 may be subjected in advance to surface treatment by corona discharge treatment or by utilizing an adhesive aid. In addition, in order to enhance the anchor effect of the resin material 954 on the housing vessel 901, at least one of a convex portion and a concave portion may be formed on both the inner peripheries of both ends of the outer column 904 and the outer peripheries of both ends of the water-collecting tube 903. Here, the convex portion can be formed by adhering to a predetermined site a ring made of the same material as that of the outer column 904 or the water-collecting tube 903. On the other hand, the concave portion can be formed by groove treatment, etc. to a predetermined site. Additionally, a groove-like concave portion is preferably circularly formed. Furthermore, a concave portion is preferably set in a shape that expands in the depthwise direction.

When the aforementioned immersion type membrane filter apparatus 200 is constituted using this filtration membrane module 900, the first discharge pathway 601 of the filtrate discharge pathway 600 is connected to the discharge port 905.

At the time of filtration processing of a fluid to be processed by means of this filtration membrane module 900, the fluid to be processed passes within each of the tubular membranes 310 of the filtration membrane module 900 from the lower side upwards along with air bubbles spouting from the air bubbles supply device 500 as illustrated with the arrows in FIG. 27. At this time, part of the fluid to be processed is filtrated by passing from the inside of the tubular membranes 310 to the outside, while components to be filtrated contained in the fluid to be processed are captured by the filtration membrane layers 311 of the tubular membranes 310 and thus removed from the fluid to be processed. The filtrated fluid (filtrate) having the components to be filtrated removed therefrom passes clearances between the tubular membranes 310 and flows from the fluid-passing holes 906 into the water-collecting tube 903. The filtrate flowed in the water-collecting tube 903 is continuously discharged from the discharge port 905 into the outside of the housing vessel 901 and thus into the filtrate discharge pathway 600. This series of filtration operations causes the fluid to be processed to pass through the filtration membrane module 900 from the lower side upwards as shown with the arrows in FIG. 1, resulting in natural circulation.

Incidentally, in order to attain compaction of the aforementioned filtration membrane module 900, without introducing elements other than the group of tubular membranes 902 into the housing vessel 901, the tubular membranes 310 are preferably packed as dense as possible.

In this filtration membrane module 900, as in the aforementioned filtration module 300, the tubular membranes 310 can be almost closest packed, but in reality small unpacked portions definitely occur. The ratio of these unpacked portions becomes small as the number of the tubular membranes 310 becomes large. The packing rate, the ratio of the area occupied by the tubular membranes 310 to the area of the total packed region, is 0.8 or more for the size of practical modules (with the maximum value being 0.9, the closest packing state). Therefore, in this filtration membrane module 900, the packing rate is preferably 0.8 or more. Additionally, the packing rate in this case is defined as the ratio of the area occupied by the tubular membranes 310 to the cross-sectional area $S_1$ (area of the shaded part in FIG. 28), perpendicular to the axial line direction, between the water-collecting tube 903 and the outer column 904 in the housing vessel 901. More specifically, the packing rate ($\epsilon$) in this filtration membrane module 900 is given by Equation (II) below:

$$\text{Packing rate } (\varepsilon) = \frac{N\pi d_o^2}{4S_1} \quad \text{(II)}$$

wherein N is the number of tubular membranes 310 contained in the group of tubular membranes 902, and $d_o$ is the outside diameter of the tubular membrane 310.

As stated earlier, attachment of the protrusion 320 on the surface of the tubular membrane 310 can reduce the resistance of the tubular membrane 310 to filtrate. However, if the number of the tubular membranes 310 disposed around the water-collecting tube 903 is small, filtrate having permeated through all the tubular membranes 310 has to pass through these limited gaps. Thus when the filtration flow rate is large, the resistance generated here cannot be neglected.

Here, from Equation (II) concerning the aforementioned packing rate, N, the number of the tubular membranes 310 is given by Equation (22) below:

$$N = \frac{4\varepsilon S_1}{\pi d_o^2} \quad (22)$$

In addition, the number of gaps of the tubular membranes 310 around the water-collecting tube 903 is proportional to the outside diameter $d_s$ of the water-collecting tube 903 and inversely proportional to the outside diameter $d_o$ of the tubular membrane 310. Then, briefly assuming that the total pressure loss F within the filtration membrane module 900 is created in these gaps, the filtration flow rate J is roughly proportional to the packing number N and the difference between the filtration pressure P and the pressure loss F. The filtration flow rate J is given, with the proportional coefficient being expressed by $\alpha$, by Equation (23) below:

$$J \approx \alpha \frac{4\varepsilon S_1}{\pi d_o}(P - F) \quad (23)$$

The pressure loss F, which is proportional to the filtration flow rate J and is inversely proportional to the number of the aforementioned gaps, with the coefficient being $\beta$, is given by Equation (24) below:

$$F = \beta \frac{J d_o}{d_s} \quad (24)$$

From these Equations (23) and (24), the ratio of J to the filtration flow rate $J_0$ at the pressure loss being 0 is expressed as Equation (25) below:

$$J/J_o = 1 \Big/ \left(1 + \frac{4\alpha\beta}{\pi} \frac{\varepsilon S_1}{d_s}\right) \quad (25)$$

Thus, for the filtration flow rate J being always 80% or more of $J_0$ independent of the size of the filtration membrane module 900, the relation given by Equation (26) below needs to be satisfied:

$$\frac{d_s}{S_1} > \frac{16\alpha\beta\varepsilon}{\pi} = \gamma\varepsilon \quad (26)$$

This Equation (26) has lack of exactness, but is useful for the designing of an actual filtration membrane module 900. In other words, the minimum value $d_s/S_1$ is determined by the filtration flux of a fluid to be processed, the height of the protrusion 320 of the tubular membrane 310 and the packing rate. The value is independent of the length of a module.

Assuming that the maximum flux during immersion type membrane filtration is 5 m/day, the value of the right-hand side of Equation (25) when $J/J_0$ becomes 80% is a value slightly larger than 1 m$^{-1}$ within the ranges of the height of the aforementioned protrusion 320 and packing rate. Therefore, in this filtration membrane module 900, a $d_s/S_1$ value of 0.3 to 1 m$^{-1}$ is preferably adopted that can suppress minimally the decline of energy efficiency due to pressure loss in almost all the applications. That is, preferably, the outside diameter $d_s$ of the water-collecting tube 903 is appropriately set such that this $d_s/S_1$ value is set within the above-mentioned range according to the size of the outer column 904.

Figure 31:
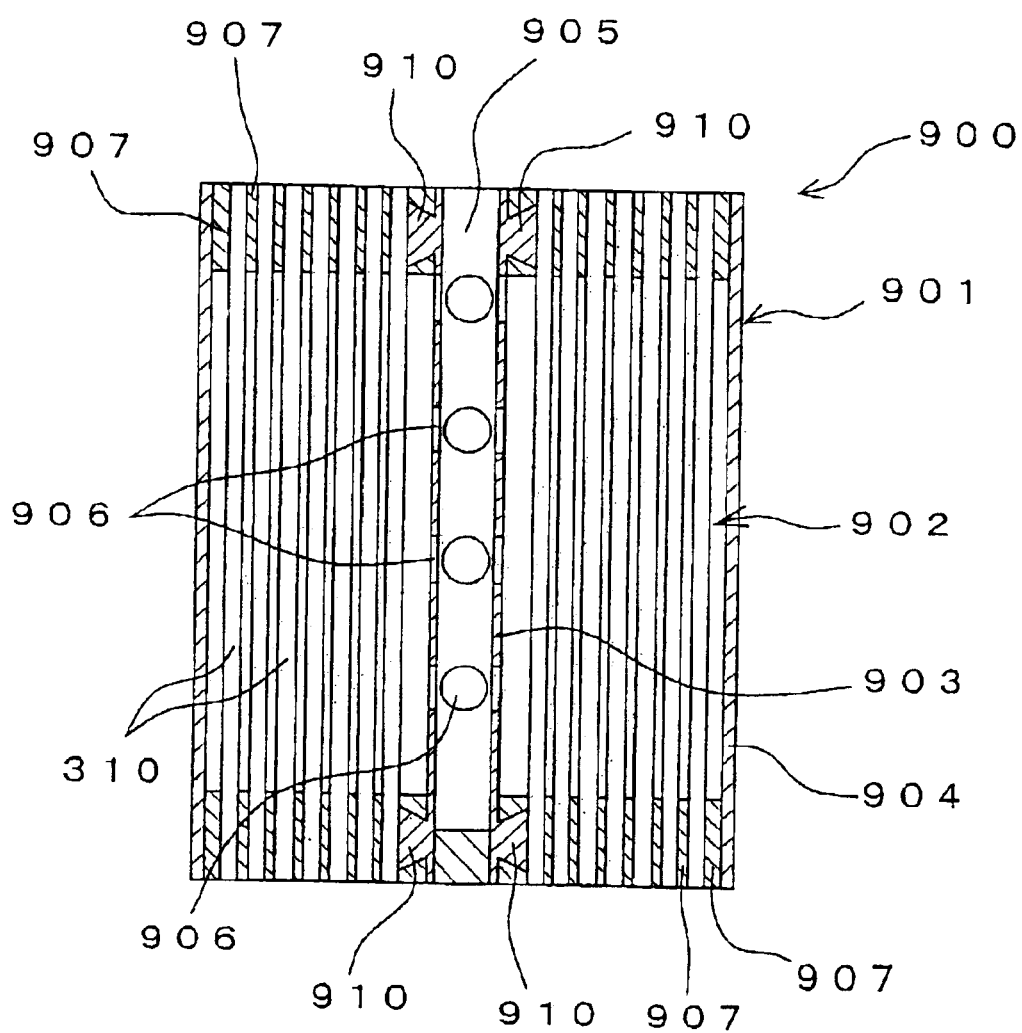
FIG. 31 is a diagram corresponding to FIG. 27 of a variation example of the other embodiment of the aforementioned filtration membrane module.

When the flux is as large as above 5 m/day, as shown in FIG. 31, a spacer 910 protruding to the direction of the outer column 904 is preferably disposed in the upper and lower portions on the outer periphery of the water-collecting tube 903. The formation of a space between the water-collecting tube 903 and the group of tubular membranes 902 by means of this spacer 910 (i.e., the group of tubular membranes 902 is disposed at a distance from the water-collecting tube 903) enlarges the clearances because of a flow of filtrate pushing the tubular membranes 310 slightly, thus enabling further reduction of the resistance to the filtrate.

In addition, the filtration flow rate of the tubular membranes 310 decreases as the inside diameter increases as Equation (2) above indicates. Therefore, from such a viewpoint, the inside diameter of the tubular membrane 310 for use in this filtration membrane module 900 is also preferably set at 15 mm or less, more preferably set at 10 mm or less.

In this filtration membrane module 900, when the packing rate and so forth are set as stated above, the membrane area per unit volume is large as compared with conventional modules employing hollow fiber membranes or flat sheet membranes, and thus leading to compaction easier than the conventional modules. Further, in immersion type membrane filtration using this filtration membrane module 900, when the volume of air bubbles to be supplied is set at almost the same volume as the case of immersion type membrane filtration using the conventional module, due to a similar reason, the filtration flow rate per unit volume becomes large as compared with the case of the conventional module. In other words, this filtration membrane module 900, like the filtration membrane module 300 as described in the aforementioned embodiment, is excellent in compaction and cost efficiency as compared with conventional filtration membrane modules. In particular, setting the aforementioned ratio ($d_s/S_1$) at the above range can suppress minimally the decline of energy efficiency due to pressure loss during filtration, and thus permitting further the enhancement of cost efficiency of immersion type membrane filtration. That is, this filtration membrane module 900, when the above-mentioned ratio being set at a predetermined range, enables further reduction of energy required for supply of air bubbles, thus permitting further enhancement of cost efficiency of immersion type membrane filtration.

(4) In the aforementioned immersion type membrane filter apparatus 200, the filtration membrane module 300 is formed cylindrically and thus the housing vessel 301 of the filtration membrane module 300 was formed cylindrically. However, the housing vessel 301 may be made into a column shape such as a squared column shape or a polygon (e.g. a polygon shape with 5 angles or more) or another columnar shape.

Figure 32:
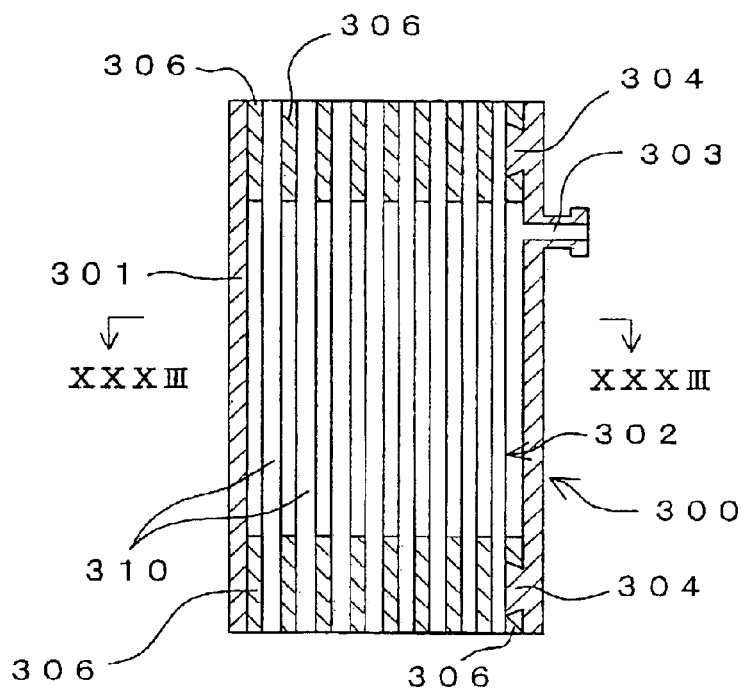
FIG. 32 is a longitudinal section of a filtration membrane module of a further embodiment capable of being utilized in the aforementioned immersion type membrane filter apparatus.
Figure 33:
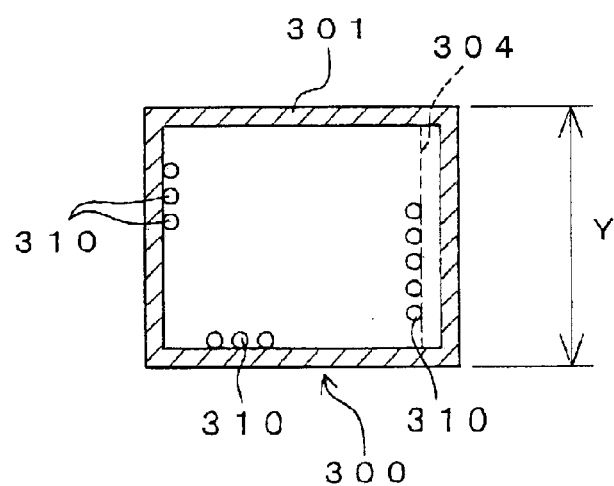
FIG. 33 is a diagram corresponding to the XXXIII—XXXIII section of FIG. 32 of the further embodiment of the aforementioned filtration membrane module.

FIGS. 32 and 33 show examples of the filtration membrane module 300 in which the housing vessel 301 is formed into a squared column. In this filtration membrane module 300, the housing vessel 301 possesses a discharge port 303 for filtrate on the side face thereof as in the above-mentioned embodiment. However, a spacer 304 is formed only on the face wherein the discharge port 303 is formed. Thus, the group of tubular membranes 302 are packed close to the inner face of the housing vessel 301 excluding the face having the spacer 304.

Further, for convenience in understanding, FIG. 32 stresses the thickness of the tubular membrane 310, clearances between the tubular membranes 310, etc. In addition, the tubular membranes 310 are expressed in a smaller number than in an actual number in FIG. 32 and only part of the tubular membranes 310 is presented in FIG. 33.

In this filtration membrane module 300 as well, clearances by means of the spacer 304 are formed between the group of tubular membranes 302 and the discharge port 303, and so filtrate from the tubular membranes 310 comes to be smoothly discharged at the discharge port 303 to the outside.

Figure 34:
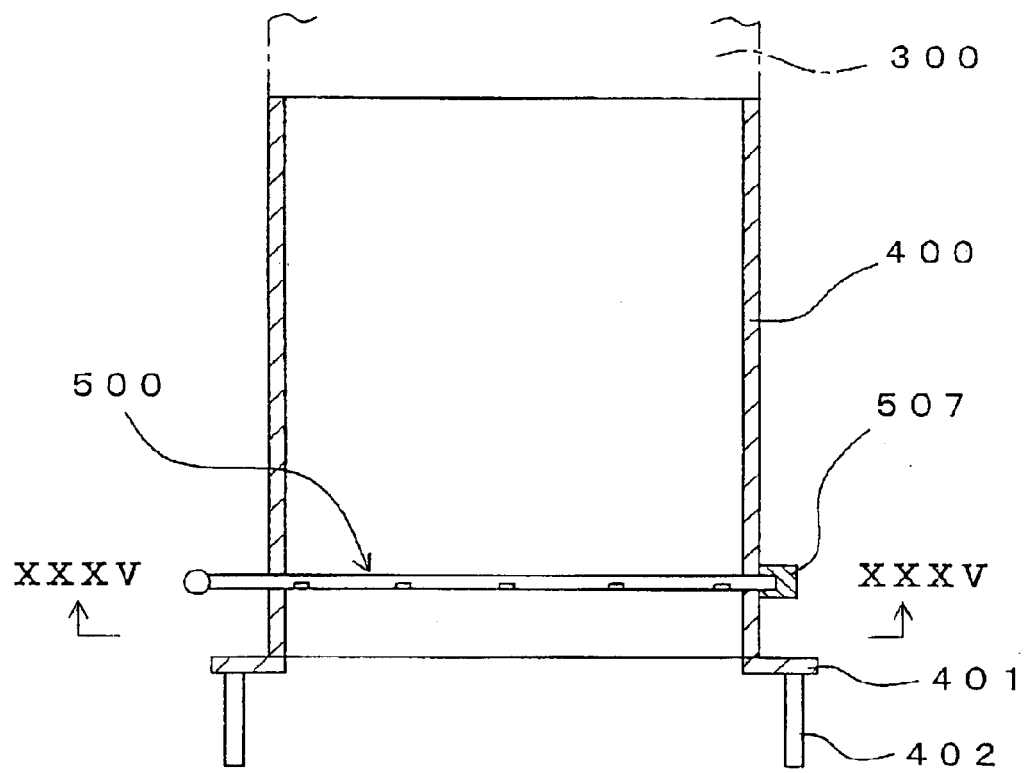
FIG. 34 is a diagram corresponding to FIG. 11 of a guide column concerning a variation example used when adopting the further embodiment of the aforementioned filtration membrane module.
Figure 35:
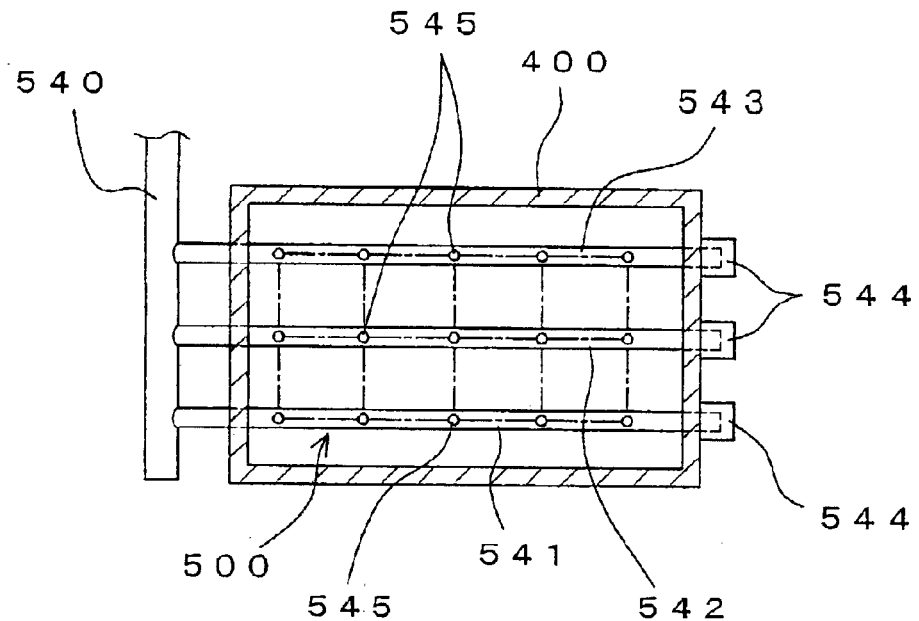
FIG. 35 is a diagram corresponding to the XXXV—XXXV section of FIG. 34 of the aforementioned guide column regarding a variation example.

When the filtration membrane module 300 of a squared column as described above, the guide column 400, as illustrated in FIGS. 34 and 35, needs to have the same shape as the cross section perpendicular to the axial direction (opening side direction) thereof. In particular, the shape of the inner circumference needs to be the shape of the cross section, perpendicular to the axial direction, of the aforementioned housing vessel 301, and particularly it needs to be set to be substantially equivalent in size and shape to the inner circumferential shape of the outer circumferential portion thereof.

In addition, in this case, the air bubbles supply device 500, with alteration of the shape of the guide column 400, needs to be changed in form. In this case, an usable air bubbles supply device 500 can be composed of, for example, a main pipe 540 and three branch pipes 541, 542 and 543. Here, the main pipe 540 is disposed in the outside of the guide column 400 and one end thereof is communicated with the air supply pathway 521. Then, the other end is hermetically closed by means of a not-shown cap. Furthermore, the branch pipes 541, 542 and 543 each are horizontally and orthogonally combined with the main pipe 540. The branch pipes extend in parallel with each other at regular intervals. Moreover, each of the branch pipes 541, 542 and 543 penetrates the guide column 400 horizontally in the direction of the length, and the edge portions are hermetically closed with caps 544.

The main pipe 540 and the branch pipes 541, 542 and 543 combined as described above are communicated at the intersections thereof. This forms a series of air pathways of the main pipe 540 and the branch pipes 541, 542 and 543.

In addition, each of the branch pipes 541, 542 and 543, as illustrated in FIG. 35, possesses a plurality of air bubbles spouting pores 545 (FIG. 35 shows an example of 15 air bubbles spouting pores 545). Each of these air bubbles spouting pores 545 is opened in the downward direction of the guide column 400 and is disposed in the tetragonal lattice pattern, as shown in FIG. 35, in the horizontal face of the cross section perpendicular to the axial direction (opening side direction) of the guide column 400. In other words, each of the air bubbles spouting pores 545 is disposed so as to locate at each vertex of squares as illustrated using alternate long and short dash lines in FIG. 35 and so as to disperse at regular intervals on the above-mentioned horizontal face of the guide column 400. In this case, the total number of the air bubbles spouting pores 545 is preferably set in accordance with Equation (19) above.

Further, as each of the pipes 540, 541, 542 and 543 constituting the aforementioned air bubbles supply device 500, a plastic cylindrical pipe is preferably used as in the case of the above-mentioned embodiment.

This air bubbles supply device 500, like the case of the aforementioned embodiment, can uniformly supply air bubbles to the tubular membranes 310 packed within the squared columnar housing vessel 301, and thus can exhibit the properties of varied filtration membrane module 300.

In addition, in the filtration membrane module 300 utilizing the squared columnar housing vessel 301 as described above, when the cross section shape perpendicular to the axial direction of the housing vessel 301 is of a slender rectangle (when the width Y in FIG. 33 is small), more specifically when the width Y has a value obtained from Equation (14) above, the number of branch pipes, as described above, required for forming the air bubbles supply device 500 may be one. Hence, in this case, the configuration pattern of a plurality of air bubbles spouting pores 545 placed in the branch pipes is not the above-mentioned tetragonal lattice pattern, but is set to be a linear pattern.

Furthermore, when the filtration membrane module 300 formed into a squared column shape as mentioned above is employed, the devices described in the aforementioned another embodiment (1) may be used as the guide column 400 and the air bubbles supply device 500. In this case, the guide column 400 and the plain body 430, conforming with the shape of the filtration membrane module 300, needs to be formed into squared columnar and rectangular shapes, respectively. Additionally, preferably, the plain body 430 is normally set in such a way that the distance between the plain body 430 and the lower end of the guide column 400 (distance corresponds to $D_1$ in FIG. 24) is about from ⅓ to ¼ of the diameter of the circle corresponding to the area of the shape (rectangle) of the cross section, perpendicular to the axial direction, of the filtration membrane module 300. During immersion type membrane filtration using the immersion type membrane filter apparatus 200, as stated earlier, a fluid to be processed circulates between the lower end of the guide column 400 and the plain body 430. Thus, when this distance is smaller than the above-mentioned distance, the air bubbles from the plain body 430 tends to be pushed and flowed towards the central axis of the filtration membrane module 300 by the circulating flow of such a fluid to be processed. As a result, the air bubbles supplied to the tubular membranes 310 located on the outer periphery side of the filtration membrane module 300 is small in volume, thus leading to the possibility of difficulty of the conduct of uniform filtration processing of the whole of the filtration membrane module 300.

(5) In the aforementioned embodiment, while the spiral protrusion 320 is placed on the outer periphery of the tubular membrane 310, even when such a protrusion 320 is not placed, the filtration membrane modules 300, 900 can provide backwashing.

In addition, in the aforementioned embodiment, although the protrusion 320 is placed in the form of a continuous spiral in the tubular membrane 310, the form of the protrusion 320 is by no means limited to this. Namely, the protrusion 320 may be partially placed on the outer periphery of the support membrane layer 312, and may be disposed, for example, in a variety of forms such as an intermittent spiral or point-like form.

Figure 36:
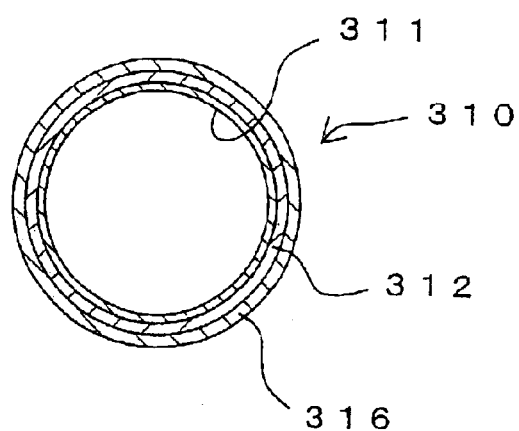
FIG. 36 is a diagram corresponding to FIG. 7 of a variation example of a tubular membrane for use in the aforementioned filtration membrane module.

(6) In the aforementioned embodiment, the tubular membrane 310 is formed in a two-layer structure of the filtration membrane layer 311 and the support membrane layer 312. However, when the crushing pressure of the tubular membrane 310 is set at the above-mentioned required value by setting as appropriate the ratio of the wall thickness to the outside diameter, as shown in FIG. 36, a reinforcing layer 316 having liquid permeability may be disposed further on the outer periphery of the support membrane layer 312.

The reinforcing layer 316 used here, if having liquid permeability, is not particularly limited. However, an unwoven cloth similar to one constituting the support membrane layer 312 is normally used, particularly an unwoven cloth of a polyester-based resin is preferably used. In addition, the tubular membrane 310 having this reinforcing layer 316 can normally be produced using a composite membrane fabricated by laminating the reinforcing layer 316 further on the support membrane layer 312 side of the above-mentioned composite membrane 313 used for producing the tubular membrane 310. When such a composite membrane is produced, the reinforcing layer 316 is normally preferably adhered by scattering a hot melt adhesive or a thermosetting adhesive on the surface of the support membrane layer 312. Doing so enables the composite membrane to suppress the increase in filtration resistance by means of the reinforcing layer 316, thus permitting the attainment of the filtration resistance like in the case of the aforementioned embodiment and thus filtrate permeability.

In addition, when the tubular membrane 310 is provided with this reinforcing layer 316, the calculation for the wall thickness and the outside diameter of the tubular membrane 310 includes this reinforcing layer 316. Furthermore, when the protrusion 320 as described above is formed on the surface of the tubular membrane 310, the protrusion 320 needs to be formed on the surface of the reinforcing layer 316.

Additionally, the tubular membrane used in the aforementioned verification testing regarding the filtration membrane module 300 possesses this reinforcing layer 316.

Figure 37:
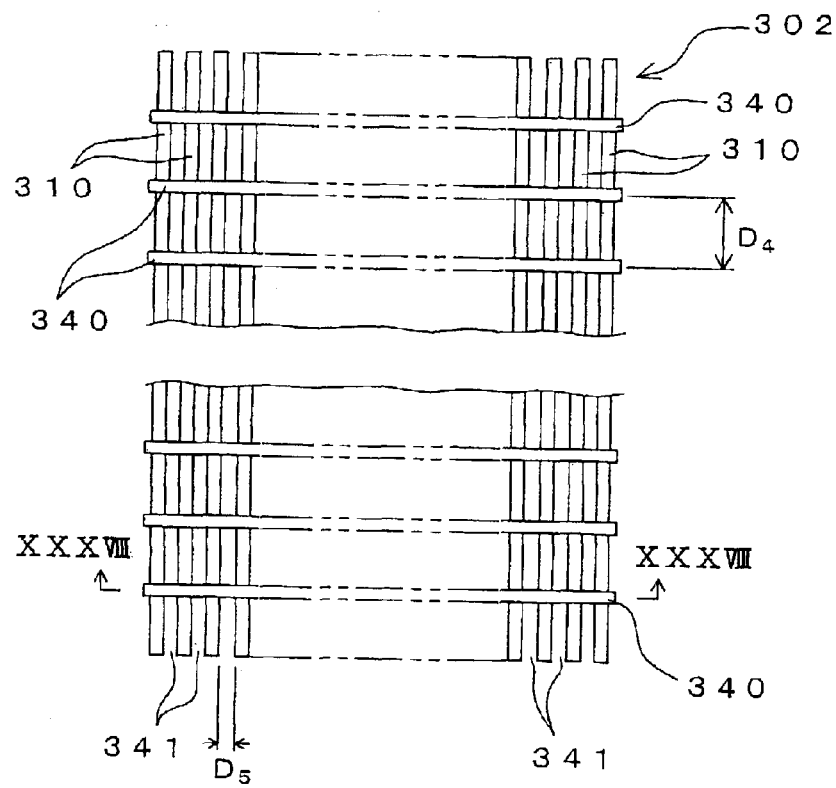
FIG. 37 is a development of an example of a group of tubular membranes capable of being utilized in the aforementioned filtration membrane module.
Figure 38:
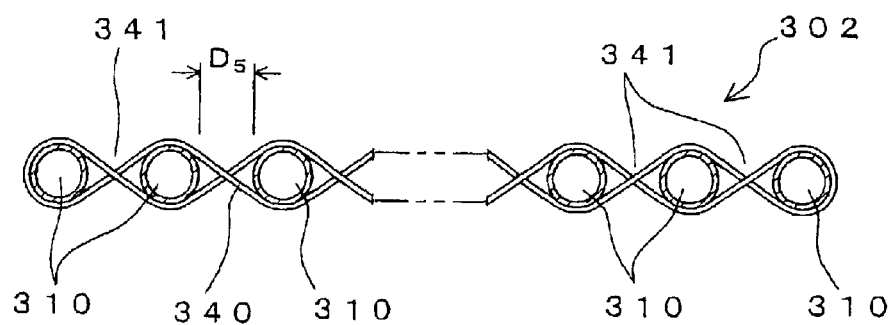
FIG. 38 is the XXXVIII—XXXVIII sectional view of FIG. 37.

(7) In the aforementioned filtration membrane module 300, numerous tubular membranes 310 may be connected in advance to constitute the group of tubular membranes 302. In this group of tubular membranes 302, for example as illustrated in FIG. 37, numerous tubular membranes 310 are placed flatly and in parallel. Each of the tubular membranes 310 is integrally knitted in a bamboo blind form by means of connecting threads 340 disposed in parallel at every regular intervals in the direction of the length of the tubular membrane 310. The connecting threads 340, as shown in FIG. 38, connect the tubular membranes 310 to each other such that it intersects between each of the tubular membranes 310. In addition, when the tubular membranes 310 are connected in a bamboo blind form using the connecting threads 340, for example, a bamboo blind knitting machine for producing a bamboo blind using plastic tubes can be used.

In the aforementioned group of tubular membranes 302, the interval between the connecting threads 340 ($D_4$ in FIG. 37) varies with the length of the tubular membrane 310 and is not particularly limited if the group of tubular membranes 302 is set to be capable of maintaining almost a certain plane shape. However, preferably, it is normally set at from 10 to 20 cm. In addition, the thickness of the connecting threads 340 is not particularly limited, but normally preferably from 0.02 to 0.2 mm. Furthermore, the connecting threads 340 are not specially limited in material, but normally preferably synthetic fibers such as, for example, polyester monofilaments, staple fibers and films are used.

This group of tubular membranes 302 form clearances by inserting the connecting threads 340 in between neighboring tubular membranes 310. This clearance 341 prevents the tubular membranes 310 from coming in contact with each other to enhance the flowability of filtrate. For example, when the size of the clearance 341 is set at 0.05 mm, if the effective length of the tubular membrane 310 is for example 70 cm, at least an area $0.005 \times 70 = 0.35$ cm$^2$ is ensured between neighboring tubular membranes 310. Hence, the presence of many clearances 341 within the group of tubular membranes 302 significantly reduces the resistance to the flow of filtrate within the housing vessel 301, thereby remarkably enhancing the flowability of the filtrate. That is, the filtration membrane module 300 provided with this group of tubular membranes 302 enables the enhancement of the flowability of filtrate within the housing vessel 301, and thus readily discharges the filtrate at the discharge port 303 without hindrance.

The size of the clearance 341 ($D_5$ in FIGS. 37 and 38) can be adjusted by selecting as appropriate, for example, the thickness of the connecting threads 340. However, normally, it is preferably set at from 0.02 to 0.2 mm, more preferably set at from 0.05 to 0.1 mm. At the size of the clearance 341 less than 0.02 mm, the tubular membranes 310 readily come in contact with each other within the housing vessel 301, thus enhancing the filtration resistance to raise the possibility of a decline in filtration flow rate. Inversely, at the size above 0.2 mm, the number of the tubular membranes 310 packable within the housing vessel 301 is reduced, and thereby the filtration area (effective membrane area) per unit volume of filtration membrane module 300 becomes small. As a result, the filtration flow rate is reduced, which may make it difficult to efficiently conduct filtration processing of a fluid to be processed while planning compaction of the filtration membrane module 300.

In addition, the size of the clearance 341 may be selected as appropriate according to the kind of fluid to be processed as well. For example, when a fluid to be processed is comparatively small in filtration flow rate like an activated sludge fluid, the clearance 341 is preferably set to be slightly smaller from the viewpoint of securing the filtration area. On the other hand, when a fluid to be processed is relatively large in filtration flow rate like water of rivers, the clearance 341 is preferably set to be slightly larger from the viewpoint of enhancing the flowability of filtrate. In this connection, the clearance 341, if the size is within the aforementioned range, hardly becomes a large resistance to the flow of filtrate in most fluids to be processed even if the filtration membrane module 300 is a large type having a membrane area of about 100 m$^2$.

Furthermore, the filtration membrane module 300 can readily be produced if this group of tubular membranes 302 is used. In other words, when the tubular membranes 310 are not integrated, the tubular membranes 310 become crimped when inserted into the housing vessel 301, or the heat sealing step becomes complicated. When the number of the tubular membranes 310 packed in the housing vessel 301 is small, skill is required for producing the filtration membrane module 300 because part of the tubular membranes 310 sometimes drop off when the combination 330 as stated above (refer to FIGS. 9 and 10) is immersed into the mold 332. In contrast, when this group of tubular membranes 302 is used, the group of tubular membranes 302 in an integrally combined state can readily be inserted into the housing vessel 301 and also can stably be held within the housing vessel 301, and so the filtration membrane module 300 can readily be produced.

Additionally, this group of tubular membranes 302 can be utilized in the filtration membrane module 900 regarding the aforementioned variation as well and in that case the efficacy as the above can be attained.

Figure 39:
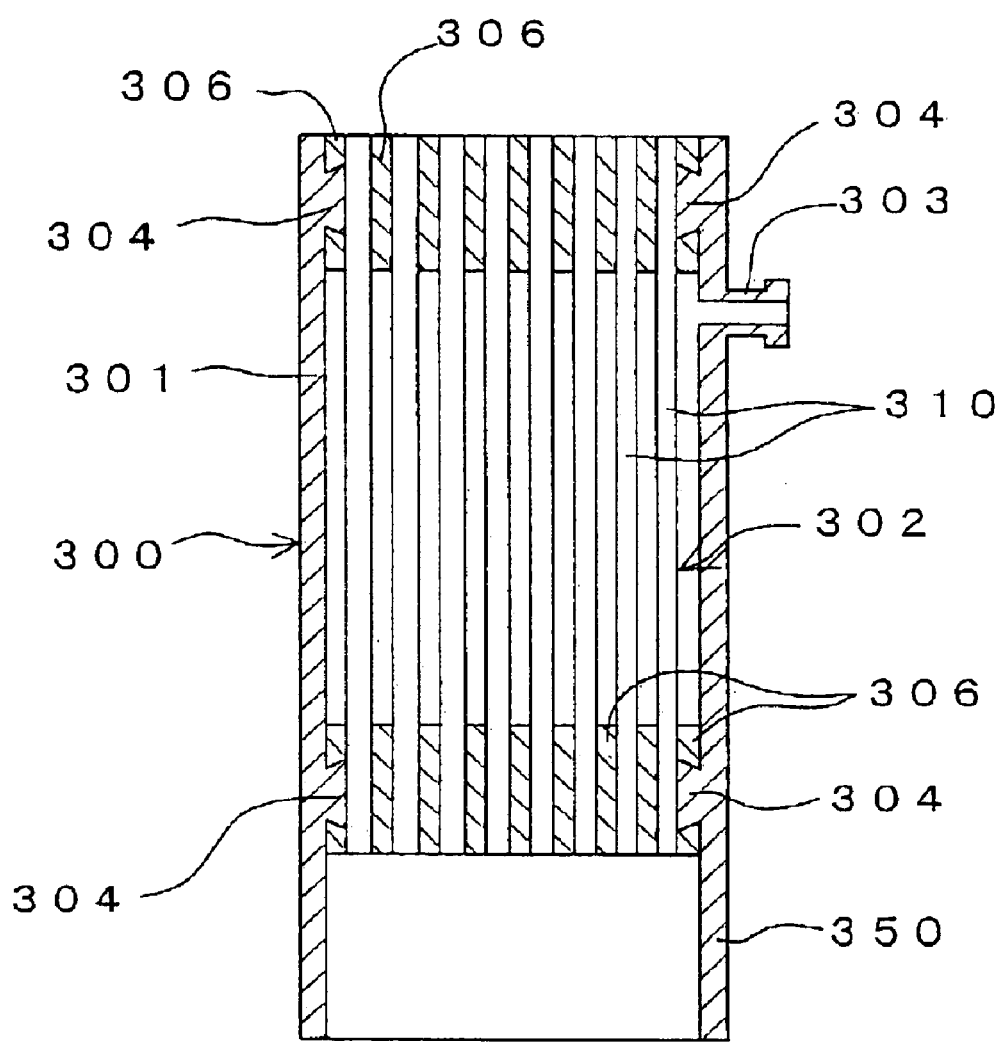
FIG. 39 is a longitudinal section of a variation example of the filtration membrane module shown in FIG. 2.

(8) In the filtration membrane module 300 used in the immersion type membrane filter apparatus 200 concerning the above-mentioned embodiment, as shown in FIG. 39, only the lower portion of the housing vessel 301 may be extended downwards. In other words, the housing vessel 301 may possess a wall portion 350 extending downwards at the end of the air bubbles supply device 500 side. When using this filtration membrane module 300, the guide column 400 does not need to be set separately for the immersion type membrane filter apparatus 200. Namely, air bubbles from the air bubbles supply device 500 rise in a fluid to be processed toward the group of tubular membranes 302 while being guided by the wall portion 350. Further, in this case, the air bubbles supply device 500, depending on the form thereof, may be disposed within a space formed by the wall portion 350, or may be disposed beneath the wall portion 350.

Figure 40:
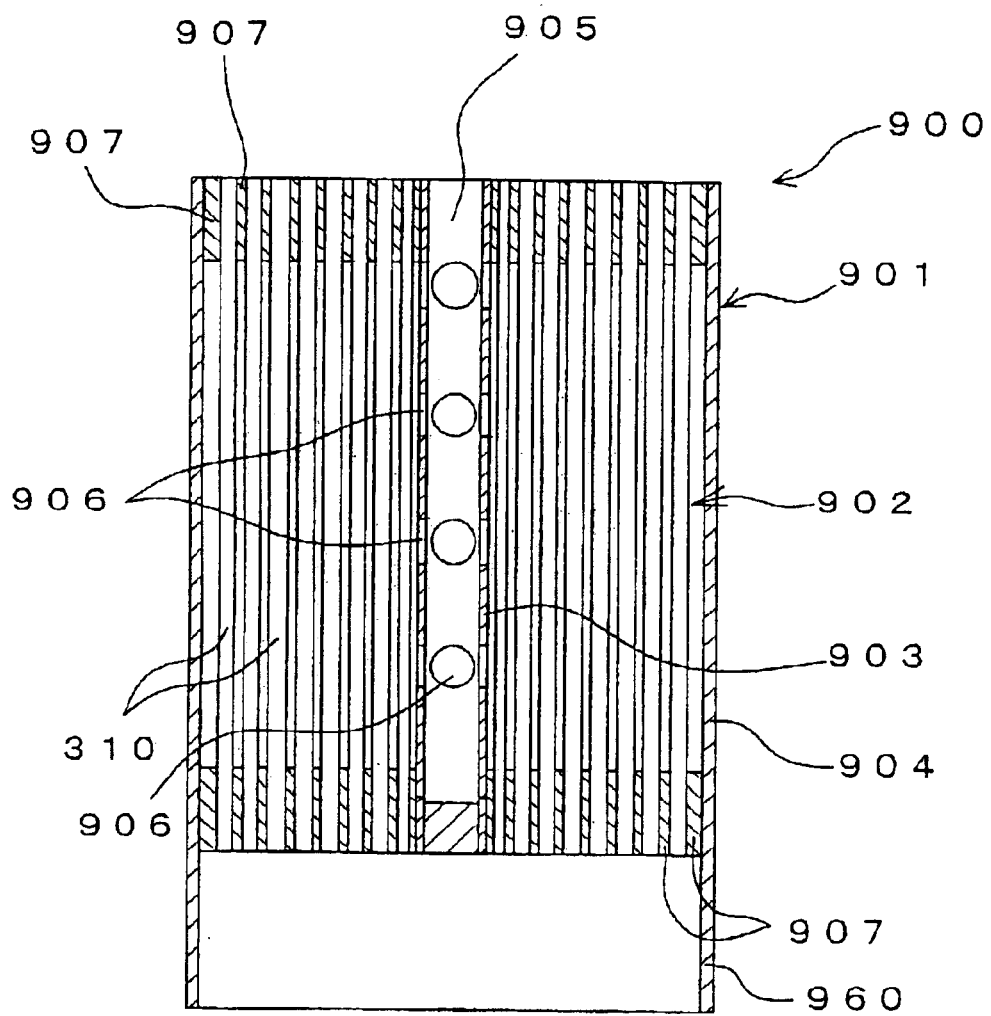
FIG. 40 is a longitudinal section of a variation example of the filtration membrane module shown in FIG. 27.

In addition, in the filtration membrane module 900 described in the aforementioned embodiment (3), as shown in FIG. 40, only the lower portion of the outer column 904 of the housing vessel 901 may be extended downwards. In other words, the outer column 904 may possess a wall portion 960 extending downwards at the end of the air bubbles supply device 500 side. The immersion type membrane filter apparatus 200 using this filtration membrane module 900, as in the case of using the aforementioned filtration membrane module 300, without using the guide column 400, can guide air bubbles from the air bubbles supply device 500 to the group of tubular membranes 902.

(9) In the aforementioned immersion type membrane filter apparatus 200, filtrate is set to be discharged at the discharge port 303 by means of the water head pressure between the tip portion 604 of the filtrate discharge pathway 600 and the fluid surface L of a fluid to be processed stored within the storage bath 150. However, the filtration method using the immersion type membrane filter apparatus 200 is by no means limited to this. For example, in immersion type membrane filter apparatus 200, a sucking device (negative pressure setting means) such as a suction pump or a siphon is installed on the tip portion 604 of the filtrate discharge pathway 600. By means of this, when the discharge port 303 of the filtration membrane module 300 is positively set at a negative pressure as well, filtrate can be discharged at the discharge port 303, and thus immersion type membrane filtration can be conducted in a similar manner to a fluid to be processed.

The efficacy of the present invention will hereinafter be described more specifically by means of experimental examples.

EXPERIMENTAL EXAMPLE 1

In 56 parts by weight of tetrahydrofuran as a solvent was dissolved 14 parts by weight of a heat resistant polyvinyl chloride resin and to this was further added 30 parts by weight of isopropyl alcohol. A porous polyester resin-based unwoven cloth having a thickness of 0.12 mm was impregnated with the synthetic resin solution thus obtained and then was dried. In this way, a composite membrane having a thickness of 0.15 mm was obtained by laminating a filtration membrane layer of a polyvinyl chloride film having numerous pores with an average pore diameter of 0.4 µm and a support membrane layer of a polyester resin-based unwoven cloth. In addition, a reinforced composite membrane was separately produced by scattering a hot melt adhesive on the support membrane layer side of this composite membrane and further laminating a polyester resin-based unwoven cloth having a thickness of 0.15 mm as the reinforcing layer.

In addition, the reinforced composite membrane thus obtained was cut into a tape shape having a width of 2 cm. This reinforced composite membrane tape was spirally wound on a cylindrical rod such that the reinforcing layer side is on the surface side. During this time, both ends of the tape in the widthwise direction were made overlapped and a spiral protrusion was formed on the surface. Then, the overlapped portion was subjected to supersonic wave deposition to produce a tubular membrane having a length of about 70 cm, an inside diameter of 7 mm and a wall thickness of 0.3 mm, with the height of the protrusion being 0.05 mm, the outside diameter including this protrusion being 7.7 mm, and the ratio of the wall thickness to the outside diameter being 0.045.

A module like the aforementioned filtration membrane module 300 was produced using the tubular membranes with a protrusion thus obtained. Here, for a housing vessel was utilized a hard vinyl chloride tube for a waterway tube having a total length of 65 cm of JIS K 6741-1975 nominal-350 (nominal pressure 500 kPa, approximate inside diameter 348 mm, thickness 10.5 mm and weight of 18 kg per meter) and to this was welded a socket of JIS K 6741-1975 nominal-25, made of a hard vinyl chloride and having screw, to form a discharge port. The position of the discharge port was set such that the central position thereof was 7 cm from the tip of the housing vessel.

In addition, two circular spacers having the cross section of a wedge shape were cut out of the same hard vinyl tube having used for the housing vessel. Then, each of the circular spacers was bonded to the inner periphery of the housing vessel using an adhesive for a waterway tube at a position about 1 cm inside of each end of the housing vessel to dispose the spacers within the housing vessel. Furthermore, this spacer possesses a width of 2 cm in the vertical direction of the inner periphery side of the housing vessel, and a width of 3 cm in the vertical direction of the central side of the housing vessel, and also possesses slits having a width of 5 mm every about 5 cm in the circumferential direction. In this housing vessel, the spacer portion has an approximate inside diameter of 327 mm and the ratio of the spacer portion to the cross-sectional area of the inner surface, perpendicular to the axial direction, of the housing vessel is 6%.

Then, there were prepared the 1,600 tubular membranes obtained as described above. The length of each of the tubular membranes was cut equal to 73 cm and both the ends of each of the tubular membranes was heat sealed. Thereafter, these tubular membranes were bundled to form a group of tubular membranes, and then this group of tubular membranes was inserted into the aforementioned housing vessel. Here, the group of tubular membranes was set in such a way that both the ends each projected 4 cm from each of the ends of the housing vessel. In this manner, a combination of the group of tubular membranes and the housing vessel was obtained.

Next, one end of the combination was gradually soaked into a Teflon mold containing an uncured urethane resin and left until the urethane resin was completely cured. After curing of the urethane resin, the other end of the combination was processed in the same way. Then, the cured urethane resin was cut off at both the ends of the housing vessel to obtain a target filtration membrane module of an actual scale. In addition, the length of a support portion of the urethane resin, which fixes the group of tubular membranes to the housing vessel, each was set at 5 cm for each of the upper and lower sides of the housing vessel.

This filtration membrane module had an effective membrane area of 19 $m^2$ and the packing ratio of the tubular membranes was 0.78. Further, the membrane area per unit volume based on the outer dimension of the module was 280 $m^2/m^3$. This value is about twice the value of the flat sheet module or the hollow fiber module having a similar size. Therefore, this filtration membrane module can be made with further compaction while maintaining filtration performance when compared with the conventional flat sheet module or hollow fiber module.

In addition, taking into account the results of the aforementioned verification testing, the filtration flow rate per unit volume, based on the outer dimension, of this filtration membrane module is twice or more that of the flat sheet module or hollow fiber module, used at a similar air flow rate. For the immersion type membrane filtration method, the energy cost required for filtration processing increases as the flow rate to be actually used increases, and so this filtration membrane module is particularly excellent in cost efficiency when compared with the conventional flat sheet module or hollow fiber module.

EXPERIMENTAL EXAMPLE 2

A tubular membrane having a smooth outer periphery, a length of about 70 cm, an inside diameter of 5 mm, a wall thickness of 0.3 mm and a ratio of the wall thickness to the outside diameter being 0.054 was produced by constituting tubularly the reinforced composite membrane obtained in Experimental Example 1 as in the case of Experimental Example 1.

One end of the tubular membrane thus obtained was sealed and made wet sufficiently with water and then the other end was connected to a vacuum pump. When the pressure inside the tubular membrane was gradually reduced while observing the outside conditions of the tubular membrane, the membrane was abruptly crushed at −80 kPa. This tubular membrane has a large crushing pressure and a strength capable of being backwashed because the ratio of the wall thickness to the outside diameter is set as described above.

EXPERIMENTAL EXAMPLE 3

A tubular membrane as in Experimental Example 2 was produced with the exception that the inside diameter was set at 7 mm and that the ratio of the wall thickness to the outside diameter was set at 0.039. This tubular membrane, when the inside pressure was reduced as in Experimental Example 2, was abruptly crushed at about −30 kPa. This tubular membrane also has a large crushing pressure and a strength capable of being backwashed because the ratio of the wall thickness to the outside diameter is set as described above.

REFERENCE EXAMPLE 1

A tubular membrane having a smooth outer periphery, a length of about 70 cm, an inside diameter of 5 mm, and a ratio of the wall thickness to the outside diameter being 0.028 was produced by constituting tubularly the composite membrane (prior to laminating a reinforced layer) obtained in Experimental Example 1 as in the case of Experimental Example 1. This tubular membrane, when the inside pressure was reduced as in Experimental Example 2, was abruptly crushed at about −17 kPa. This tubular membrane has a small crushing pressure as compared with those in Experimental Examples 2 and 3 because the ratio of the wall thickness to the outside diameter is set as described above.

EXPERIMENTAL EXAMPLE 4

A filtration membrane module having a membrane area of about 0.13 $m^2$ was produced using the tubular membranes obtained in Experimental Example 2 as in Experimental Example 1. To the lower portion of this filtration membrane module was connected as the guide column for air bubbles a plastic pipe having the same inside diameter as that of the housing vessel of the module. Then this was immersed in a fluid to be processed and air bubbles were made emitted at a flow rate of 15 L/min per 1 $m^2$ of membrane area from a nozzle with an aperture of 4 mm disposed 20 cm beneath the filtration membrane module to start to filtrate the fluid to be processed at a pressure equivalent to a water head difference of 60 cm (about 6 kPa).

In addition, a transparent aqueous solution with a carboxymethyl cellulose concentration of 3,000 ppm was used as the fluid to be processed. This aqueous solution had a viscosity of 7 mPa·s at 25° C. However, the viscosity of the filtrate was about 1.3 mPa·s, and so the carboxymethyl cellulose appears to suspend in microgel form.

In the aforementioned filtrating step, the filtration flow rate was initially 30 mL/min, but gradually decreased. It became 17 mL/min in two hours and then leveled off. The filtration was rendered to pause three hours after the initiation of filtration and air bubbles alone were made to continue to be delivered for 10 minutes. Then, filtration was started again. The initial filtration flow rate was recovered to 20 mL/min, but was lowered again to 17 mL/min in about 10 minutes.

Thereafter, to the filtrate discharge port (inside diameter 6 mm, length 1.5 m) of the filtration membrane module was connected a compressor to apply an air pressure of 40 kPa into the housing vessel. By this operation, the tubular membranes were backwashed using the filtrate remaining at the discharge port and within the housing vessel. The time required for backwashing was about 20 seconds. Then, filtration was initiated again. The initial filtration flow rate was recovered to 27 mL/min and became 17 mL/min in about one hour.

As a result, it is shown that the filtration membrane module of this experimental example, when backwashing is conducted, can effectively dislodge a cake layer of carboxymethyl cellulose accumulated on the inner periphery of each of the tubular membranes and thus can have increased life when backwashing is as appropriate repeated.

EXPERIMENTAL EXAMPLE 5

In the step of producing the tubular membranes of Experimental Example 1, a tubular membrane (ratio of the wall thickness to the outside diameter being 0.069) having a spiral protrusion set at a height of 0.1 mm by means of a welded portion was fabricated by regulating the energy during supersonic wave deposition. Further, the composite membrane used in Reference Example 1 was formed into a cylindrical shape to produce a smooth tubular membrane (ratio of the wall thickness to the outside diameter being 0.028) having no protrusion on the surface thereof, with the length and the inside diameter being set equal.

Figure 41:
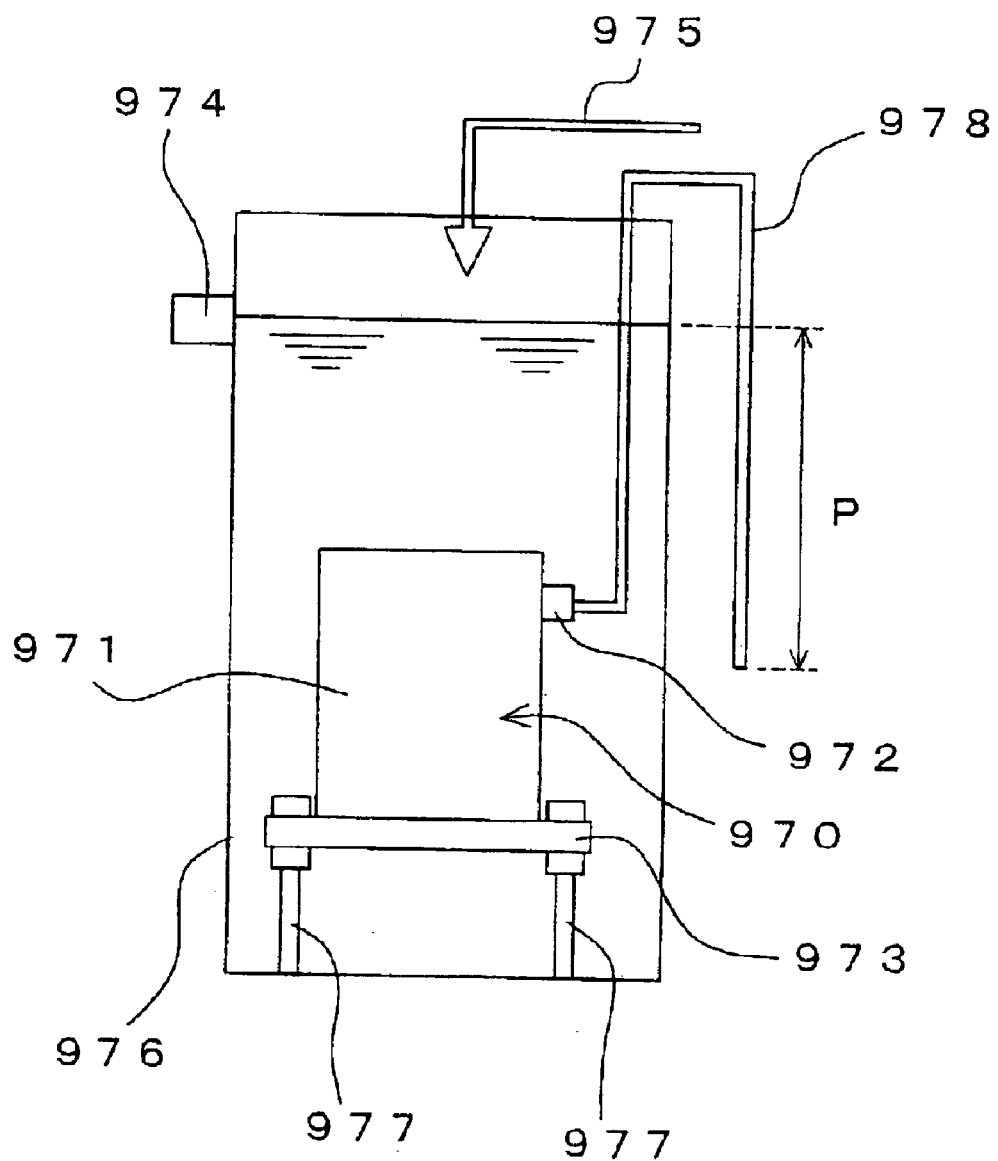
FIG. 41 is a schematic diagram of the filtration flow rate measuring device used in Experimental Example 5.

Using the tubular membranes having a protrusion or the smooth tubular membranes thus obtained, as in Experimental Example 1, a filtration membrane module 970 similar to the aforementioned filtration membrane module 300, as shown in FIG. 41, was produced. Here, for a housing vessel 971 was utilized a hard vinyl chloride tube of JIS K 6741-1975 nominal-250 (nominal pressure 500 kPa, approximate inside diameter 250 mm) and to this was welded a hard vinyl chloride socket of nominal-50 to form a discharge port 972. In addition, the total length of this module 970 was set at 28 cm and a flange 973 was installed on the lower end of the housing vessel 971 by means of welding as illustrated in FIG. 41. Furthermore, in the housing vessel 971 the thickness of a spacer was set at 8 mm. Additionally, the tubular membrane was set such that the effective length was about 20 cm. Moreover, the numbers of tubular membranes to be packed were set at 1,400 for the module 970 using the tubular membranes having a protrusion and set at 1,500 for the module 970 using the smooth tubular membranes. The packing rates of the tubular membranes were 0.86 for both of the modules 970. Additionally, the effective membrane areas were about 4.4 $m^2$ for the module 970 using the tubular membranes having a protrusion and about 4.7 $m^2$ for the module 970 using the smooth tubular membranes.

Subsequently, as illustrated in FIG. 41, there was prepared a water bath 976 with a diameter of about 70 cm and a height of about 150 cm, having a overflow port 974 at the upper portion and being provided with a supply line 975 for a fluid to be processed at the upper side. Then, the filtration membrane module 970 was placed in this water bath 976 to assemble a filtration flow rate measuring device. Here, legs 977 with a height of about 10 cm were installed in the flange 973 portion of the filtration membrane module 970, so that the filtration membrane module 970 was prevented from directly coming in contact with the bottom of the water bath 976 by means of these legs 977. In addition, to the discharge port 972 was connected a hose 978 and one end thereof was placed outside the water bath 976.

Into the water bath 976 was supplied at a rate of 10 L/min tap water filtrated by an ultrafiltration membrane having fraction molecular weight of 30,000 through the supply line 975 as the water to be processed. At the same time, water overflowed at the overflow port 974 and filtrate from the hose 978 were recovered into a bucket and were made to return to the water bath 976 by means of a not-shown circulation pump. The system was set as the above. Then, when the filtration flow rate was measured by setting the water head difference P at 60 cm, the filtration flow rate was 30 L/min for the module 970 using the tubular membranes having a protrusion, while it was 24 L/min for the module 970 using the smooth tubular membranes. This shows that the filtration membrane module of this type can further enhance the filtration flow rate using tubular membranes having a protrusion.

EXPERIMENTAL EXAMPLE 6

A module similar to the filtration membrane module 900 as shown in FIG. 27 was produced using the tubular membranes having a protrusion obtained in Experimental Example 1. Here, for a housing vessel was utilized a hard vinyl chloride tube having a total length of 65 cm of nominal-350 (JIS K 6741-1975, approximate inside diameter 348 mm). In addition, for the water-collecting tube, similarly, a hard vinyl chloride tube having a total length of 65 cm of nominal-60 (JIS K 6741-1975, approximate inside diameter 60 mm) was utilized. In this tube, holes with a diameter of 10 mm were numerously perforated at intervals of about 3 cm to form liquid passing holes.

Then, there were prepared 1,650 tubular membranes obtained as described above. The length of each of the tubular membranes was cut equal to 73 cm and both the ends of each of the tubular membranes was heat sealed. Thereafter, these tubular membranes were bundled to form a group of tubular membranes, and then this group of tubular membranes was inserted into the formed housing vessel using a fixing device as described earlier. At this time, the group of tubular membranes was set in such a way that both the ends each projected 4 cm from each of the ends of the housing vessel. In this manner, a combination of the group of tubular membranes and the housing vessel was obtained.

Next, one end of the water-collecting tube was set closed using a cap and the end of the combination was gradually soaked into a Teflon mold containing an uncured urethane resin and left until the urethane resin was completely cured. After curing of the urethane resin, the other end of the combination was processed in the same way. At this time, the other end of the water-collecting tube was set opened. Then, the cured urethane resin was cut off at both the ends of the housing vessel and the cap was removed to obtain a target filtration membrane module of an actual scale. In addition, the length of a support portion of the urethane resin, which fixes the group of tubular membranes to the housing vessel, each was set at about 5 cm for each of the upper and lower sides of the housing vessel.

This filtration membrane module had an effective membrane area of 20 $m^2$ and the packing ratio of the tubular membranes was 82%. In addition, the ratio of the outside diameter of the water-collecting tube to the cross-sectional area, perpendicular to the axial direction, between the water-collecting tube and the outer column was 0.64 $m^{-1}$. Further, the membrane area per unit volume based on the outer dimension of the module was 290 $m^2/m^3$. This value is about twice the flat sheet module or the hollow fiber module having a similar size. Therefore, this filtration membrane module can be made with further compaction while maintaining filtration performance when compared with the conventional flat sheet module or hollow fiber module.

In addition, taking into account the results of the aforementioned verification testing, the filtration flow rate per unit volume, based on the outer dimension, of this filtration membrane module is twice or more that of the flat sheet module or hollow fiber module, used under a similar air flow rate. For the immersion type membrane filtration method, the energy cost required for filtration processing increases as the flow rate to be actually used increases, and so this filtration membrane module is particularly excellent in cost efficiency when compared with the conventional flat sheet module or hollow fiber module.

EXPERIMENTAL EXAMPLE 7

A filtration membrane module having a membrane area of about 0.13 $m^2$ was produced as in Experimental Example 6 with the exception that the tubular membranes obtained in Experimental Example 2 was employed and that the effective length was set at 43 cm. To the lower portion of this filtration membrane module was connected as the guide column for air bubbles a plastic pipe having the same inside diameter as that of the housing vessel of the module. Then, this was immersed in a fluid to be processed and air bubbles were made emitted at a flow rate of 15 L/min per 1 m² of membrane area from a nozzle with an aperture of 4 mm disposed 20 cm beneath the filtration membrane module to start to filtrate the fluid to be processed at a pressure equivalent to a water head difference of 60 cm (about 6 kPa). In addition, the fluid to be processed was the same one used in Experimental Example 4.

In this filtrating step, the filtration flow rate was initially 30 mL/min, but gradually decreased. It became 17 mL/min in two hours and then leveled off. The filtration was rendered to pause three hours after the initiation of filtration and air bubbles alone were made to continue to be delivered for 10 minutes. Then, filtration was started again. The initial filtration flow rate was recovered to 20 mL/min, but was lowered again to 17 mL/min in about 10 minutes.

Thereafter, to the filtrate discharge port (inside diameter 12 mm) placed at the water-collecting tube of the filtration membrane module was connected a compressor to apply an air pressure of 40 kPa into the housing vessel. By this operation, the tubular membranes were backwashed using the filtrate remaining at the discharge port and within the housing vessel. The time required for backwashing was about 20 seconds. Then, filtration was initiated again. The initial filtration flow rate was recovered to 27 mL/min and became 17 mL/min in about one hour.

As a result, it is shown that the filtration membrane module of this experimental example, when backwashing is conducted, can effectively dislodge a cake layer of carboxymethyl cellulose accumulated on the inner periphery of each of the tubular membranes and thus can have increased life when backwashing is as appropriate repeated.

EXPERIMENTAL EXAMPLE 8

Figure 42:
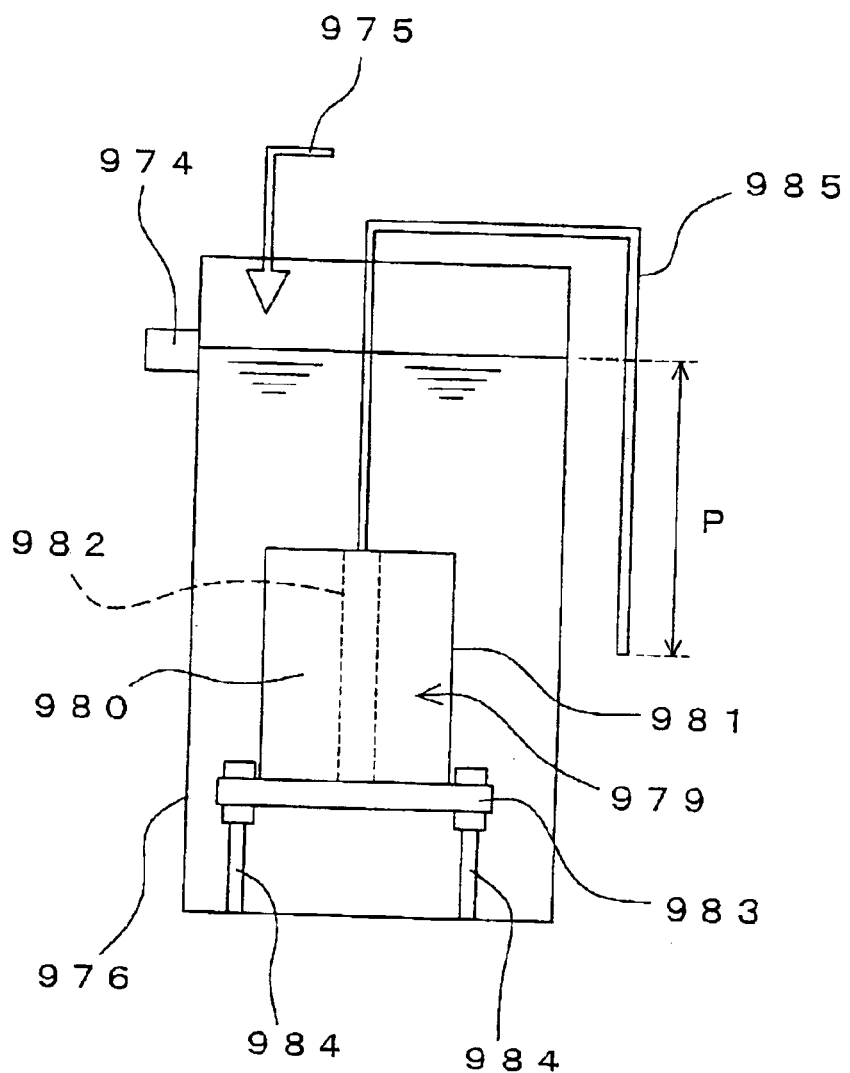
FIG. 42 is a schematic diagram of the filtration flow rate measuring device used in Experimental Example 8.

A filtration membrane module 979 similar to the aforementioned filtration membrane module 900, as illustrated in FIG. 42, was produced as in Experimental Example 6 using the tubular membranes having a protrusion or the smooth tubular membranes produced in Experimental Example 5. Here, for a housing vessel 980 therefor, a hard vinyl chloride tube of JIS K 6741-1975, nominal-250 (approximate inside diameter 250 mm) was utilized for an outer column 981 and a hard vinyl chloride tube of JIS K 6741-1975, nominal-40 (approximate outside diameter 48 mm) was utilized for a water-collecting tube 982. Further, to both the ends of the water-collecting tube 982 were bonded spacers having a thickness of 4.1 mm. The total length of this module 979 was set at 28 cm and a flange 983 was installed on the lower end of the housing vessel 980 by means of welding. In addition, the effective length of the tubular membrane was set at about 20 cm. Moreover, the numbers of tubular membranes to be packed were set at 1,500 for the module 979 using the tubular membranes having a protrusion and set at 1,600 for the module 979 using the smooth tubular membranes. The packing rates of the tubular membranes were 0.85 for both of the modules 979. Additionally, the effective membrane areas were about 4.7 m² for the module 979 using the tubular membranes having a protrusion and about 5.0 m² for the module 979 using the smooth tubular membranes. Furthermore, the ratios of the outside diameter of the water-collecting tube 982 to the cross-sectional area perpendicular to the axial direction between the water-collecting tube 982 and the outer column 981 were 1 m$^{-1}$ for both the module 979 using the tubular membranes having a protrusion and the module 979 using the smooth tubular membranes.

Subsequently, as illustrated in FIG. 42, a water bath 976 similar to one used in Experimental Example 5 was prepared. Then, the filtration membrane module 979 was placed in this water bath 976 to assemble a filtration flow rate measuring device. Here, legs 984 with a height of about 10 cm were installed in the flange 983 portion of the filtration membrane module 979, so that the filtration membrane module 979 was prevented from directly coming in contact with the bottom of the water bath 976 by means of these legs 984. In addition, to the discharge port of the water-collecting tube 982 was connected a hose 985 and one end thereof was placed outside the water bath 976.

Into the water bath 976 was supplied at a rate of 10 L/min tap water filtrated by an ultrafiltration membrane having fraction molecular weight of 30,000 through the supply line 975 as the water to be processed. At the same time, water overflowed at the overflow port 974 and filtrate from the hose 985 were recovered into a bucket and were made to return to the water bath 976 by means of a not-shown circulation pump. The system was set as the above. Then, when the filtration flow rate was measured by setting the water head difference P at 60 cm, the filtration flow rate was 32 L/min for the module 979 using the tubular membranes having a protrusion, while it was 25 L/min for the module 979 using the smooth tubular membranes. This shows that the filtration membrane module of this type can further enhance the filtration flow rate using tubular membranes having a protrusion.

EXPERIMENTAL EXAMPLE 9
(Production of a Filtration Membrane Module)

A module like the filtration membrane module 300 as shown in FIG. 2 was produced using the tubular membranes with a protrusion produced in Experimental Example 1. Here, for a housing vessel was utilized a hard vinyl chloride tube for a waterway tube having a total length of 70 cm of JIS K 6741-1975 nominal-350 (nominal pressure 500 kPa, approximate inside diameter 298 mm, thickness 9.2 mm and weight of 14 kg per 1 meter) and to this was welded a socket of JIS K 6741-1975 nominal-25, made of a hard vinyl chloride and having screw, to form a discharge port. The position of the discharge port was set such that the central position thereof was 7 cm from the tip of the housing vessel.

In addition, two circular spacers having the cross section of a wedge shape were cut out of the same hard vinyl tube having used for the housing vessel. Then, each of the circular spacers was bonded to the inner periphery of the housing vessel using an adhesive for a waterway tube at a position about 1 cm inside of each end of the housing vessel to dispose the spacers 304 as illustrated in FIG. 2 within the housing vessel. Furthermore, this spacer possesses a width of 2 cm in the vertical direction of the inner periphery side of the housing vessel, and a width of 3 cm in the vertical direction of the central side of the housing vessel, and also possesses slits having a width of 5 mm every about 5 cm in the circumferential direction. In this housing vessel, the spacer portion has an approximate inside diameter and thus the inside diameter of the region capable of packing a group of tubular membranes mentioned below being 280 mm.

Then, there were prepared the 1,150 tubular membranes as described above. The length of each of the tubular membranes was cut equal to 78 cm and both the ends of each of the tubular membranes was heat sealed. Thereafter, these tubular membranes were bundled to form a group of tubular membranes, and then this group of tubular membranes was inserted into the aforementioned housing vessel. Here, the group of tubular membranes was set in such a way that both the ends each projected 4 cm from each of the ends of the housing vessel. In this manner, a combination of the group of tubular membranes and the housing vessel was obtained.

Next, one end of the combination was gradually soaked into a Teflon mold containing an uncured urethane resin and left until the urethane resin was completely cured. After curing of the urethane resin, the other end of the combination was processed in the same way. Then, the cured urethane resin was cut off at both the ends of the housing vessel to obtain a target filtration membrane module of an actual scale. In addition, the length of a support portion of the urethane resin, which fixes the group of tubular membranes to the housing vessel, each was set at about 5 cm for each of the upper and lower sides of the housing vessel.

The filtration membrane module produced as described above had an effective membrane area of 15 m$^2$ and the packing ratio of the tubular membranes was 0.77. Further, the membrane area per unit volume based on the outer dimension of the module was 270 m$^2$/m$^3$. This value is about twice the value of the flat sheet module or the hollow fiber module having a similar size. Therefore, in this filtration membrane module, according to the results of the aforementioned verification testing, if air bubbles are equally distributed to all the tubular membranes during immersion type membrane filtration, the filtration flow rate per volume, based on the outer dimension, of this filtration membrane module is twice or more the filtration flow rate for the case where immersion type membrane filtration is conducted using the flat sheet module or hollow fiber module at a similar air flow rate.

(Production of an Air Bubbles Supply Device)

Next, there were produced a guide column and an air bubbles supply device similar to the guide column 400 and the air bubbles supply device 500 as illustrated in FIGS. 11 and 12. Here, the guide column used a hard vinyl chloride tube having a total length of 35 cm similar to the tube used in the production of the aforementioned filtration membrane module. In addition, the air bubbles supply device used a pipe made by cutting a hard vinyl chloride tube of nominal-13 into a predetermined length. Furthermore, in order to close the required ends after combining these pipes in the shape as shown in FIG. 12, a cross coupler and a cap for the hard vinyl chloride tube were utilized. Additionally, for the connection of cross couplers and the guide column and the pipes, an adhesive for hard vinyl chloride tubes was used.

In immersion type membrane filtration methods, an air flow rate of 7.5 L/min/m$^2$ or more per unit membrane area is adopted in many cases, and thus this experimental example used an air flow rate of 110 L/min or more per module for testing. In addition, assuming that a mixture solution of 0.1% CMC and 0.8% PEO is used as the fluid to be processed, the density was taken as 1,000 kg/m$^3$ and the viscosity as 8 mPa·s. As described earlier, the diameter of the region occupied by the group of tubular membranes in the aforementioned filtration membrane module was equal to the approximate inside diameter of the spacer portion and thus was 280 mm. Substitution of these numeral values into Equation (18) above leads to the number of the air bubbles spouting pores required for the air bubbles supply device being from 18 to 19.

Hence, in the air bubbles supply device, as shown in FIG. 12, 19 air bubbles spouting pores were disposed to become a closest packing pattern. Here, first, the distance between the lower end of the guide column and the central line position of the pipes was set at 5 cm. Then, the intervals between a first pipe and four branch pipes, being disposed in parallel, each were set at 55 mm. Additionally, each of the pipes was perforated with pores having a diameter of 4 mm as air bubbles spouting pores at intervals of 63.5 mm.

(Production of a Filtration Flow Rate Measuring Device)

Figure 43:
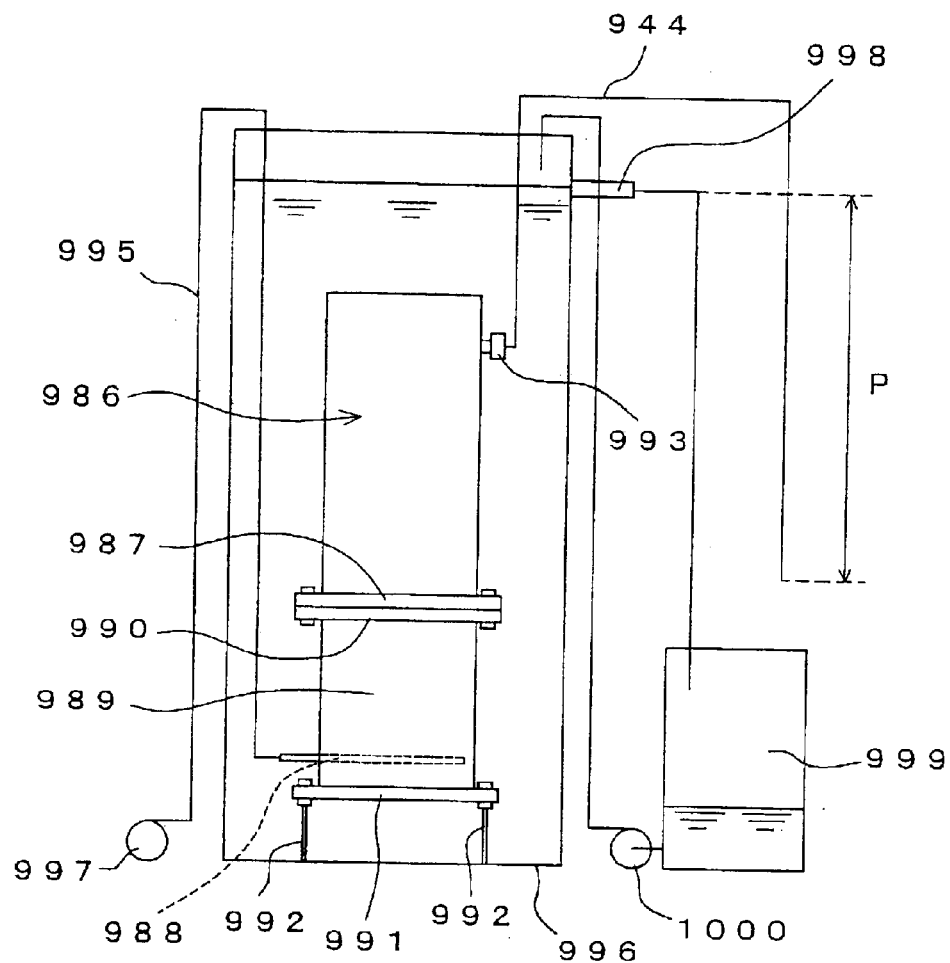
FIG. 43 is a schematic diagram of the filtration flow rate measuring device used in Experimental Example 9.

A filtration flow rate measuring device as shown in FIG. 43 was produced. Here, first, on the lower end of the filtration membrane module 986 produced in this experimental example was installed a flange 987 by means of welding. In addition, flanges 990, 991 were similarly installed, respectively, to the upper end and the lower end of the guide column 989 provided with the aforementioned air bubbles supply device 988 also produced in this experimental example. Then, on the flange 990 of the guide column 989 at the upper end side was mounted the flange 987 side of the filtration membrane module 986 and both the flanges 987, 990 were fixed using bolts and nuts. Additionally, to the flange 991 of the guide column 989 at the lower end side was equipped legs 992 having a length of 10 cm.

Next, a water discharge hose 994 was connected to the discharge port 993 of the filtration membrane module 986 and an air supply hose 995 was connected to the air bubbles supply device 988. Thereafter, in this state, the filtration membrane module 986 and guide column 989 combined with each other as described above was housed within the water bath 996. At this time, the combination was placed to stand independently by the legs 992 thereof. Additionally, the water bath 996 used here is a cylindrical bath having an inside diameter of about 70 cm and a height of about 150 cm.

Then, to the other end of the air supply hose 995 was connected an air pump 997 having the maximum discharge volume of 250 NL/min and the maximum discharge pressure of 40 kPa. In addition, the water bath 996 was provided with an overflow port 998 at a position of a height of about 135 cm from the installation face. The system was set such that a fluid to be processed overflowed from this port was collected together with filtrate from the water discharge hose 994 into a bucket 999 to be made to return into the water bath 996 by means of a circulation pump 1000.

(Measurement of Filtration Flow Rate)

Into the water bath 996 and the bucket 1000 was placed a mixture solution of 0.1% CMC solution and 0.8% PEO and then the water head difference P was set at 60 cm. Thereafter, the filtration flow rate was measured while changing the air flow rate to be supplied to the air bubbles supply device 988 from the air pump 997. The results are given in Table 9. These results are almost equal to the values obtained by multiplying the results of the aforementioned verification testing obtained using a small filtration membrane module by the effective membrane area rate. This shows that the air bubbles supply device 988 in this experimental example can distribute air bubbles at 30% or more of the total average value to ½ or more of the tubular membranes packed within the filtration membrane module 986.

TABLE 9

| Air flow rate (NL/min) | 110 | 150 | 225 |
|---|---|---|---|
| Filtration flow rate (L/min) | 1.15 | 1.27 | 1.46 |

COMPARATIVE EXPERIMENTAL EXAMPLE 1

FIG. 44 schematically shows the relationship of the positions of the air bubbles spouting pores placed in the air bubbles supply device 988 used in Experimental Example 9

(in the figure, the positions denoted by blacked circle are the sites of air bubbles spouting pores provided in Experimental Example 9). The relationship between the air flow rate and the filtration flow rate was determined as in Experimental Example 9 with the exception that the air bubbles supply device is provided with 7 air bubbles spouting pores having a diameter of 5 mm at the positions indicated by circles in this figure, with the intervals thereof being 95 mm. The results are shown in Table 10. Table 10 shows that when the air bubbles supply device of this comparative experimental example is used, even if the same filtration membrane module 986 is used, air bubbles cannot uniformly be supplied to the tubular membranes, so that the filtration flow rate is reduced to about 70 to 77% as compared with the case in Experimental Example 9 even if the air flow rate is set to be the same.

TABLE 10

| Air flow rate (NL/min) | 110 | 150 | 225 |
|---|---|---|---|
| Filtration flow rate (L/min) | 0.81 | 0.91 | 1.12 |

EXPERIMENTAL EXAMPLE 10
(Production of an Air Bubbles Supply Device)

An air bubbles supply device as shown in FIG. 24 was produced. Here, a plain body was used which is made of a disk-like rubber almost equal to the cross section shape, perpendicular to the axial direction, of the same guide column 989 (total length, 10 cm) as the guide column used in Experimental Example 9 and which is perforated with numerous pores (air bubbles spouting pores) at intervals of about 5 mm on almost the entire face thereof. The air bubbles spouting pores formed on the plain body has the function of opening by the expansion of the plain body caused by the pressure of the air supplied from the air supply plate and closing by contraction of the plain body when the air supply being stopped.

In immersion type membrane filtration methods, an air flow rate of 7.5 L/min/m$^2$ or more per unit membrane area is adopted in many cases, and thus this experimental example, as in Experimental Example 9, used an air flow rate of 110 L/min or more per module for testing. In addition, assuming that a mixture solution of 0.1% CMC and 0.8% PEO is used as the fluid to be processed, the density was taken as 1,000 kg/m$^3$ and the viscosity as 8 mPa·s.
(Production of a Filtration Flow Rate Measuring Device)

Figure 45:
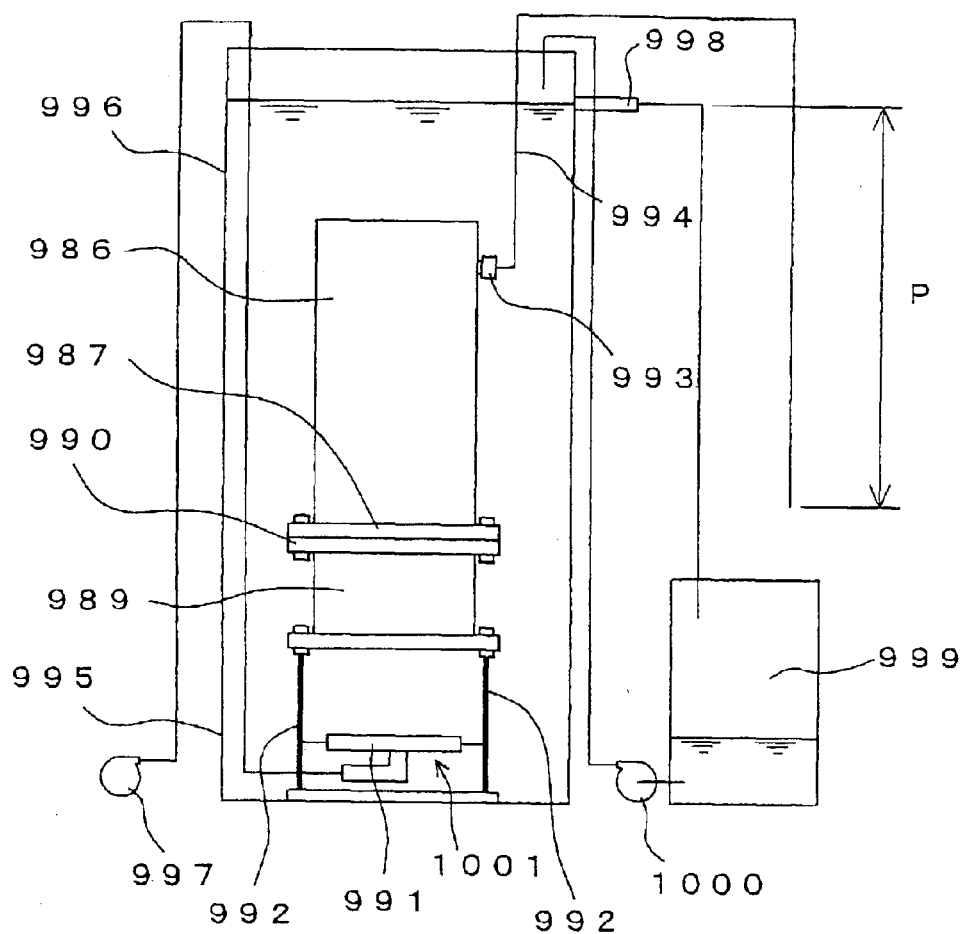
FIG. 45 is a schematic diagram of the filtration flow rate measuring device used in Experimental Example 10.

A filtration flow rate measuring device as illustrated in FIG. 45 was produced using the same filtration membrane module 986, guide column 989 and water bath 996 as those used in Experimental Example 9 as well as the aforementioned air bubbles supply device. Here, first, near the bottom of the water bath 996 was disposed an air bubbles supply device 1001 and to this was connected the air supply hose 995. On the other hand, on the flange 990 of the guide column 989 was mounted the flange 987 side of the filtration membrane module 986 and both the flanges 987, 990 were fixed by means of bolts and nuts. In addition, the legs 992 were placed on the flange 991 of the lower end side of the guide column 989. Then, a combination of the filtration membrane module 986 and the guide column 989 combined with each other as stated above was housed within the water bath 996 with the water discharge hose 994 being connected to the discharge port 993 of the filtration membrane module 986. At this time, the length of the legs 992 was adjusted such that the plain body of the air bubbles supply device 1001 was positioned about 15 cm beneath the lower end of the guide column 989.

Then, to the other end of the air supply hose 995 was connected an air pump 997 having the maximum discharge volume of 250 NL/min and the maximum discharge pressure of 40 kPa. In addition, the water bath 996 was provided with an overflow port 998 at a position of a height of about 135 cm from the installation face. The system was set such that a fluid to be processed overflowed from this port was collected together with filtrate from the water discharge hose 994 into the bucket 999 to be made to return into the water bath 996 by means of a circulation pump 1000.
(Measurement of Filtration Flow Rate)

Into the water bath 996 and the bucket 999 was placed a mixture solution of 0.1% CMC solution and 0.8% PEO and then the water head difference P was set at 60 cm. Thereafter, the filtration flow rate was measured while changing the air flow rate to be supplied to the air bubbles supply device 1001 from the air pump 997. The results are given in Table 11. These results are almost equal to the values obtained by multiplying the results of the aforementioned verification testing obtained using a small filtration membrane module by the effective membrane area rate. This shows that the air bubbles supply device 1001 in this experimental example can distribute air bubbles at 30% or more of the total average value to ½ or more of the tubular membranes packed within the filtration membrane module 986.

TABLE 11

| Air flow rate (NL/min) | 110 | 150 | 225 |
|---|---|---|---|
| Filtration flow rate (L/min) | 1.15 | 1.27 | 1.46 |

COMPARATIVE EXPERIMENTAL EXAMPLE 2

Figure 46:
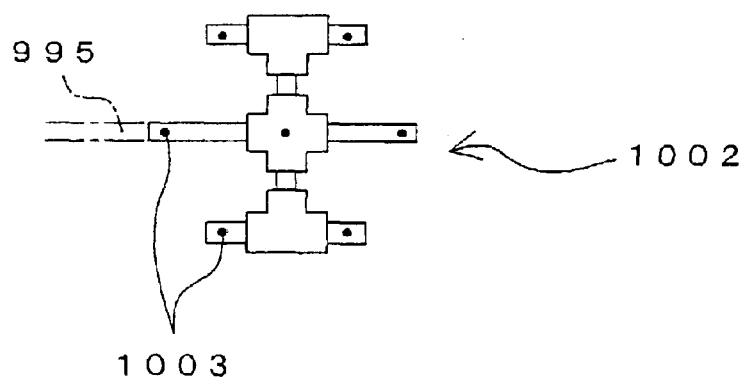
FIG. 46 is a partly omitted bottom view of the air bubbles supply device used in Comparative Experimental Example 2.

The relationship between the air flow rate and the filtration flow rate was investigated as in Experimental Example 10 using an air bubbles supply device 1002 as illustrated in FIG. 46 in place of the air bubbles supply device 1001. The air bubbles supply device 1002 used here consists of pipes that are horizontally combined and connected to the air supply pipe 995, and have 7 air bubbles spouting pores 1003 with a diameter of 5 mm uniformly disposed. Each of the air bubbles spouting pores 1003 was formed downward at intervals of 95 mm and thus formed toward the bottom of the water bath 996. The guide column 989 used had a length of 35 cm. In addition, the air bubbles supply device 1002 was horizontally disposed at a site 15 cm above the bottom of the water bath 996 and thus at a site 5 cm beneath the lower end of the guide column 989.

The results are shown in Table 12. Table 12 shows that when the air bubbles supply device 1002 of this comparative experimental example is used, even if the same filtration membrane module 986 is used, air bubbles cannot uniformly be supplied to the tubular membranes, so that the filtration flow rate is reduced to about 70 to 77% as compared with the case in Experimental Example 10 even if the air flow rate is set to be the same.

TABLE 12

| Air flow rate (NL/min) | 110 | 150 | 225 |
|---|---|---|---|
| Filtration flow rate (L/min) | 0.81 | 0.91 | 1.12 |

EXPERIMENTAL EXAMPLE 11

(Production of a Guide Column)

A guide column provided with a filling material bed as illustrated in FIG. 26 was produced. The main body of the guide column used a cylindrical column having the same cross section shape as that of the housing vessel used in the filtration membrane module produced in Experimental Example 9, and had a filling material bed disposed inside the body. In the filling material bed used here, the filling material is a porous hollow cylindrical material made of polypropylene resin having a specific surface area of 500 $m^2/m^3$, an outside diameter of 20 mm, an inside diameter of 16 mm and a length of 20 mm. It has a function as a microorganism carrier. The thickness of this filling material bed ($D_3$ in FIG. 26) was set at about 150 mm. In addition, within the guide column, the thickness ($D_2$ in FIG. 26) of the space formed between the filling material bed and the filtration membrane module was set at about 150 mm. Although this guide column was equipped with an air bubbles supply device as shown in FIG. 26, a special consideration was not taken for the number of the air bubbles spouting pores and the configuration pattern in this air bubbles supply device.

(Production of a Filtration Flow Rate Measuring Device)

Figure 47:
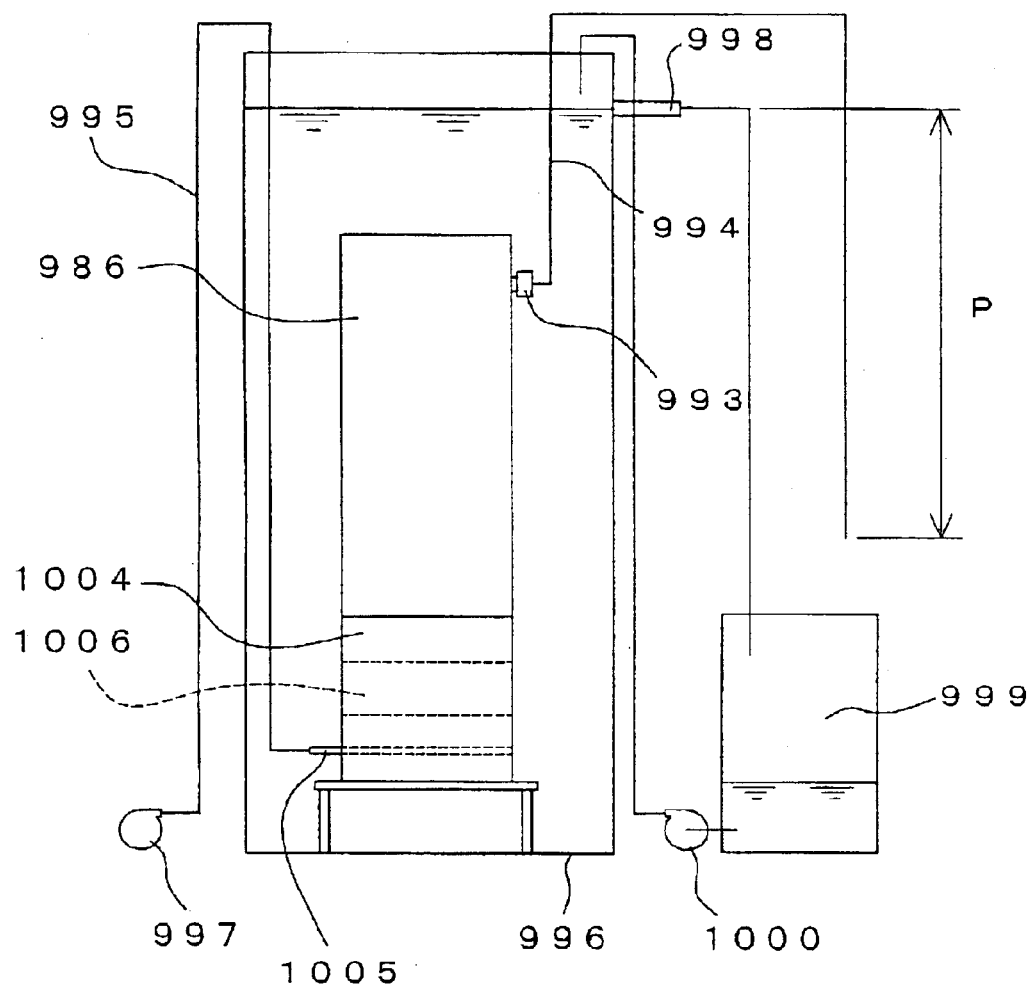
FIG. 47 is a schematic diagram of the filtration flow rate measuring device used in Experimental Example 11.

A filtration flow rate measuring device as illustrated in FIG. 47 was produced using the same filtration membrane module 986, and water bath 996 as those used in Experimental Example 9 as well as the aforementioned guide column. Here, first, by mounting the filtration membrane module 986 on the guide column 1004 placed inside the filling material bed 1006, a combination thereof was produced. In addition, the water discharge hose 994 was connected to the discharge port 993 of the filtration membrane module 986 and the air supply hose 995 was connected to an air bubbles supply device 1005. Then, in this state, the combination was housed within the water bath 996.

Then, to the other end of the air supply hose 995 was connected an air pump 997 having the maximum discharge volume of 250 NL/min and the maximum discharge pressure of 40 kPa. In addition, the water bath 996 was provided with an overflow port 998 at a position of a height of about 135 cm from the installation face. The system was set such that a fluid to be processed overflowed from this port was collected together with filtrate from the water discharge hose 994 into the bucket 999 to be made to return into the water bath 996 by means of a circulation pump 1000.

(Measurement of Filtration Flow Rate)

Into the water bath 996 and the bucket 999 was placed a mixture solution of 0.1% CMC solution and 0.8% PEO and then the water head difference P was set at 60 cm. Thereafter, the filtration flow rate was measured while changing the air flow rate to be supplied to the air bubbles supply device 1005 from the air pump 997. The results are given in Table 13. These results are almost equal to the values obtained by multiplying the results of the aforementioned verification testing obtained using a small filtration membrane module by the effective membrane area rate. This shows that the guide column 1004 used in this experimental example, because of having the filling material bed, can distribute air bubbles at 30% or more of the total average value to ½ or more of the tubular membranes packed within the filtration membrane module 986.

TABLE 13

| Air flow rate (NL/min) | 110 | 150 | 225 |
|---|---|---|---|
| Filtration flow rate (L/min) | 1.15 | 1.27 | 1.46 |

COMPARATIVE EXPERIMENTAL EXAMPLE 3

A filtration flow rate measuring device similar to the device in Experimental Example 11, except that the guide column 1004 having no filling material bed disposed therein was used, was produced. Then, using this filtration flow rate measuring device, the relationship between the air flow rate and the filtration flow rate was studied as in Experimental Example 11. The results are shown in Table 14. Table 14 shows that when a guide column without being provided with the required filling material bed is used, even if the same filtration membrane module 986 is used, air bubbles cannot uniformly be supplied to the tubular membranes, so that the filtration flow rate is reduced to about 70 to 77% as compared with the case in Experimental Example 11 even if the air flow rate is set to be the same.

TABLE 14

| Air flow rate (NL/min) | 110 | 150 | 225 |
|---|---|---|---|
| Filtration flow rate (L/min) | 0.81 | 0.91 | 1.12 |

The present invention can be conducted in other various forms without departing from the spirit and primary characteristics. Thus, the aforementioned embodiments and experimental examples are simply examples in various points and the invention should not be interpreted limitedly. The scope of the present invention is expressed by the claims and is by no means restricted by the text of this specification. Further, modifications and alterations belonging to the equal range of the claims are all within this invention.

What is claimed is:

1. An immersion type membrane filter apparatus for obtaining filtrate by filtrating a fluid to be processed stored in a storage bath, comprising:

a filtration membrane module including a group of tubular membranes containing a plurality of tubular membranes having on the inner surfaces thereof the function of filtrating said fluid to be processed and having a protrusion partially formed on the outer periphery thereof, said group of tubular membranes being disposed within a columnar housing vessel having a discharge port for said filtrate and being supported by both the ends of said housing vessel, said filtration membrane module being capable of being immersed in said fluid to be processed in said storage bath in such a way that said tubular membranes are opened in the vertical direction, and an air bubbles supply device for supplying air bubbles to said filtration membrane module, disposed beneath said filtration membrane module within said storage bath.

2. The immersion type membrane filter apparatus according to claim 1, wherein said discharge port is set to be capable of discharging said filtrate by the water head pressure of said fluid to be processed stored in the storage bath.

3. The immersion type membrane filter apparatus according to claim 1, wherein the immersion type membrane filter apparatus is further provided with means for setting said discharge port at a negative pressure.

4. The immersion type membrane filter apparatus according to claim 1, wherein said tubular membrane is provided with a filtration membrane layer formed cylindrically and a support membrane layer being disposed on the outer periphery of said filtration membrane layer and having liquid permeability for imparting shape keeping property to said filtration membrane layer, with the crushing pressure being set at least at 20 kPa.

5. The immersion type membrane filter apparatus according to claim 4, wherein said filtration membrane layer comprises a microfiltration membrane.

6. The immersion type membrane filter apparatus according to claim 4, wherein said support membrane layer is further provided with a reinforcing layer of liquid permeability placed on the outer periphery of said support membrane layer.

7. The immersion type membrane filter apparatus according to claim 6, wherein said support membrane layer and said reinforcing layer are formed using a polyester resin-based unwoven cloth.

8. The immersion type membrane filter apparatus according to claim 1, wherein the inside diameter of said tubular membrane is set at from 3 to 15 mm.

9. The immersion type membrane filter apparatus according to claim 1, wherein the ratio (A/B) of the wall thickness A to the outside diameter B of said tubular membrane is set at from 0.025 to 0.1.

10. The immersion type membrane filter apparatus according to claim 1, wherein said protrusion partially formed on the outer periphery of said tubular membrane has a height of 0.02 to 0.2 mm.

11. The immersion type membrane filter apparatus according to claim 1, wherein said protrusion is spirally formed, with the axis of said filtration membrane layer being the center thereof.

12. The immersion type membrane filter apparatus according to claim 1, wherein a plurality of said tubular membranes are disposed flatly and in parallel and integrally knitted using a connecting thread to form said group of tubular membranes.

13. The immersion type membrane filter apparatus according to claim 1, wherein said group of tubular membranes is held using a resin at both said ends of said housing vessel.

14. The immersion type membrane filter apparatus according to claim 13, wherein said housing vessel has at least one of a concave portion and a convex portion on the inner periphery of both said ends where said housing vessel holds said group of tubular membranes.

15. The immersion type membrane filter apparatus according to claim 1, wherein said housing vessel possesses spacers for creating clearances between said discharge port and said group of tubular membranes.

16. The immersion type membrane filter apparatus according to claim 15, wherein
the inside diameter of said tubular membrane is from 3 to 15 mm, and
the packing rate of said tubular membranes expressed by Equation (I) below is set at least at 0.7:

$$\text{Packing rate} = \frac{N\pi d_o^2}{4S} \quad (I)$$

wherein N is the number of said tubular membranes contained in said group of tubular membranes, $d_o$ is the outside diameter of said tubular membrane, and S is the cross-sectional area of the inside, perpendicular to the axial direction, of said housing vessel.

17. The immersion type membrane filter apparatus according to claim 16, wherein said spacer is set such that the ratio of the portion area of said spacer to the cross-sectional area of the inside equipped with said spacer, perpendicular to the axial direction, of said housing vessel is from 3 to 10%.

18. The immersion type membrane filter apparatus according to claim 1, wherein
said housing vessel comprises a columnar water-collecting tube having fluid-passing holes and an outer column disposed at intervals on the outer periphery of said water-collecting tube,
said group of tubular membranes is disposed between said water-collecting tube and said outer column, and
said water-collecting tube has said discharge port.

19. The immersion type membrane filter apparatus according to claim 18, wherein
said tubular membrane has an inside diameter of 3 to 15 mm,
the ratio ($d_s/S_1$) of the outside diameter $d_s$ of said water-collecting tube to the cross-sectional area $S_1$ perpendicular to the axial direction between said water-collecting tube and said outer column is set at from 0.3 to 1 m$^{-1}$, and
the packing rate of said tubular membranes expressed by Equation (II) below is set at least at 0.8:

$$\text{Packing rate} = \frac{N\pi d_o^2}{4S_1} \quad (II)$$

wherein N is the number of said tubular membranes contained in said group of tubular membranes, and $d_o$ is the outside diameter of said tubular membrane.

20. The immersion type membrane filter apparatus according to claim 18, wherein said group of tubular membranes is disposed at a distance from said water-collecting tube, between said water-collecting tube and said outer column.

21. The immersion type membrane filter apparatus according to claim 18, wherein said water-collecting tube and said outer column have a cylindrical shape.

22. The immersion type membrane filter apparatus according to claim 1, wherein said housing vessel possesses a wall portion extending from the end of said air bubbles supply device side toward said air bubbles supply device.

23. The immersion type membrane filter apparatus according to claim 1, further comprising a guide column for guiding said air bubbles from said air bubbles supply device toward said filtration membrane module, said guide column being capable of disposing said filtration membrane module on the upper portion thereof, the shape and size of the inner circumference of the cross section, perpendicular to the axial direction, of said guide column being set substantially equal to the shape and size of the inner circumference of the outer circumferential portion in the cross section, perpendicular to the axial direction, of said housing vessel.

24. The immersion type membrane filter apparatus according to claim 23, wherein said air bubbles supply device has a plurality of air bubbles spouting pores, said air bubbles spouting pores placed in a configuration pattern such that said air bubbles at least at 30% of the average value of the air flow rate per said tubular membrane, i.e. the total flow rate of said air bubbles to be supplied to said filtration membrane module divided by the total number of said tubular membranes, can be distributed to at least half the number of said tubular membranes.

25. The immersion type membrane filter apparatus according to claim 23, wherein said air bubbles supply device is provided with a plain body made of a elastic rubber body having substantially the same size and shape as the inner circumferential line of the outer circumferential portion in the cross section, vertical to the axial direction, of said guide column and an air supply device for supplying air from the lower portion relative to said plain body, said plain body having on the whole face thereof a plurality of air bubbles spouting pores for spouting said air bubbles, said spouting pores being capable of opening and shutting according to increase and decrease of the pressure of the air supplied from said air supply device.

26. The immersion type membrane filter apparatus according to claim 25, wherein said air bubbles spouting pores are set to be capable of spouting said air bubbles having a diameter of at least ⅓ of the inside diameter of said tubular membrane.

27. The immersion type membrane filter apparatus according to claim 1, further comprising a filling material bed containing a filling material and disposed between said filtration membrane module and said air bubbles supply device, for guiding said air bubbles with dispersion from said air bubbles supply device toward said filtration membrane module.

28. The immersion type membrane filter apparatus according to claim 27, wherein said filling material bed is set to be capable of dispersing said air bubbles in such a way that said air bubbles at least at 30% of the average value of the air flow rate per said tubular membrane, i.e. the total flow rate of said air bubbles to be supplied from said air bubbles supply device divided by the total number of said tubular membranes, can be distributed to at least half the number of said tubular membranes.

29. The immersion type membrane filter apparatus according to claim 27, wherein said filling material is a porous hollow cylindrical material having an outside diameter of 5 to 50 mm and a length of 5 to 50 mm.

30. The immersion type membrane filter apparatus according to claim 29, wherein said hollow cylindrical material is a microorganism carrier.

31. The immersion type membrane filter apparatus according to claim 1, further comprising a filtrate discharge pathway extending from said discharge port and a backwashing device for flowing said filtrate in said filtrate discharge pathway backwards, while pressurizing said filtrate, via said discharge port into said housing vessel.

32. The immersion type membrane filter apparatus according to claim 31, wherein said backwashing device is equipped with an air supply device and pressurizing means for applying the pressure of air coming from said air supply device to said filtrate within said filtrate discharge pathway in said discharge port direction.

33. The immersion type membrane filter apparatus according to claim 32, wherein said backwashing device is further provided with a back-flow rate setting device for setting the amount of said filtrate being caused to flow backwards into said housing vessel at least at 200 ml per square meter of membrane area of said tubular membranes housed within said housing vessel.

34. The immersion type membrane filter apparatus according to claim 33, wherein said back-flow rate setting device is a quantity float valve.

35. The immersion type membrane filter apparatus according to claim 32, wherein said air from said air supply device is set to be capable of being supplied to said air bubbles supply device.

36. An immersion type membrane filtration method for obtaining filtrate by filtrating a fluid to be processed stored within a storage bath, comprising:
 a step of disposing in said storage bath a filtration membrane module which is provided with a group of tubular membranes containing a plurality of tubular membranes having on the inner surfaces thereof the function of filtrating said fluid to be processed and having a protrusion partially formed on the outer periphery thereof being disposed within a columnar housing vessel having a discharge port, and which is supported at both ends of the housing vessel, in such a way that said tubular membranes are opened in the vertical direction;
 a step of storing said fluid to be processed in said storage bath and immersing said filtration membrane module in said fluid to be processed; and
 a filtrating step of filtrating said fluid to be processed and then discharging said filtrate from said discharge port while naturally circulating said fluid to be processed from the down side toward the upside of said tubular membranes by supplying air bubbles from beneath to said filtration membrane module.

37. The immersion type membrane filtration method according to claim 36, wherein said filtrate is discharged from said discharge port by means of the water head pressure of the fluid surface of said fluid to be processed and said discharge port.

38. The immersion type membrane filtration method according to claim 36, wherein said filtrate is discharged from said discharge port by setting said discharge port at a negative pressure.

39. The immersion type membrane filtration method according to claim 36, further comprising a backwashing step of flowing said filtrate to be discharged from said discharge port backwards, while pressurizing said filtrate, via said discharge port into said housing vessel.

40. The immersion type membrane filtration method according to claim 39, wherein said filtrating step and said backwashing step are periodically repeated.

41. The immersion type membrane filtration method according to claim 39, wherein the pressure when said filtrate is made to flow backwards by pressurization is set at least at a-filtration pressure in said filtrating step.

42. The immersion type membrane filtration method according to claim 39, wherein the amount of said filtrate being caused to flow backwards into said housing vessel is set at least at 200 ml per square meter of membrane area of said tubular membranes housed within said housing vessel.

43. The immersion type membrane filtration method according to claim 36, wherein said fluid to be processed is an activated sludge processed fluid of domestic wastewater.

44. A tubular membrane for filtrating a fluid to be processed by means of the immersion type membrane filtration method, comprising:
 a cylindrically formed filtration membrane layer, and
 a support membrane layer being disposed on the outer periphery of said filtration membrane layer and having liquid permeability for imparting shape keeping property to said filtration membrane layer,
 wherein said tubular membrane has a protrusion partially formed on the outer periphery thereof, and the crushing pressure of the tubular membrane is set at least at 20 kPa.

45. The tubular membrane according to claim 44, wherein said filtration membrane layer is composed of a microfiltration membrane.

46. The tubular membrane according to claim 44, wherein the tubular membrane is further provided with a reinforcing layer having liquid permeability disposed on the outer periphery of said support membrane layer.

47. The tubular membrane according to claim 46, wherein said support membrane layer and said reinforcing layer are made of a polyester resin-based unwoven cloth.

48. The tubular membrane according to claim 44, wherein the inside diameter is set at from 3 to 15 mm.

49. The tubular membrane according to claim 44, wherein the ratio (A/B) of the wall thickness A to the outside diameter B is set at from 0.025 to 0.1.

50. The tubular membrane according to claim 44, wherein the height of said protrusion is 0.02 to 0.2 mm.

51. The tubular membrane according to claim 44, wherein said protrusion is spirally formed, with the axis of said filtration membrane layer being the center thereof.

52. A group of tubular membranes for filtering a fluid to be processed by means of an immersion type membrane system, comprising:
a plurality of tubular membranes having on the inner surfaces thereof the function of filtrating a fluid to be processed and having protrusion partially formed on the outer periphery thereof,
wherein said plurality of tubular membranes being disposed flatly and parallel and being integrally knitted using a connection thread, said plurality of tubular membranes are provided within a columnar housing open to its bottom and adapted to be immersed in the fluid to be processed in a storage bath, and to receive gas bubbles within said columnar housing.

53. The group of tubular membranes according to claim 52, wherein said tubular membrane comprises a cylindrically formed filtration membrane layer and a support membrane layer having liquid permeability for imparting shape keeping property to said filtration membrane layer, said support membrane layer being disposed on the outer periphery of said filtration membrane layer.

54. An immersion type filtration membrane module capable of filtrating a fluid to be processed while being kept immersed in said fluid to be processed, comprising:
a group of tubular membranes containing a plurality of tubular membranes having filtration function on the inner surfaces thereof and having a protrusion partially formed on the outer periphery thereof,
a columnar housing vessel housing said group of tubular membranes and having a discharge port for discharging said fluid having passed through said tubular membrane to the outside, and
support portions being disposed on both the ends of said housing vessel and holding both the ends of said group of tubular membranes in the direction of the length while opening both the ends of said tubular membranes.

55. The immersion type filtration membrane module according to claim 54, wherein said support portions are composed of a resin, and said housing vessel possesses at least one of a convex portion and a concave portion on both said ends.

56. The immersion type filtration membrane module according to claim 54, wherein the immersion type filtration membrane module is further provided with spacers for creating clearances between said discharge port and said group of tubular membranes.

57. The immersion type filtration membrane module according to claim 56, wherein said tubular membrane has an inside diameter of 3 to 15 mm, and the packing rate of said tubular membranes expressed by Equation (I) below is set at least 0.7:

$$\text{Packing rate} = \frac{N\pi d_o^2}{4S} \quad \text{(I)}$$

wherein N is the number of said tubular membranes contained in said group of tubular membranes, $d_o$ is the outside diameter of said tubular membrane, and S is the cross-sectional area of the inside, perpendicular to the axial direction, of said housing vessel.

58. The immersion type filtration membrane module according to claim 57, wherein said spacer is set in such a way that the ratio of the portion of the spacer to the cross-sectional area of the inside, perpendicular to the axial direction, of said housing vessel is from 3 to 10%.

59. The immersion type filtration membrane module according to claim 57, wherein the ratio (A/B) of the wall thickness A to the outside diameter B of said tubular membrane is set at from 0.025 to 0.1.

60. The immersion type filtration membrane module according to claim 54, wherein said housing vessel has a cylinder shape or a squared column shape.

61. An immersion type filtration membrane module capable of filtrating a fluid to be processed while being kept immersed in said fluid to be processed, comprising:
a columnar housing vessel equipped with a columnar water-collecting tube having fluid-passing holes and an outer column disposed at intervals on the outer periphery of said water-collecting tube,
a group of tubular membranes being placed between said water-collecting tube and said outer column and containing a plurality of tubular membranes having filtration function on the inner surfaces thereof and having a protrusion partially formed on the outer periphery thereof, and
support portions being disposed on both the ends of said housing vessel and holding both the ends of said group of tubular membranes in the direction of the length while opening both the ends of said tubular membranes,
wherein said water-collecting tube has a discharge port for discharging said fluid having passed through said tubular membrane to the outside.

62. The immersion type filtration membrane module according to claim 61, wherein
said tubular membrane has an inside diameter of 3 to 15 mm and is set in such a way that the ratio $(d_s/S_1)$ of the outside diameter $d_s$ of said water-collecting tube to the cross-sectional area $S_1$, perpendicular to the axial direction, between said water-collecting tube and said outer column is set at from 0.3 to 1 $m^{-1}$, and
the packing rate of said tubular membranes expressed by Equation (II) below is set at least at 0.8:

$$\text{Packing rate} = \frac{N\pi d_o^2}{4S_1} \quad \text{(II)}$$

wherein N is the number of said tubular membranes contained in said group of tubular membranes, and $d_o$ is the outside diameter of said tubular membrane.

63. The immersion type filtration membrane module according to claim 62, wherein the ratio (A/B) of the wall thickness A to the outside diameter B of said tubular membrane is set at from 0.025 to 0.1.

64. The immersion type filtration membrane module according to claim 61, wherein said group of tubular membranes is disposed between said water-collecting tube and said outer column at a distance from said water-collecting tube.

65. The immersion type filtration membrane module according to claim 61, wherein said water-collecting tube and said outer column have a cylindrical shape.

* * * * *